(12) United States Patent
Ueno

(10) Patent No.: US 12,251,883 B2
(45) Date of Patent: Mar. 18, 2025

(54) BUILD SYSTEM, BUILD METHOD, COMPUTER PROGRAM, CONTROL APPARATUS TO BUILD AN OBJECT UTILIZING AN IRRADIATION OPTICAL SYSTEM

(71) Applicant: NIKON CORPORATION, Tokyo (JP)

(72) Inventor: Kazuki Ueno, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 74 days.

(21) Appl. No.: 18/085,787

(22) Filed: Dec. 21, 2022

(65) Prior Publication Data

US 2023/0122763 A1   Apr. 20, 2023

Related U.S. Application Data

(63) Continuation of application No. 16/770,909, filed as application No. PCT/JP2018/045281 on Dec. 10, 2018, now Pat. No. 11,577,466.

(30) Foreign Application Priority Data

Dec. 12, 2017   (WO) ................. PCT/JP2017/044624

(51) Int. Cl.
 *B33Y 50/02* (2015.01)
 *B22F 12/44* (2021.01)
 (Continued)

(52) U.S. Cl.
 CPC ............ *B29C 64/393* (2017.08); *B22F 12/44* (2021.01); *B29C 64/153* (2017.08);
 (Continued)

(58) Field of Classification Search
 CPC .................................................... B33Y 50/02
 See application file for complete search history.

(56) References Cited

U.S. PATENT DOCUMENTS 4,961,154 A * 10/1990 Pomerantz ............. B33Y 50/02
                                                                    264/401
2009/0133800 A1    5/2009 Morohoshi et al.
(Continued)

FOREIGN PATENT DOCUMENTS

CN         101151141 A    3/2008
CN         104972121 A    10/2015
(Continued)

OTHER PUBLICATIONS

May 30, 2023 Office Action issued in Chinese Patent Application No. 202211167553.7.
(Continued)

*Primary Examiner* — Suresh Suryawanshi
(74) *Attorney, Agent, or Firm* — Oliff PLC

(57) ABSTRACT

A build system is provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the build system differentiates a condition of the build process that is performed at a first area of the target object and a condition of the build process that is performed at a second area of the target object.

14 Claims, 47 Drawing Sheets

(51) Int. Cl.

| | | |
|---|---|---|
| *B29C 64/153* | (2017.01) | |
| *B29C 64/209* | (2017.01) | |
| *B29C 64/268* | (2017.01) | |
| *B29C 64/321* | (2017.01) | |
| *B29C 64/393* | (2017.01) | |
| *B33Y 30/00* | (2015.01) | |
| *B33Y 10/00* | (2015.01) | |

(52) U.S. Cl.
CPC .......... *B29C 64/209* (2017.08); *B29C 64/268* (2017.08); *B29C 64/321* (2017.08); *B33Y 30/00* (2014.12); *B33Y 50/02* (2014.12); *B33Y 10/00* (2014.12)

(56) References Cited

U.S. PATENT DOCUMENTS

| | | |
|---|---|---|
| 2012/0145683 A1 | 6/2012 | Miyagi et al. |
| 2014/0099476 A1 | 4/2014 | Subramanian et al. |
| 2015/0096963 A1 | 4/2015 | Bruck et al. |
| 2015/0183160 A1 | 7/2015 | Ohnishi |
| 2015/0209913 A1 | 7/2015 | Denney et al. |
| 2015/0283611 A1 | 10/2015 | Takezawa et al. |
| 2016/0151860 A1 | 6/2016 | Engeli et al. |
| 2017/0014909 A1 | 1/2017 | Tanaka et al. |
| 2017/0120385 A1 | 5/2017 | Tsuji et al. |
| 2017/0297107 A1 | 10/2017 | Oka et al. |
| 2017/0297323 A1 | 10/2017 | Yamazaki et al. |
| 2017/0304946 A1 | 10/2017 | Shibazaki |
| 2018/0207871 A1 | 7/2018 | Miki et al. |
| 2019/0025798 A1 | 1/2019 | Yamasaki |
| 2019/0101833 A1* | 4/2019 | Shih ................ G03F 7/0037 |
| 2020/0023585 A1 | 1/2020 | Wiesner et al. |
| 2020/0094320 A1 | 3/2020 | Krol et al. |

FOREIGN PATENT DOCUMENTS

| | | | | |
|---|---|---|---|---|
| CN | 105163922 A | * | 12/2015 | ............ B22C 9/02 |
| JP | H7-132387 A | | 5/1995 | |
| JP | 2006-272916 A | | 10/2006 | |
| JP | 2007-029977 A | | 2/2007 | |
| JP | 2007-039716 A | | 2/2007 | |
| JP | 2010-046674 A | | 3/2010 | |
| JP | 2016-002565 A | | 1/2016 | |
| JP | 2016-502589 A | | 1/2016 | |
| JP | 2016-102257 A | | 6/2016 | |
| JP | 2016-179501 A | | 10/2016 | |
| JP | 2017-144458 A | | 8/2017 | |
| JP | 2017-190505 A | | 10/2017 | |
| JP | 2017-194942 A | | 10/2017 | |
| YE | 2017/180116 A1 | | 10/2017 | |

OTHER PUBLICATIONS

Jun. 6, 2023 Office Action issued in Japanese Patent Application No. 2019-559622.
Dec. 12, 2023 Office Action issued in Japanese Patent Application No. 2023-030865.
Mar. 29, 2024 Office Action issued in Chinese Patent Application No. 202211167553.7.
Mar. 5, 2019 International Search Report issued in International Patent Application No. PCT/JP2018/045281.
Mar. 5, 2019 Written Opinion of the International Searching Authority issued in International Patent Application No. PCT/JP2018/045281.
May 27, 2021 Office Action issued in Chinese Patent Application No. 201880080527.6.
Aug. 23, 2021 Office Action issued in European Patent Application No. 18888827.5.
Apr. 13, 2022 Office Action issued in U.S. Appl. No. 16/770,909.
Jan. 5, 2022 Office Action issued in Japanese Patent Application No. 2019-559455.
Feb. 23, 2022 Office Action issued in Chinese Patent Application No. 201880080527.6.
Oct. 6, 2022 U.S. Notice of Allowance issued U.S. Appl. No. 16/770,909.
Aug. 2, 2022 Office Action issued in Japanese Patent Application No. 2019-559455.
Dec. 6, 2022 Office Action issued in Japanese Patent Application No. 2019-559455.
Dec. 27, 2022 Office Action issued in Japanese Patent Application No. 2019-559622.
Nov. 2, 2022 Supplemental Notice of Allowability Issued in U.S. Appl. No. 16/770,909.
Dec. 30, 2022 Corrected Notice of Allowability Issued in U.S. Appl. No. 16/770,909.
Jan. 9, 2024 Office Action issued in Japanese Patent Application No. 2019-559622.
Aug. 6, 2024 Office Action issued in Japanese Patent Application No. 2023-030865.
Jul. 2, 2024 Office Action issued in Japanese Patent Application No. 2019-559622.
Jun. 4, 2024 Office Action issued in European Patent Application No. 18 888 827.5.
May 25, 2024 Office Action issued in Japanese Patent Application No. 2023-030865.

\* cited by examiner

BUILD SYSTEM, BUILD METHOD, COMPUTER PROGRAM, CONTROL APPARATUS TO BUILD AN OBJECT UTILIZING AN IRRADIATION OPTICAL SYSTEM

This is a Continuation of U.S. patent application Ser. No. 16/770,909 filed Jul. 29, 2020 (now U.S. Pat. No. 11,577,466), which is a U.S. National Stage of International Application No. PCT/JP2018/045281 filed Dec. 10, 2018. The disclosure of each of the prior applications is hereby incorporated by reference herein in its entirety.

TECHNICAL FIELD

The present invention relates to a build system, a build method, a computer program, a recording medium and a control apparatus for forming a build object, for example.

BACKGROUND ART

A Patent Literature 1 discloses a build apparatus that forms a build object by melting a powdery material with an energy beam and then solidifying the melted material again. A technical problem of the build apparatus is to form a proper build object.

CITATION LIST

Patent Literature

Patent Literature 1: US 2017/0014909A1

SUMMARY OF INVENTION

A first aspect provides a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the build system differentiates a condition of the build process that is performed at a first area of the target object and a condition of the build process that is performed at a second area of the target object.

A second aspect provides a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the build system differentiates a condition of the build process that is performed at a first area of the target object at which the irradiation area is set a plurality of times and a condition of the build process that is performed at a second area of the target object at which the irradiation area is set at least one time the number of which is less than the number of times which the irradiation area is set at the first area.

A third aspect provides a build system provided with: a build apparatus that grows a build object in a direction along which a relative position between an energy beam and a target object is changed to perform a build process by supplying build materials to an irradiation area of the energy beam from a supply system while irradiating the target object with the energy beam from an irradiation system; and a change apparatus that is configured to change the relative position between the energy beam and the target object, wherein the build system differentiates a condition of the build process at a second timing and a condition of the build process at a first timing when a relative positional relationship between the target object and the energy beam that is used to perform the build process at the second timing becomes a relative positional relationship between the target object and the energy beam that is used to perform the build process at the first timing A fourth aspect provides a build system provided with: a build apparatus that performs a build process for forming a layered structural object in which a plurality of layered structural objects are layered, by supplying build materials to an irradiation area of an energy beam from a supply system while irradiating a target object with the energy beam through an optical system; and a change apparatus that is configured to change a relative position between the energy beam and the target object, wherein a size of a depth of focus of the optical system is larger than or equal to a thickness of one layer of the layered structural object and is smaller than a thickness of two layers of the layered structural objects.

A fifth aspect provides a build system provided with: a build apparatus that performs a build process for forming a build object by supplying build materials to an irradiation area on a target object from a supply system while irradiating the irradiation area with an energy beam from an irradiation system; and a change apparatus that is configured to change a relative position between the energy beam and the target object, wherein the build system changes a relative position between the irradiation area of the energy beam and the target object in a second direction, which intersects with a first direction, after a first period when the relative position between the irradiation area of the energy beam and the target object is changed in the first direction, then changes the relative position between the irradiation area of the energy beam and the target object in a direction that is parallel to the first direction in a second period, and performs the build process in at least a part of at least one of the first period and the second period.

A sixth aspect provides a build method including: performing a build process for forming a build object by supplying build materials to an irradiation area of an energy beam while irradiating a target object with the energy beam; changing a relative position between the irradiation area of the energy beam and the target object; and differentiating a condition of the build process that is performed at a first area of the target object and a condition of the build process that is performed at a second area of the target object.

A seventh aspect provides a build method including: performing a build process for forming a build object by supplying build materials to an irradiation area of an energy beam while irradiating a target object with the energy beam; changing a relative position between the irradiation area of the energy beam and the target object; and differentiating a condition of the build process that is performed at a first area of the target object at which the irradiation area is set a plurality of times and a condition of the build process that is performed at a second area of the target object at which the irradiation area is set the number of times that is less than the number of times in which the irradiation area is set at the first area.

An eighth aspect provides a build method including: performing a build process for forming a build object by supplying build materials to an irradiation area of an energy beam while irradiating a target object with the energy beam;

changing a relative position between the irradiation area of the energy beam and the target object; and differentiating a condition of the build process at a second timing and a condition of the build process at a first timing when a relative positional relationship between the target object and the energy beam that is used to perform the build process at the second timing becomes a relative positional relationship between the target object and the energy beam that is used to perform the build process at the first timing.

A ninth aspect provides a build method including: irradiating a target object with an energy beam; supplying build materials to the target object; and performing a build process for forming a layered structural object in which a plurality of layered structural objects are laminated, by supplying the build materials to an irradiation area of the energy beam while irradiating the target object with the energy beam, wherein irradiating the target object with the energy beam includes irradiating the target object with the energy beam through an optical system in which a size of a depth of focus of the optical system is larger than a thickness of one layer of the layered structural object and is smaller than a thickness of two layers of the layered structural objects.

A tenth aspect provides a computer program that allows a computer to execute the build methods described above.

An eleventh aspect provides a recording medium in which the computer programs described above or described below is recorded.

A twelfth aspect provides a computer program that is executed by a computer for controlling a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the computer program allows the computer to execute a process for differentiating a condition of the build process that is performed at a first area of the target object and a condition of the build process that is performed at a second area of the target object.

A thirteenth aspect provides a computer program that is executed by a computer for controlling a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the computer program allows the computer to execute a process for differentiating a condition of the build process that is performed at a first area of the target object at which the irradiation area is set a plurality of times and a condition of the build process that is performed at a second area of the target object at which the irradiation area is set at least one time the number of which is less than the number of times which the irradiation area is set at the first area.

A fourteenth aspect provides a computer program that is executed by a computer for controlling a build system provided with: a build apparatus that grows a build object in a direction along which a relative position between an energy beam and a target object is changed to perform a build process by supplying build materials to an irradiation area of the energy beam from a supply system while irradiating the target object with the energy beam from an irradiation system; and a change apparatus that is configured to change the relative position between the energy beam and the target object, wherein the computer program allows the computer to execute a process for differentiating a condition of the build process at a second timing and a condition of the build process at a first timing when a relative positional relationship between the target object and the energy beam that is used to perform the build process at the second timing becomes a relative positional relationship between the target object and the energy beam that is used to perform the build process at the first timing.

A fifteenth aspect provides a computer program that is executed by a computer for controlling a build system provided with: a build apparatus that performs a build process for forming a layered structural object in which a plurality of layered structural objects are laminated, by supplying build materials to an irradiation area of an energy beam from a supply system while irradiating a target object with the energy beam through an optical system from an irradiation system; and a change apparatus that is configured to change a relative position between the energy beam and the target object, wherein the computer program allows the computer to execute a process for making a size of a depth of focus of the optical system be larger than a thickness of one layer of the layered structural object and be smaller than a thickness of two layers of the layered structural objects.

A sixteenth aspect provides a computer program that is executed by a computer for controlling a build system provided with: a build apparatus that performs a build process for forming a build object by supplying build materials to an irradiation area on a target object from a supply system while irradiating the irradiation area with an energy beam from an irradiation system; and a change apparatus that is configured to change a relative position between the energy beam and the target object, wherein the computer program allows the computer to execute a process for changing a relative position between the irradiation area of the energy beam and the target object in a second direction, which intersects with a first direction, after a first period when the relative position between the irradiation area of the energy beam and the target object is set in the first direction, for then changing the relative position between the irradiation area of the energy beam and the target object in a direction that is parallel to the first direction in a second period, and for performing the build process in at least a part of at least one of the first period and the second period.

A seventeenth aspect provides a build system provided with: a build apparatus that performs a build process for forming a build object by supplying build materials to an irradiation area of an energy beam from a supply system while irradiating a target object with the energy beam from an irradiation system; a change apparatus that is configured to change a relative position between the energy beam and the target object; and a receiving apparatus that receives a control signal for controlling the build apparatus and the change apparatus to differentiate a condition of the build process that is performed at a first area of the target object and a condition of the build process that is performed at a second area of the target object.

An eighteenth aspect provides a build system provided with: a build apparatus that performs a build process for forming a build object by supplying build materials to an irradiation area of an energy beam from a supply system while irradiating a target object with the energy beam from an irradiation system; a change apparatus that is configured to change a relative position between the energy beam and the target object; and a receiving apparatus that receives a control signal for controlling the build apparatus and the change apparatus to differentiate a condition of the build process that is performed at a first area of the target object at which the irradiation area is set a plurality of times and a condition of the build process that is performed at a second area of the target object at which the irradiation area is set at least one time the number of which is less than the number of times which the irradiation area is set at the first area.

A nineteenth aspect provides a build system provided with: a build apparatus that grows a build object in a direction along which a relative position between an energy beam and a target object is changed to perform a build process by supplying build materials to an irradiation area of the energy beam from a supply system while irradiating the target object with the energy beam from an irradiation system; a change apparatus that is configured to change the relative position between the energy beam and the target object; and a receiving apparatus that receives a control signal for controlling the build apparatus and the change apparatus to differentiate a condition of the build process at a second timing and a condition of the build process at a first timing when a relative positional relationship between the target object and the energy beam that is used to perform the build process at the second timing becomes a relative positional relationship between the target object and the energy beam that is used to perform the build process at the first timing.

A twentieth aspect provides a build system provided with: a build apparatus that performs a build process for forming a layered structural object in which a plurality of layered structural objects are laminated, by supplying build materials to an irradiation area of an energy beam from a supply system while irradiating a target object with the energy beam through an optical system from an irradiation system; a change apparatus that is configured to change a relative position between the energy beam and the target object; and a receiving apparatus that receives a control signal for controlling the build apparatus and the change apparatus such that a size of a depth of focus of the optical system is larger than a thickness of one layer of the layered structural object and is smaller than a thickness of two layers of the layered structural objects.

A twenty-first aspect provides a build system provided with: a build apparatus that performs a build process for forming a build object by supplying build materials to an irradiation area on a target object from a supply system while irradiating the irradiation area with an energy beam from an irradiation system; a change apparatus that is configured to change a relative position between the energy beam and the target object; and a receiving apparatus that receives a control signal for controlling the build apparatus and the change apparatus to change a relative position between the irradiation area of the energy beam and the target object in a second direction, which intersects with a first direction, after a first period when the relative position between the irradiation area of the energy beam and the target object is set in the first direction, then to change the relative position between the irradiation area of the energy beam and the target object in a direction that is parallel to the first direction in a second period, and to perform the build process in at least a part of at least one of the first period and the second period.

A twenty-second aspect provides a control apparatus that controls a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the control apparatus executing a process for differentiating a condition of the build process that is performed at a first area of the target object and a condition of the build process that is performed at a second area of the target object.

A twenty-third aspect provides a control apparatus that controls a build system provided with: a build apparatus that performs a build process for forming a build object by supplying build materials to an irradiation area of an energy beam from a supply system while irradiating a target object with the energy beam from an irradiation system; and a change apparatus that is configured to change a relative position between the energy beam and the target object, wherein the control apparatus executing a process for differentiating a condition of the build process that is performed at a first area of the target object at which the irradiation area is set a plurality of times and a condition of the build process that is performed at a second area of the target object at which the irradiation area is set at least one time the number of which is less than the number of times which the irradiation area is set at the first area.

A twenty-fourth aspect provides a control apparatus that controls a build system provided with: a build apparatus that grows a build object in a direction along which a relative position between an energy beam and a target object is changed to perform a build process by supplying build materials to an irradiation area of the energy beam from a supply system while irradiating the target object with the energy beam from an irradiation system; and a change apparatus that is configured to change the relative position between the energy beam and the target object, wherein the control apparatus executing a process for differentiating a condition of the build process at a second timing and a condition of the build process at a first timing when a relative positional relationship between the target object and the energy beam that is used to perform the build process at the second timing becomes a relative positional relationship between the target object and the energy beam that is used to perform the build process at the first timing.

A twenty-fifth aspect provides a control apparatus that controls a build system provided with: a build apparatus that performs a build process for forming a layered structural object in which a plurality of layered structural objects are laminated, by supplying build materials to an irradiation area of an energy beam from a supply system while irradiating a target object with the energy beam through an optical system from an irradiation system; and a change apparatus that is configured to change a relative position between the energy beam and the target object, wherein the control apparatus executing a process for making a size of a depth of focus of the optical system be larger than a thickness of one layer of the layered structural object and be smaller than a thickness of two layers of the layered structural objects.

A twenty-sixth aspect provides a control apparatus that controls a build system provided with: a build apparatus that performs a build process for forming a build object by supplying build materials to an irradiation area on a target object from a supply system while irradiating the irradiation area with an energy beam from an irradiation system; and a change apparatus that is configured to change a relative position between the energy beam and the target object, wherein the control apparatus executing a process for changing a relative position between the irradiation area of the energy beam and the target object in a second direction, which intersects with a first direction, after a first period when the relative position between the irradiation area of the energy beam and the target object is set in the first direction, for then changing the relative position between the irradiation area of the energy beam and the target object in a direction that is parallel to the first direction in a second period, and for performing the build process in at least a part of at least one of the first period and the second period.

An operation and another advantage of the above described aspect will be apparent from an embodiment described below.

Figure 2A:
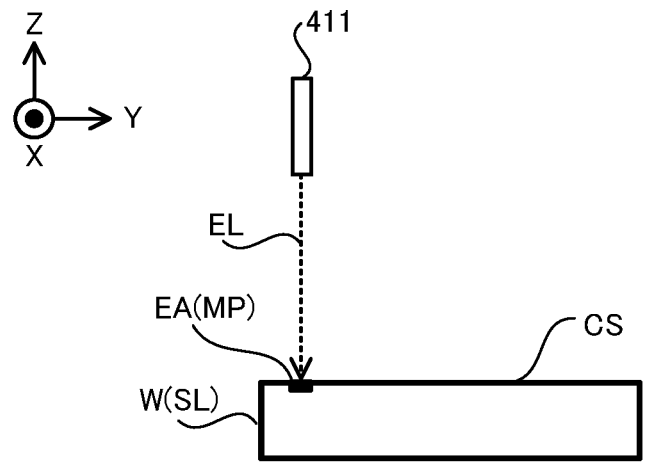
Figure 2B:
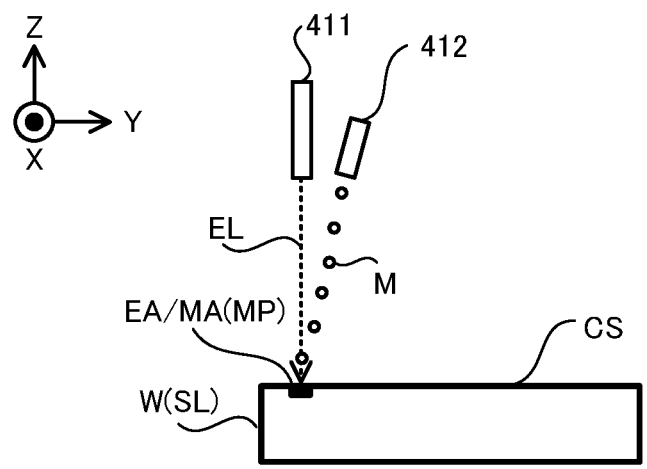
Figure 2C:
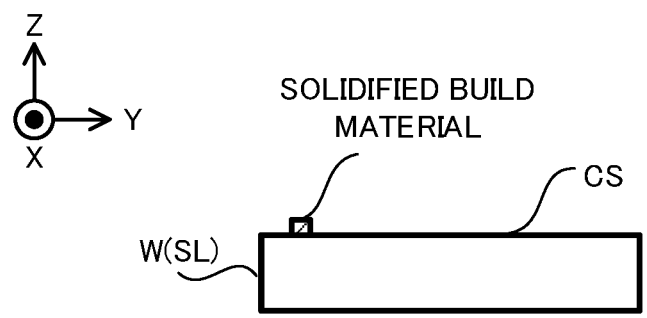

Each of FIG. 2A to FIG. 2C is a cross-sectional view that illustrates an aspect in which a certain area on a workpiece is irradiated with light and build materials are supplied thereto.

Figure 3A:
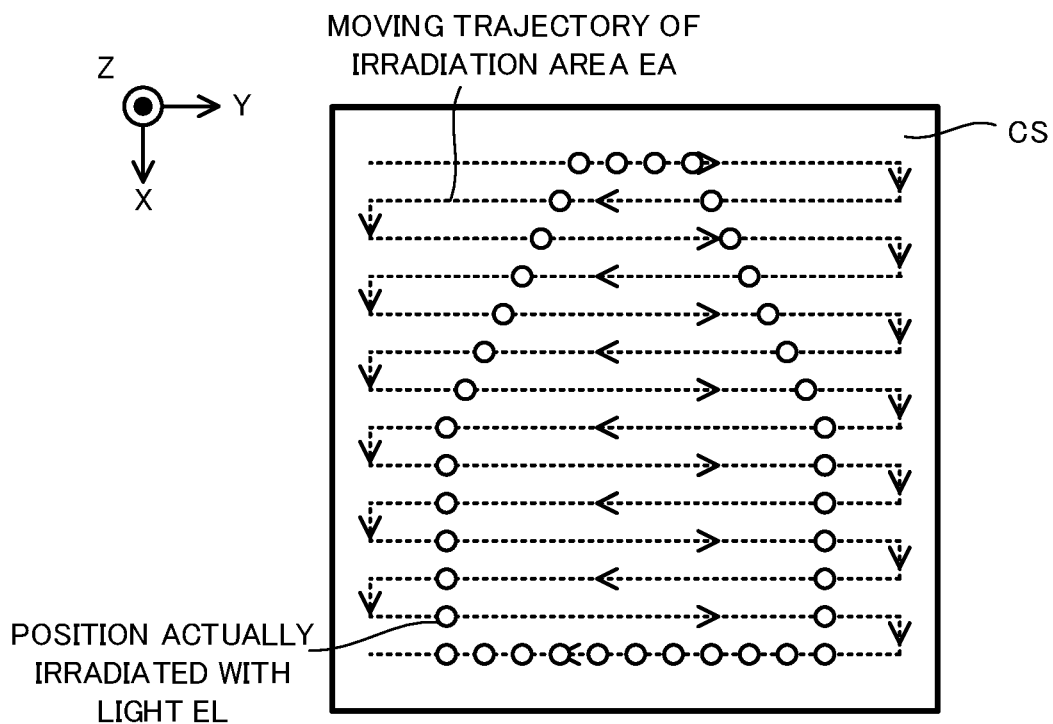
Figure 3B:
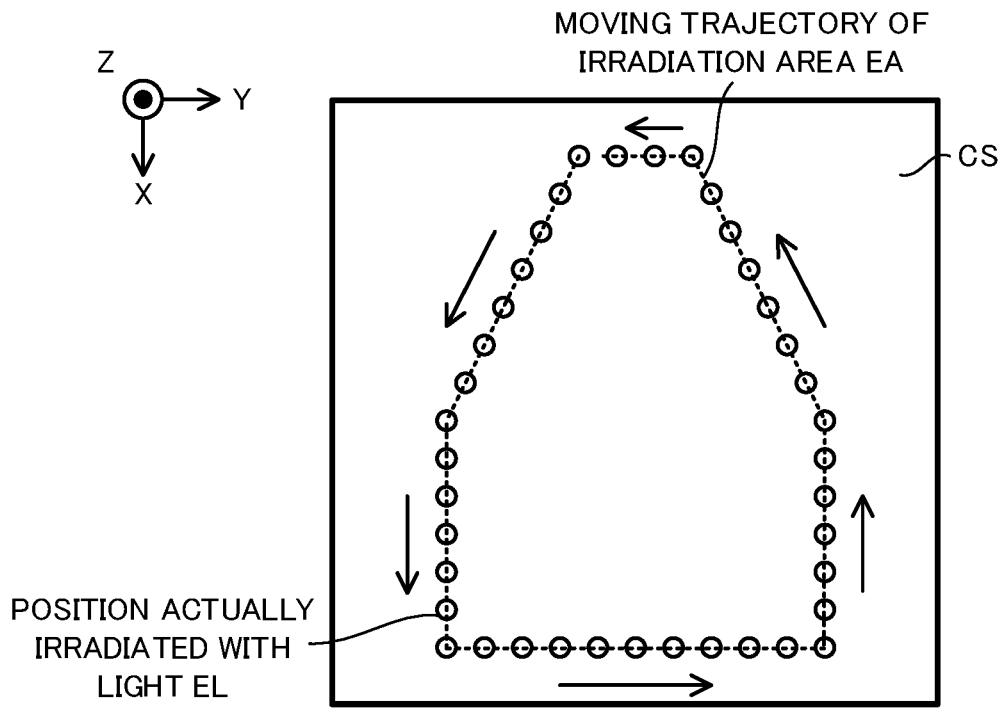

Each of FIG. 3A and FIG. 3B is a plan view that illustrates a moving trajectory of an irradiation area on a build surface.

Figure 4A:
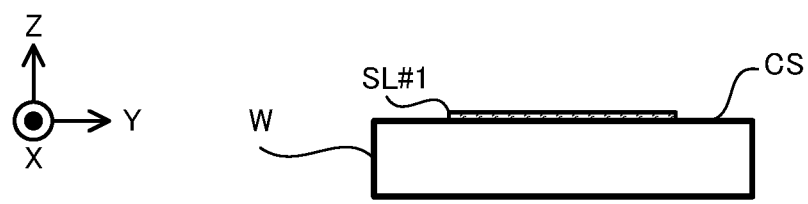
Figure 4B:
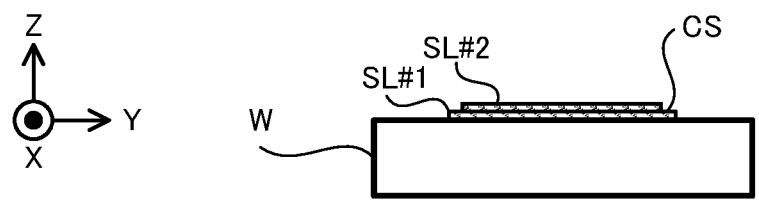
Figure 4C:
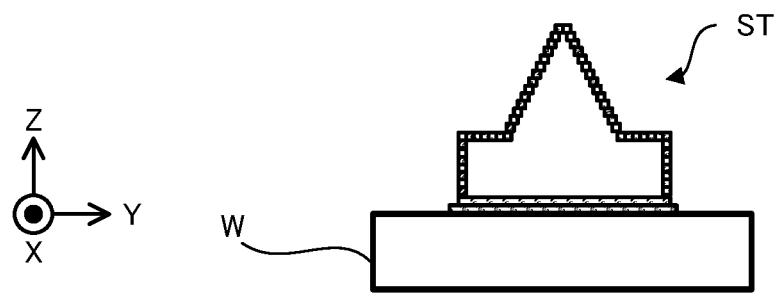

Each of FIG. 4A to FIG. 4C is a cross-sectional view that illustrates a process for forming a three-dimensional structural object.

Figure 5A:
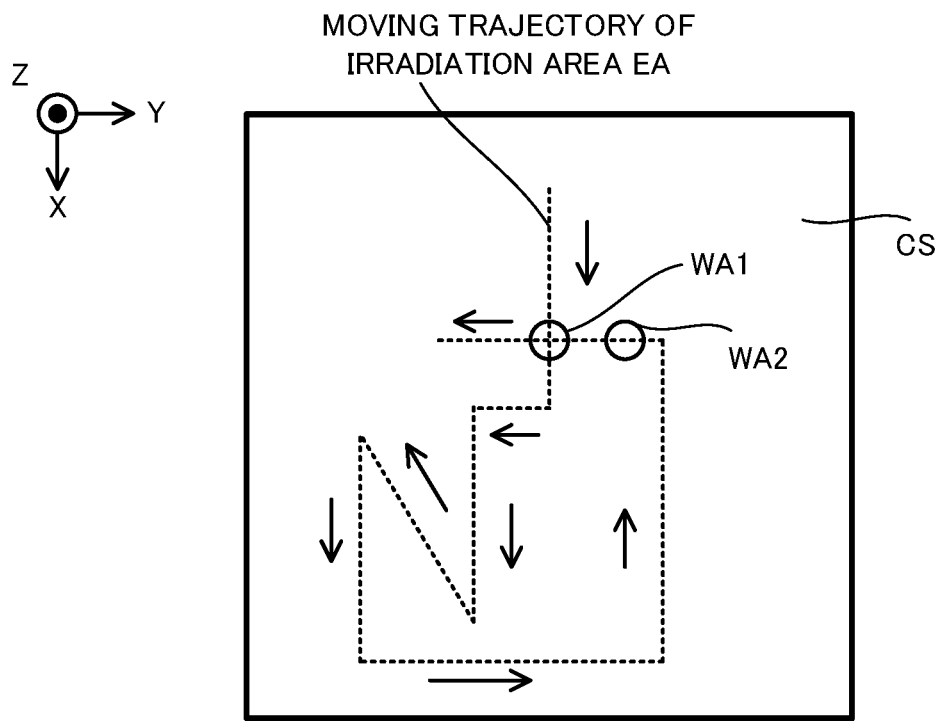
Figure 5B:
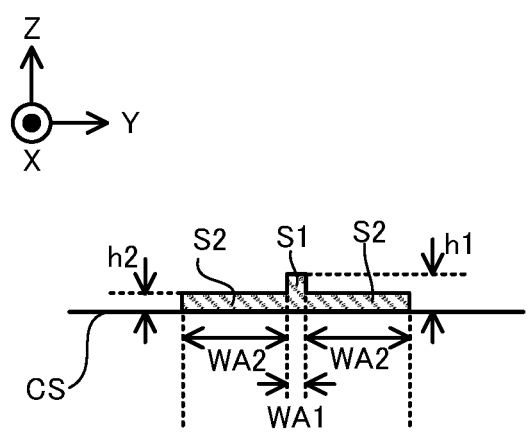
Figure 5C:
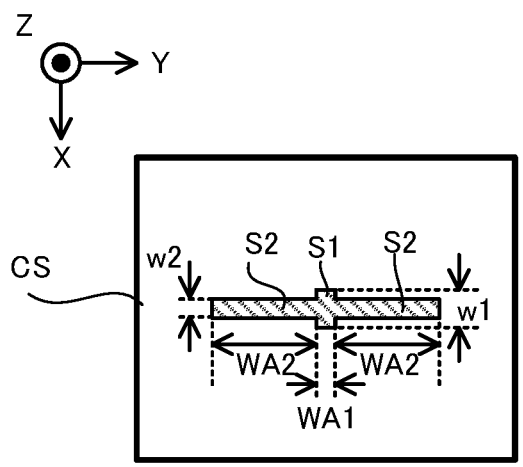

FIG. 5A is a plan view that illustrates a moving path of the irradiation area on the build surface, FIG. 5B is a cross-sectional view that illustrates a build object formed at an area at which the moving path of the irradiation area intersects with itself and a build object formed at an area at which the moving path of the irradiation area does not cross itself, and FIG. 5C is a plan view that illustrates the build object formed at the area at which the moving path of the irradiation area intersects with itself and the build object formed at the area at which the moving path of the irradiation area does not cross itself.

Figure 6A:
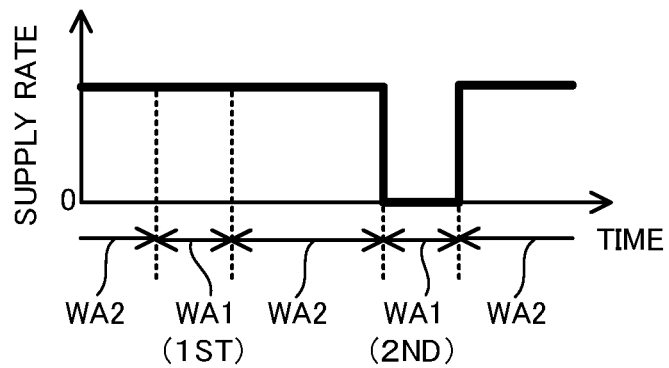
Figure 6B:
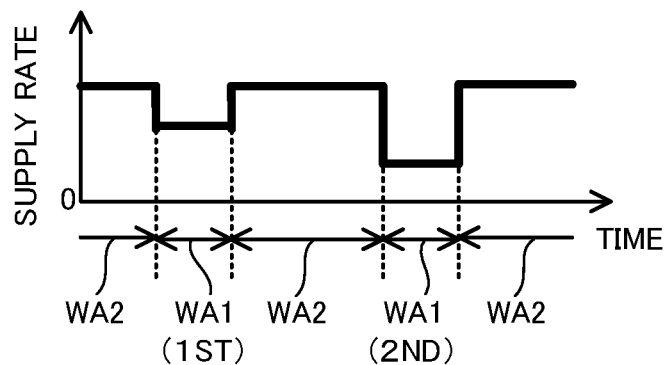
Figure 6C:
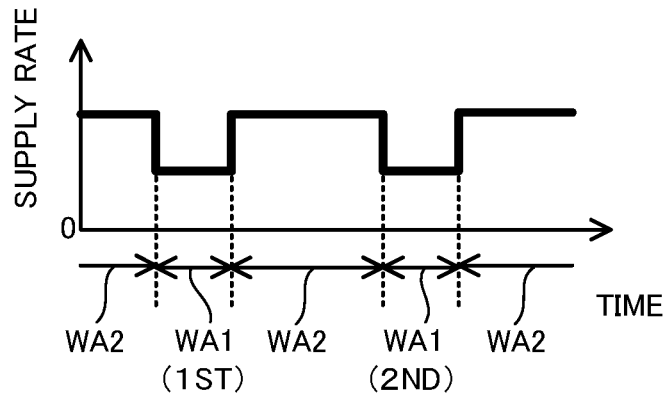

Each of FIG. 6A to FIG. 6C is a graph that illustrates a supply rate of the build materials, which is controlled to reduce variation in height of the build object.

Figure 7:
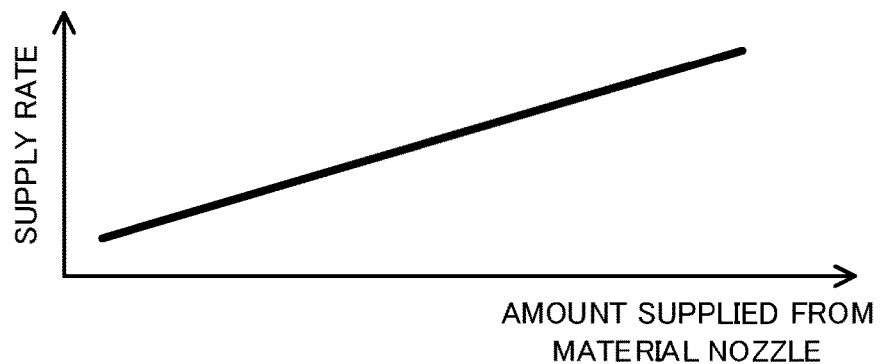

FIG. 7 is a graph that illustrates a relation between the supply rate of the build materials and an amount of the build materials supplied from a material nozzle.

Figures 8A, 8B:
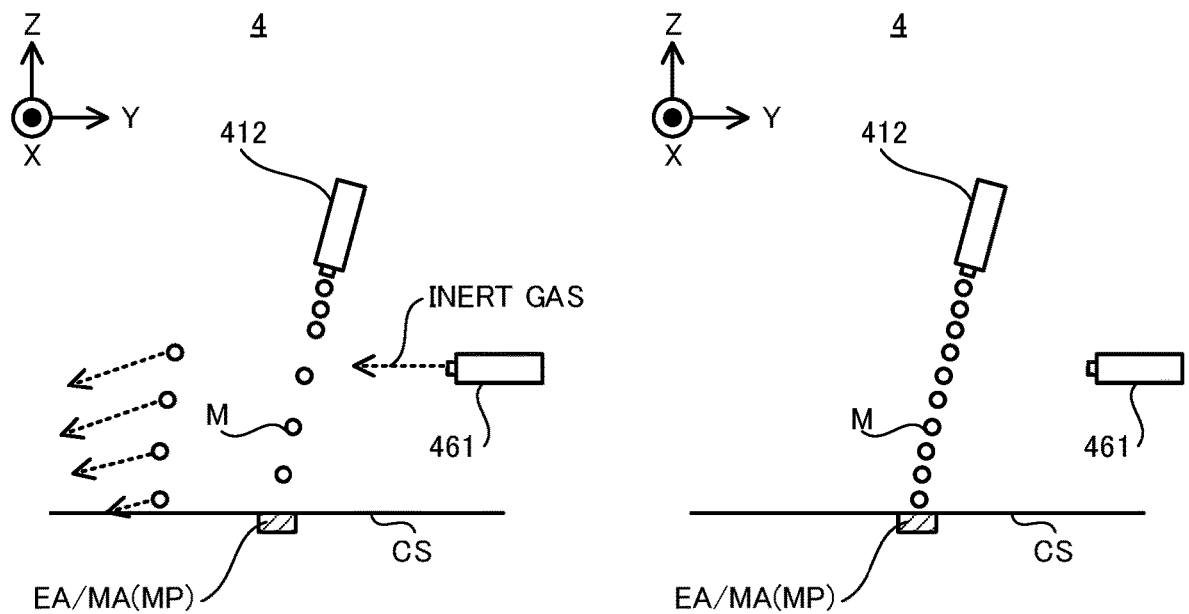

FIG. 8A is a cross-sectional view that illustrates a supply aspect of the build materials when a gas jet apparatus emits a jet of inert gas, and FIG. 8B is a cross-sectional view that illustrates a supply aspect of the build materials when the gas jet apparatus does not emit a jet of the inert gas.

Figure 9A:
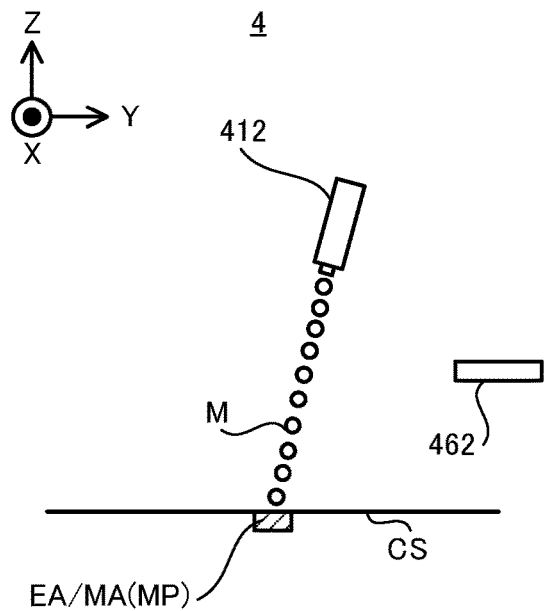
Figure 9B:
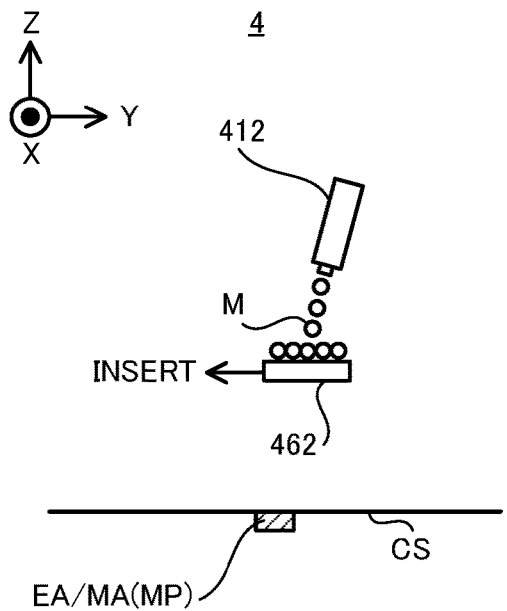

FIG. 9A is a cross-sectional view that illustrates a supply aspect of the build materials when a blocking member is in a non-blocking state, and FIG. 9B is a cross-sectional view that illustrates a supply aspect of the build materials when the blocking member is in a blocking state.

Figure 10A:
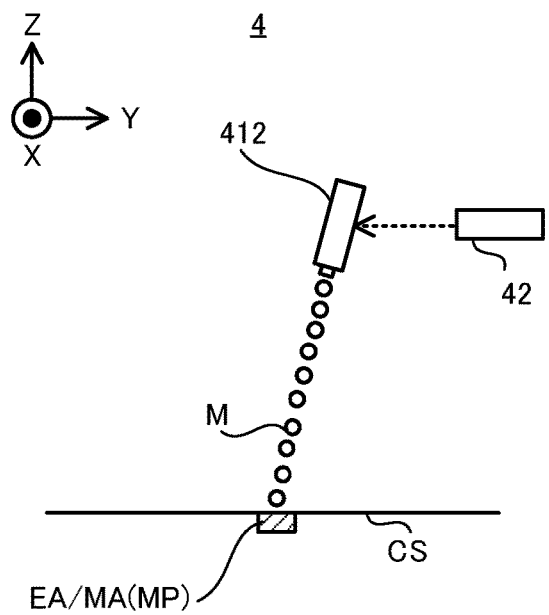
Figure 10B:
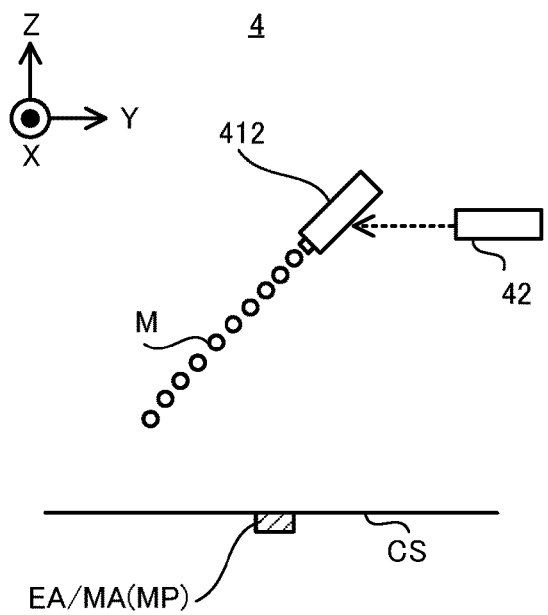

FIG. 10A is a cross-sectional view that illustrates a supply aspect of the build materials when the material nozzle is in a supply state, and FIG. 10B is a cross-sectional view that illustrates a supply aspect of the build materials when the material nozzle is in a non-supply state.

Figure 11A:
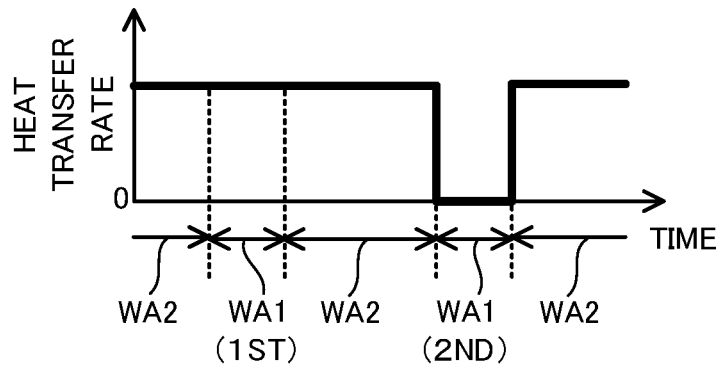
Figure 11B:
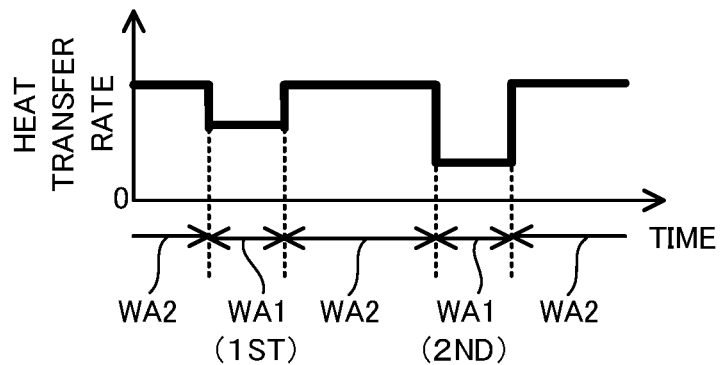
Figure 11C:
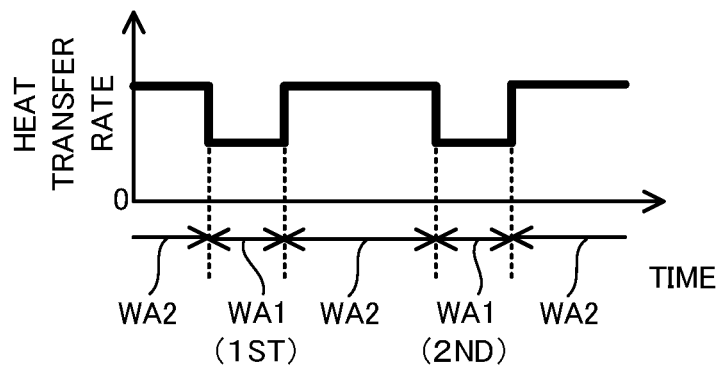

Each of FIG. 11A to FIG. 11C is a graph that illustrates a heat transfer rate, which is controlled to reduce the variation in the height of the build object.

Figure 12:
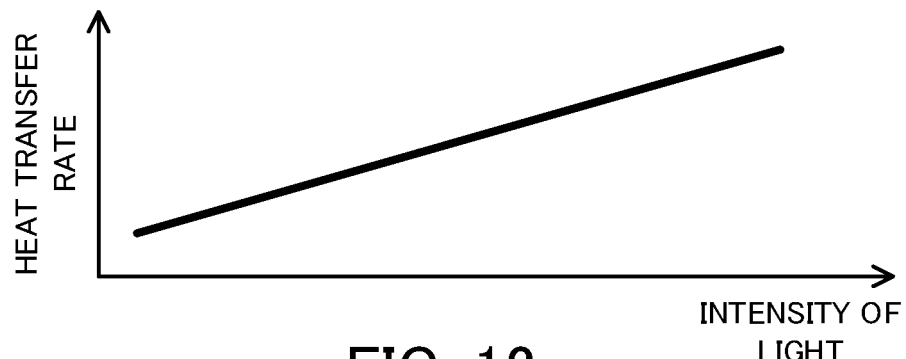

FIG. 12 is a graph that illustrates a relation between the heat transfer rate and the intensity of the light on the irradiation area.

Figure 13A:
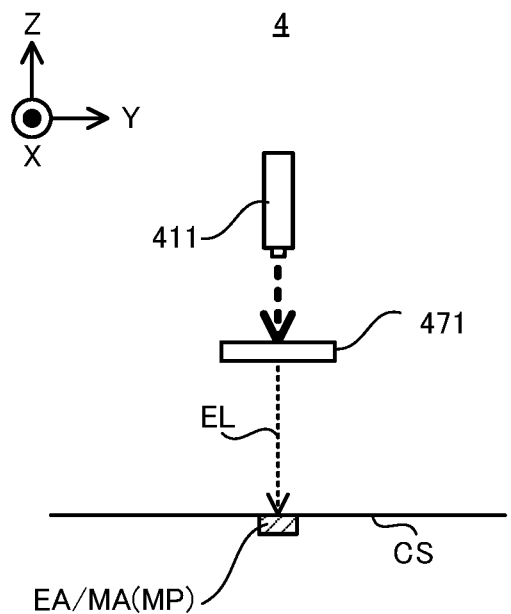
Figure 13B:
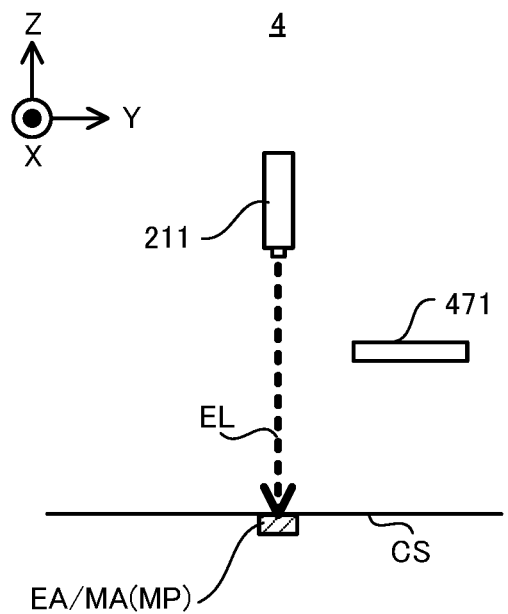

FIG. 13A is a cross-sectional view that illustrates an irradiation aspect of the light when a shading member is in a shading state, and FIG. 13B is a cross-sectional view that illustrates an irradiation aspect of the light when the shading member is in a non-shading state.

Figure 14A:
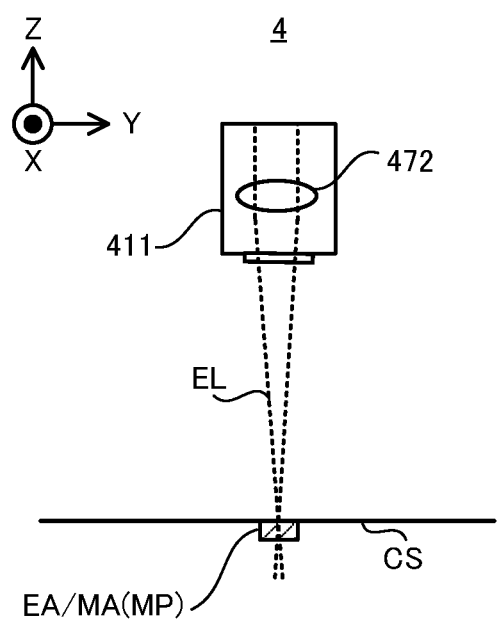
Figure 14B:
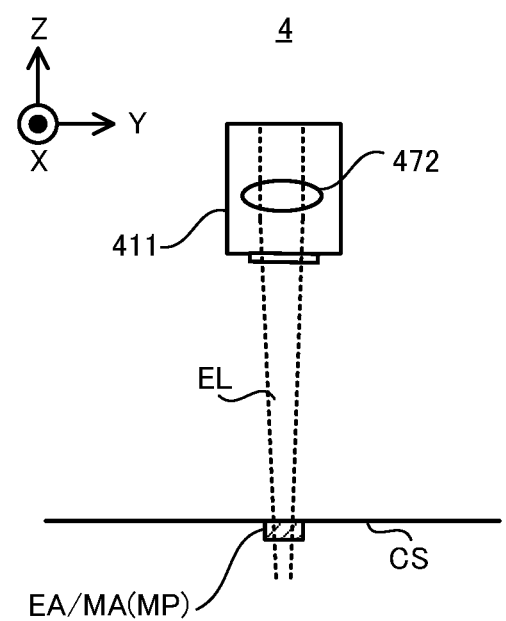

FIG. 14A is a cross-sectional view that illustrates an irradiation aspect of the light when a light concentration position is set on the build surface, and FIG. 14B is a cross-sectional view that illustrates an irradiation aspect of the light when the light concentration position is set at a distance from the build surface.

Figure 15A:
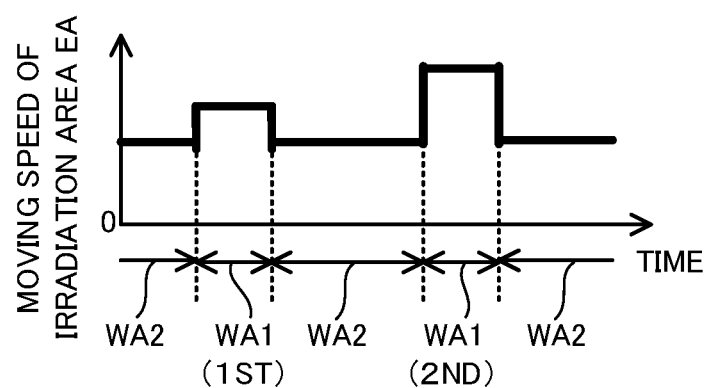
Figure 15B:
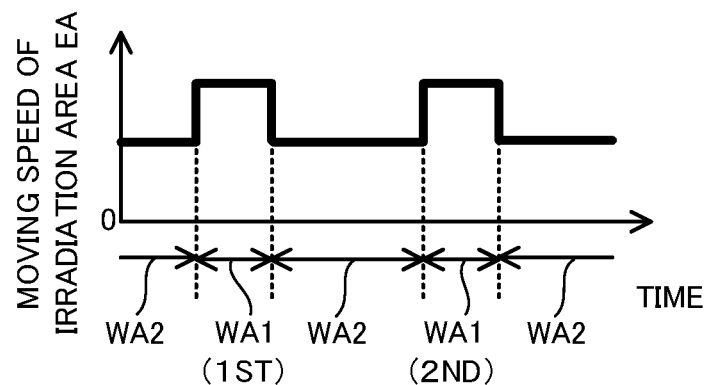

Each of FIG. 15A and FIG. 15B is a graph that illustrates a moving speed of the irradiation area, which is controlled to reduce the variation in the height of the build object.

Figure 16A:
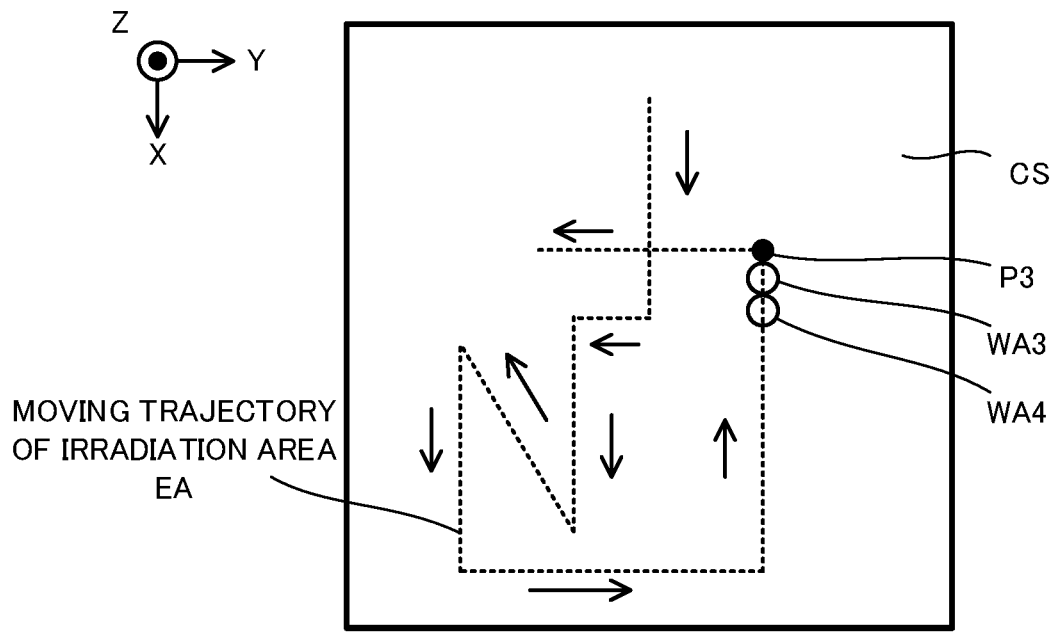
Figure 16B:
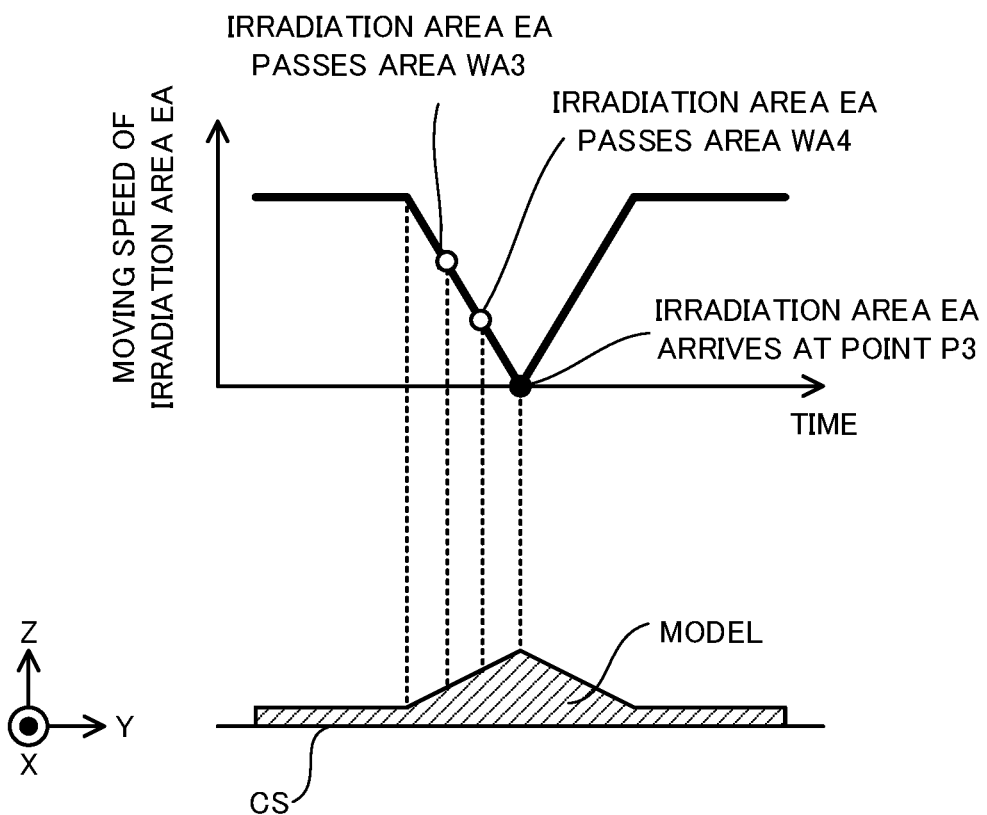

FIG. 16A is a plan view that illustrates a moving path of the irradiation area on the build surface, and FIG. 16B is a graph that illustrates a relation between the moving speed of the irradiation area and the height of the build object.

Figure 17:
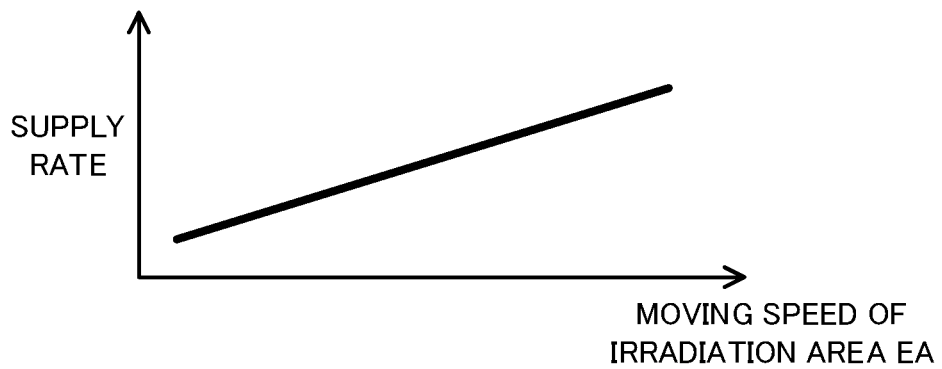

FIG. 17 is a graph that illustrates the supply rate of the build materials that is controlled on the basis of the moving speed of the irradiation area to reduce the variation in the height of the build object.

Figure 18:
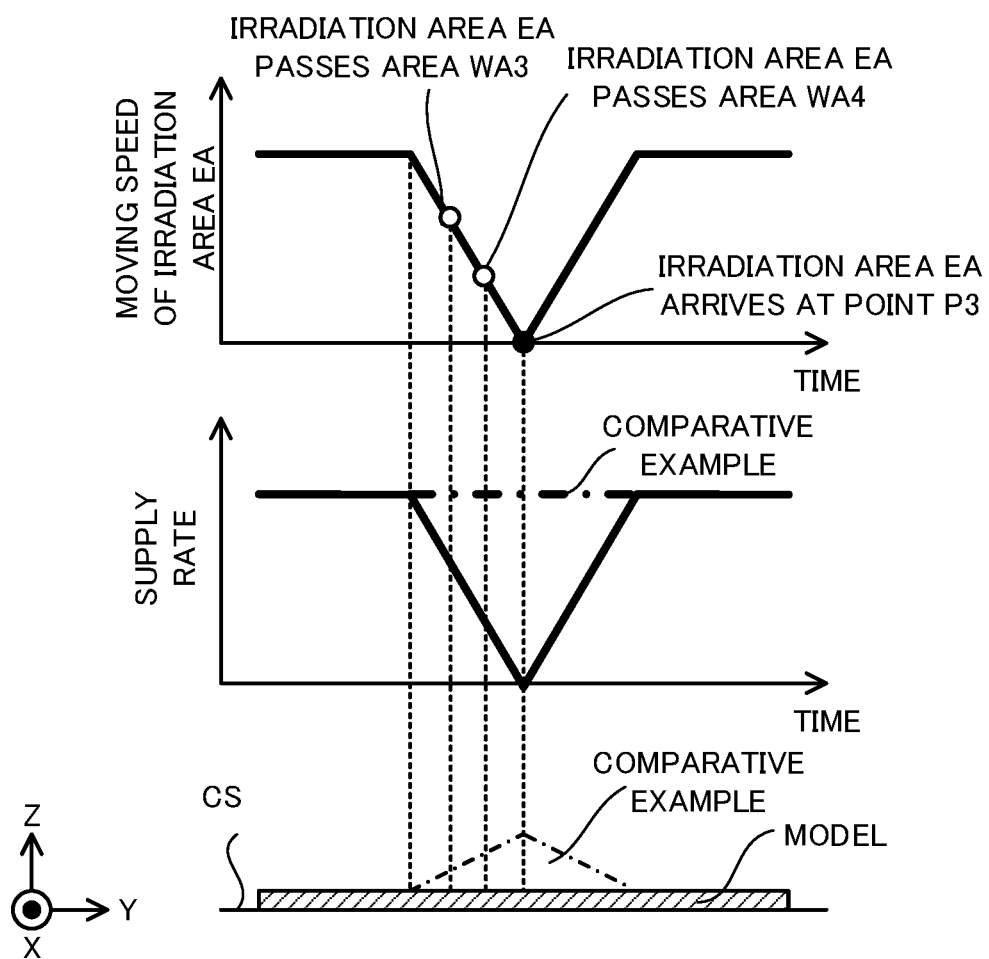

FIG. 18 is a graph that illustrates a relation among the moving speed of the irradiation area, the supply rate of the build materials, and the height of the build object.

Figure 19:
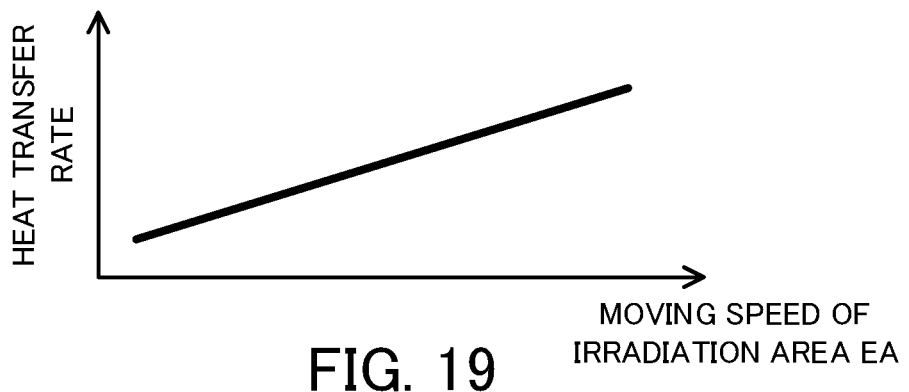

FIG. 19 is a graph that illustrates the heat transfer rate that is controlled on the basis of the moving speed of the irradiation area to reduce the variation in the height of the build object.

Figure 20:
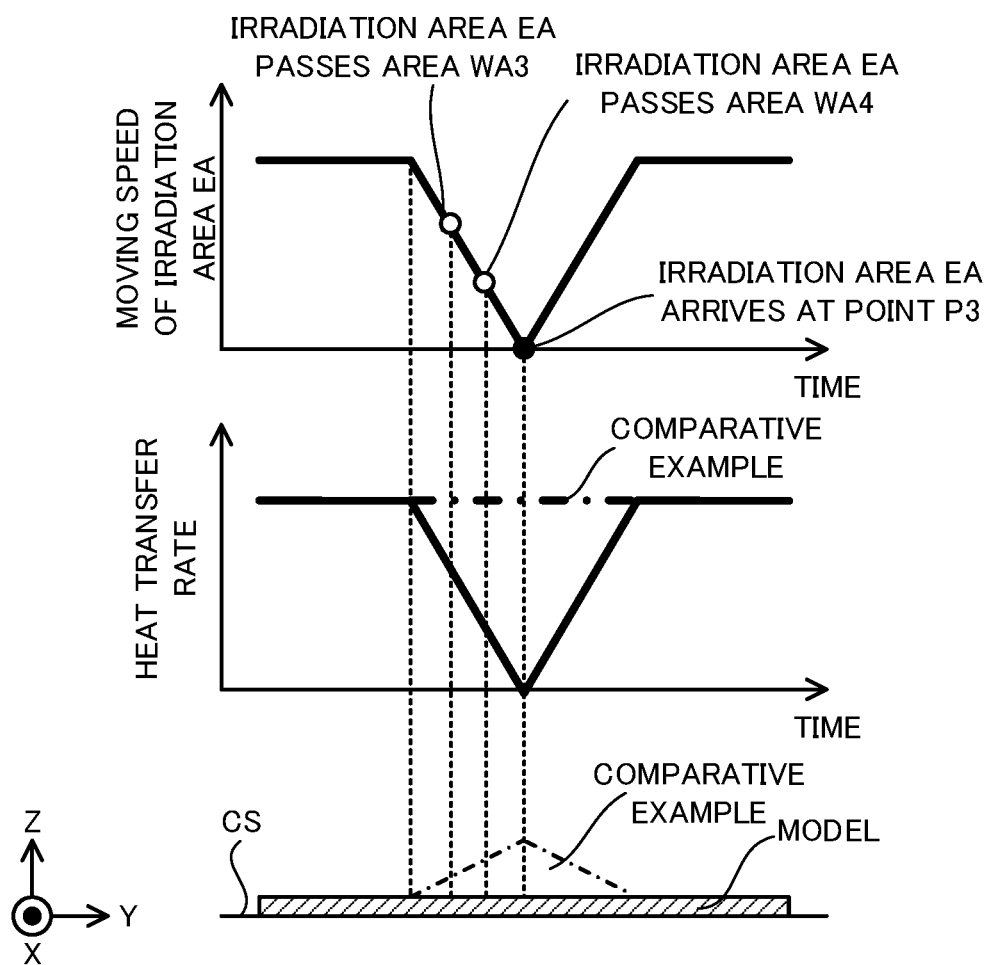

FIG. 20 is a graph that illustrates a relation among the moving speed of the irradiation area, the heat transfer rate, and the height of the build object.

Figure 21A:
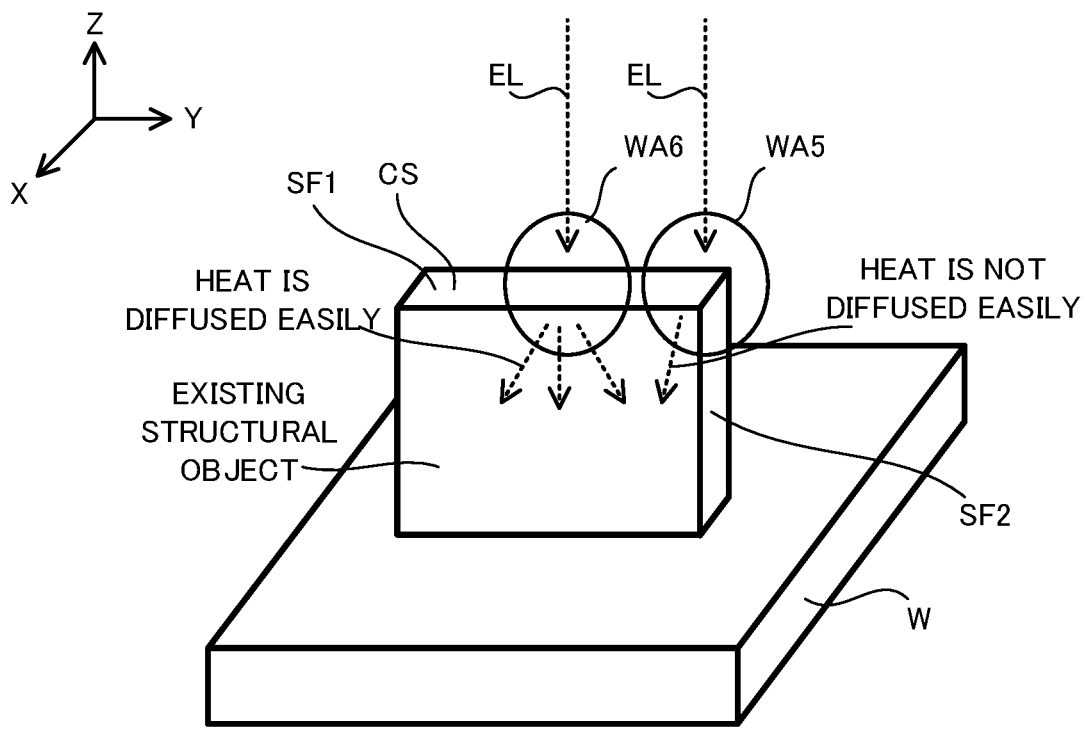
Figure 21B:
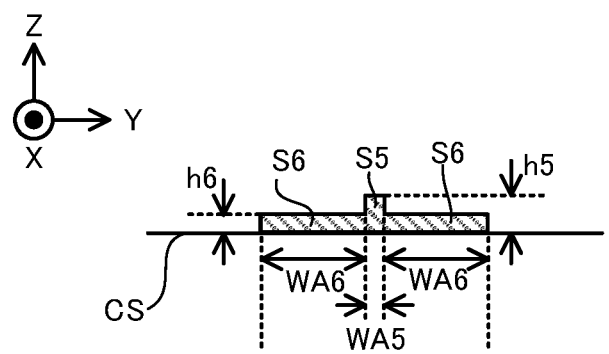

FIG. 21A is a perspective view that illustrates an example of positions of an area at which the heat of an existing structural object is not diffused relatively easily and an area at which the heat is diffused relatively easily, and FIG. 21B is a cross-sectional view that illustrates a build object formed at the area at which the heat is not diffused relatively easily and a build object formed at the area at which the heat is diffused relatively easily.

Figure 22:
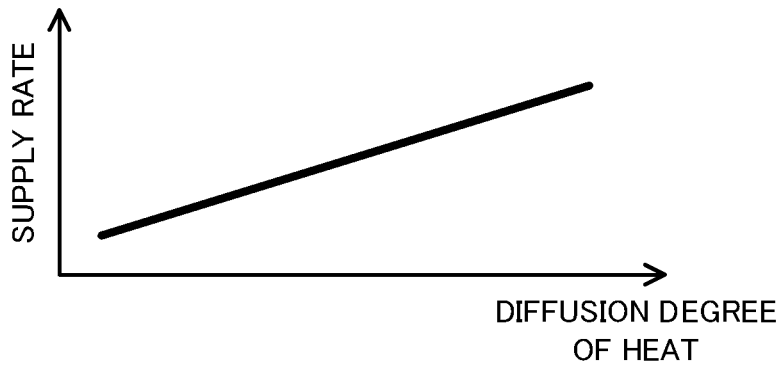

FIG. 22 is a graph that illustrates the supply rate of the build materials that is controlled on the basis of a diffusion degree of the heat (a thermal diffusion degree) to reduce the variation in the height of the build object.

Figure 23:
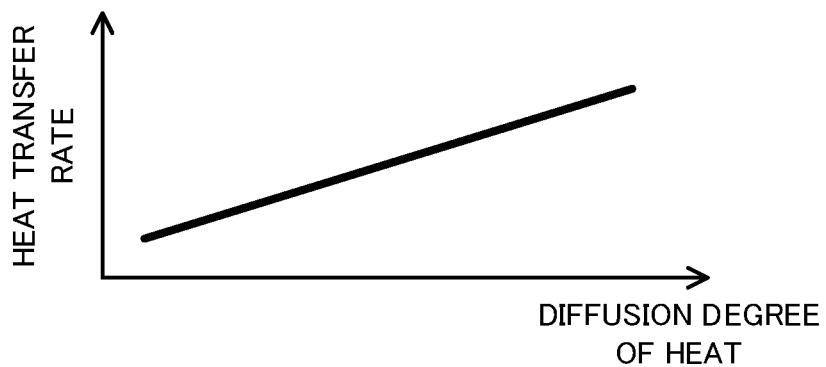

FIG. 23 is a graph that illustrates the heat transfer rate that is controlled on the basis of the diffusion degree of the heat to reduce the variation in the height of the build object.

Figure 24:
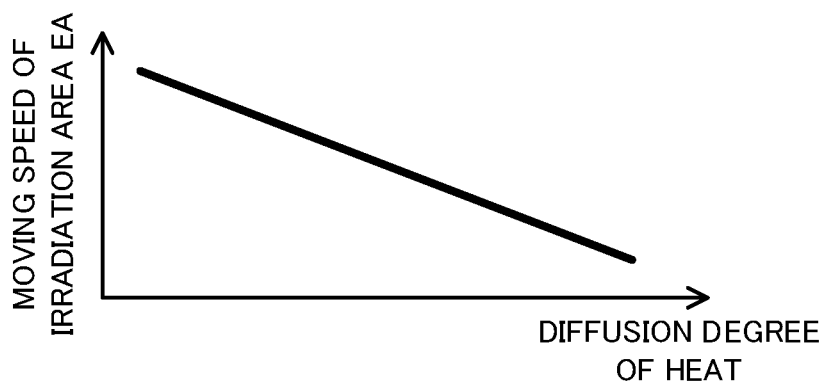

FIG. 24 is a graph that illustrates the moving speed of the irradiation area that is controlled on the basis of the diffusion degree of the heat to reduce the variation in the height of the build object.

Figure 25A:
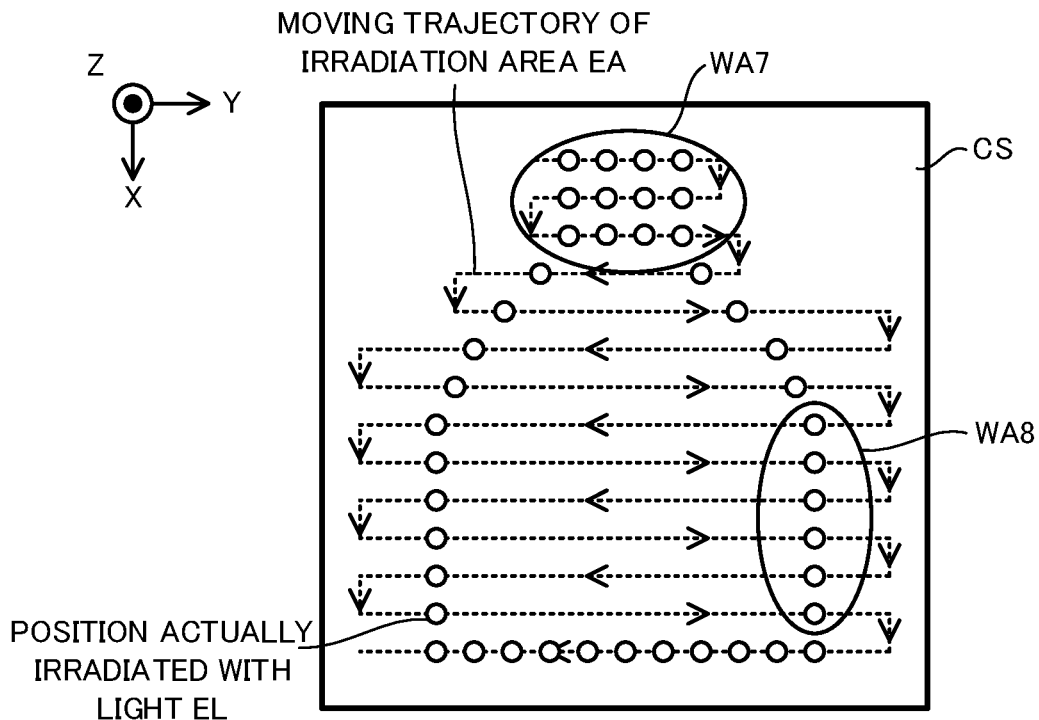
Figure 25B:
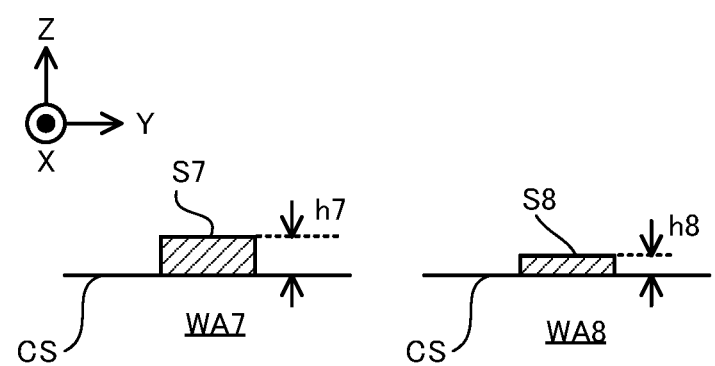

FIG. 25A is a perspective view that illustrates an example of positions of an area that is irradiated with light EL with relatively high frequency and an area that is irradiated with the light EL with relatively low frequency, and FIG. 25B is a cross-sectional view that illustrates a build object formed at the area that is irradiated with the light EL with relatively high frequency and a build object formed at the area that is irradiated with the light EL with relatively low frequency.

Figure 26:
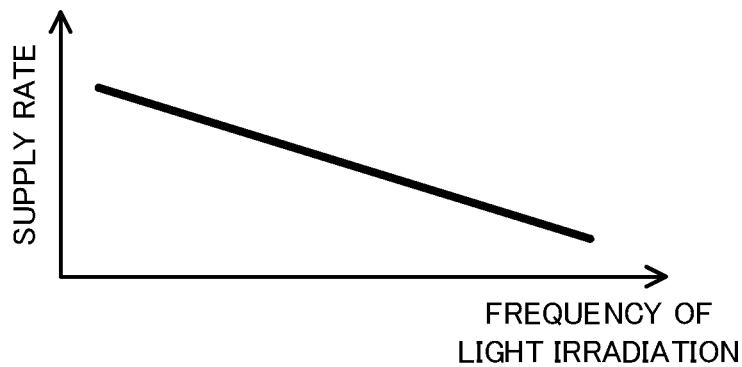

FIG. 26 is a graph that illustrates the supply rate of the build materials that is controlled on the basis of the frequency of the light irradiation to reduce the variation in the height of the build object.

Figure 27:
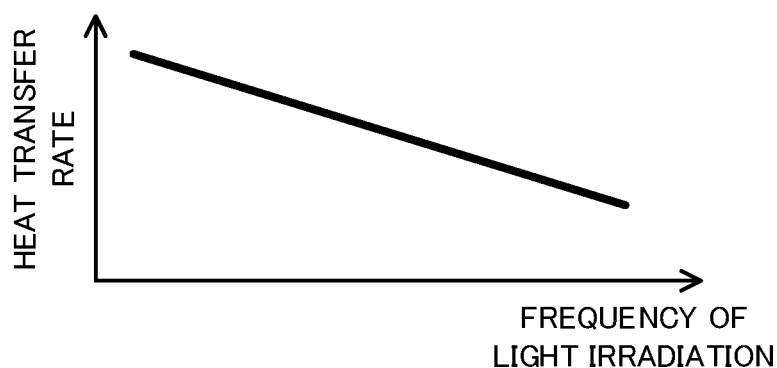

FIG. 27 is a graph that illustrates the heat transfer rate that is controlled on the frequency of the light irradiation to reduce the variation in the height of the build object.

Figure 28:
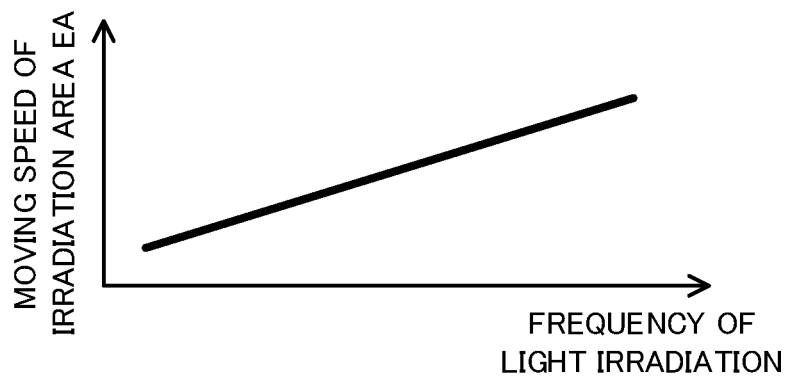

FIG. 28 is a graph that illustrates the moving speed of the irradiation area that is controlled on the frequency of the light irradiation to reduce the variation in height of the build object.

Figure 29:
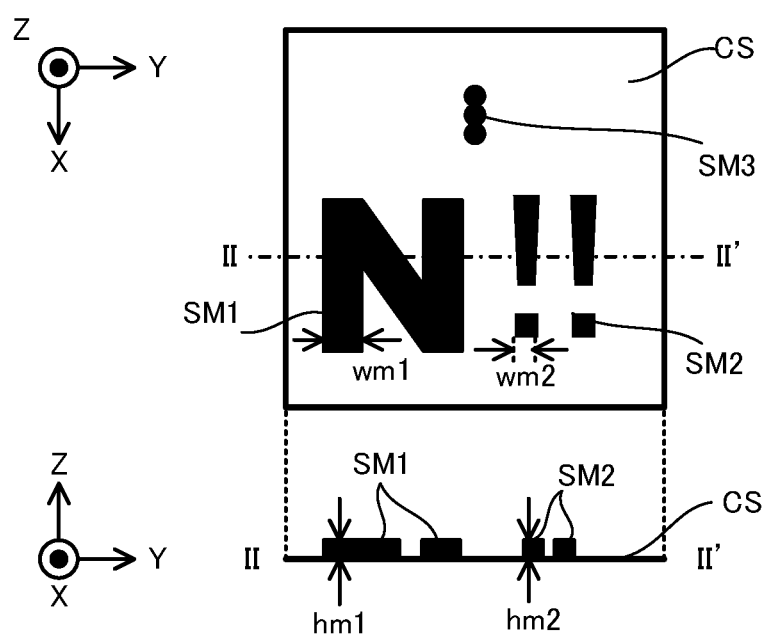

FIG. 29 is a plan view and a cross-sectional view that illustrate marks formed on the build surface.

Figure 30A:
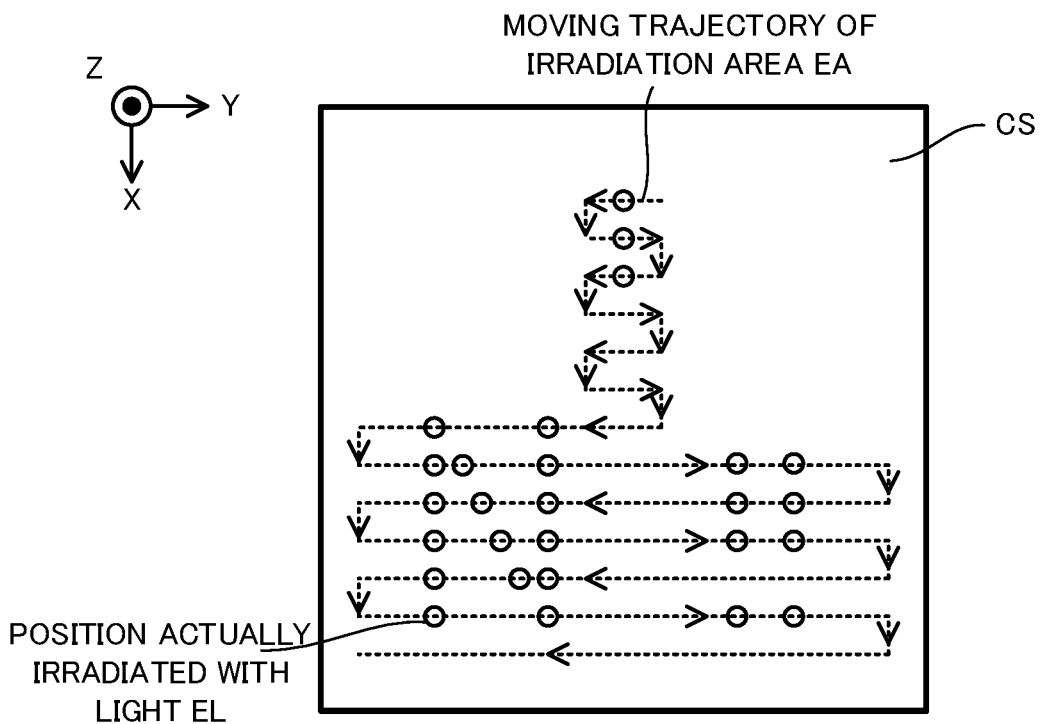
Figure 30B:
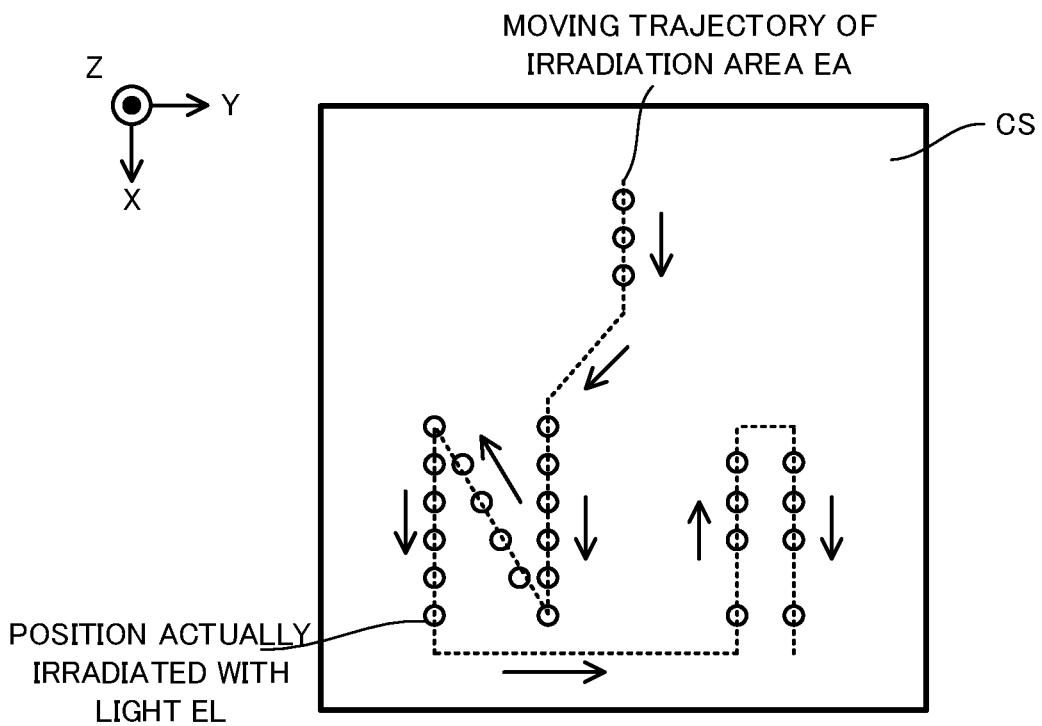
Figure 31A:
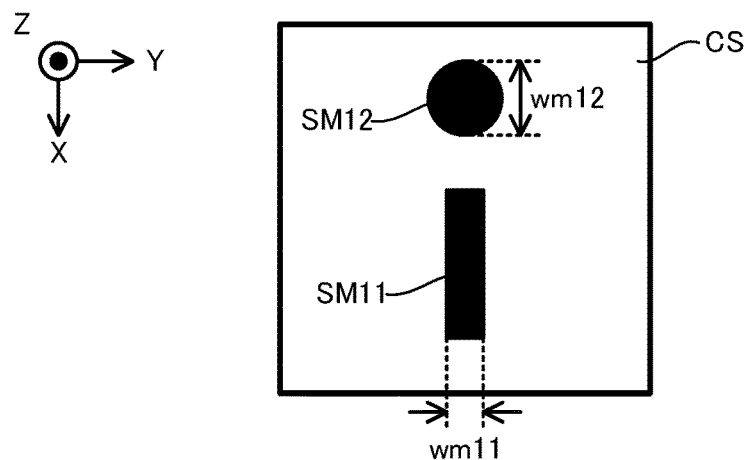
Figure 31B:
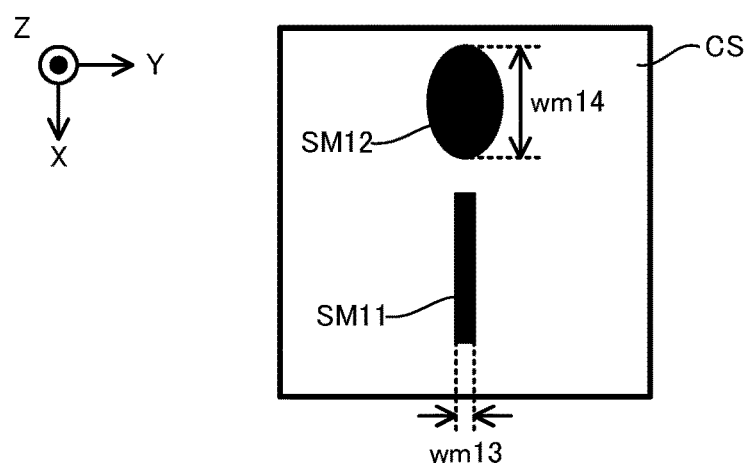
Figure 31C:
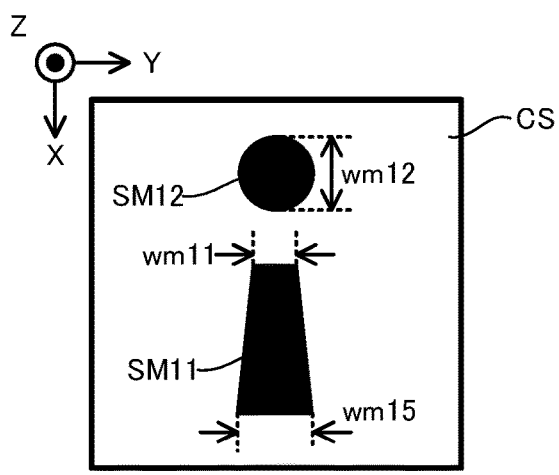
Figure 31D:
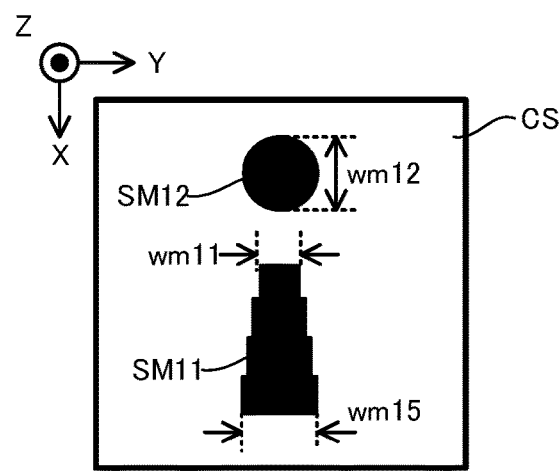

Each of FIG. 30A and FIG. 30B is a plan view that illustrates a moving trajectory of the irradiation area on the build surface when the marks illustrated in FIG. 29 are formed.

Each of FIG. 31A to FIG. 31D is a plan view that illustrates the marks with a size controlled by a size controlling operation.

Figure 32:
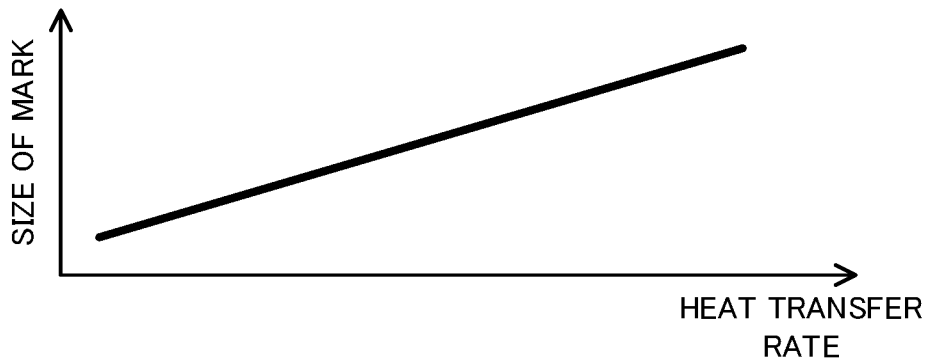

FIG. 32 is a graph that illustrates a relation between the heat transfer rate and the size of the mark.

Figure 33:
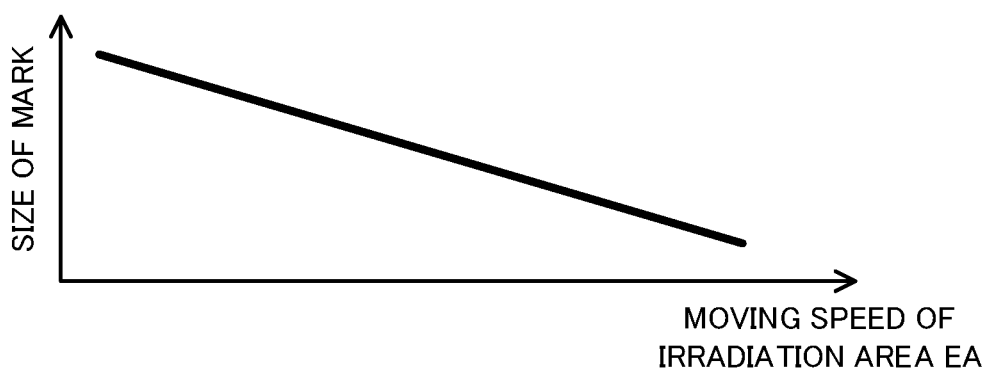

FIG. 33 is a graph that illustrates a relation between the moving speed of the irradiation area and the size of the mark.

Figure 34:

FIG. 34 is a graph that illustrates a relation between the size of the irradiation area and the size of the mark.

Figure 35A:
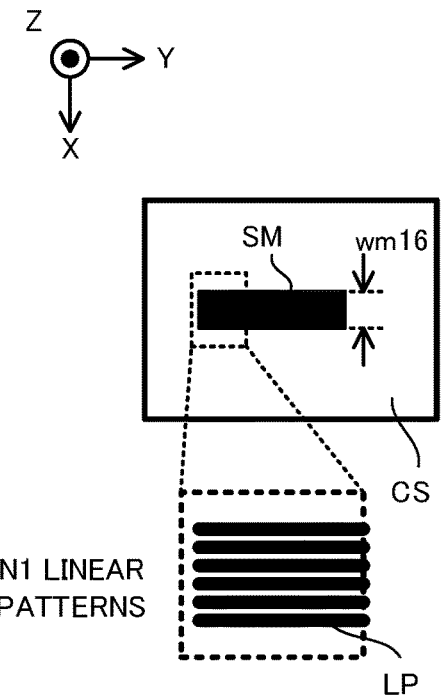
Figure 35B:
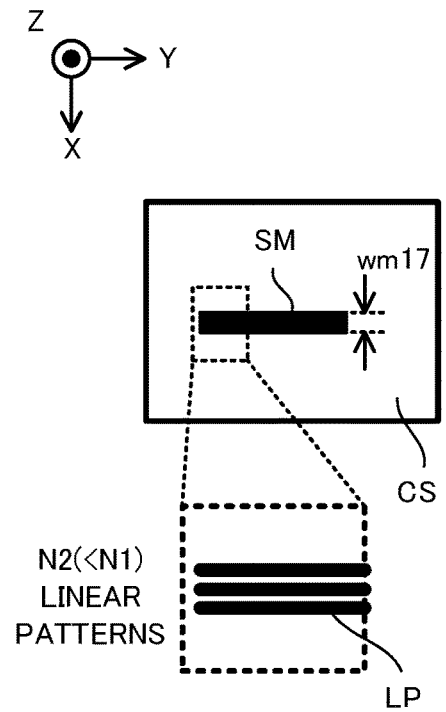
Figure 35C:
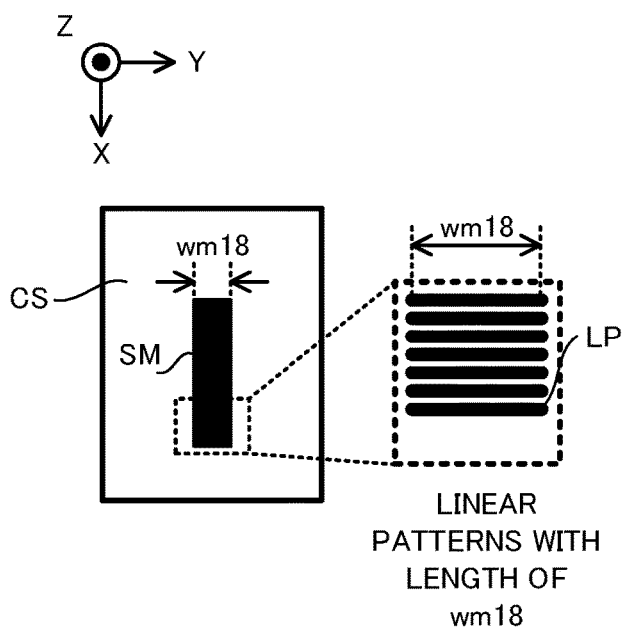
Figure 35D:
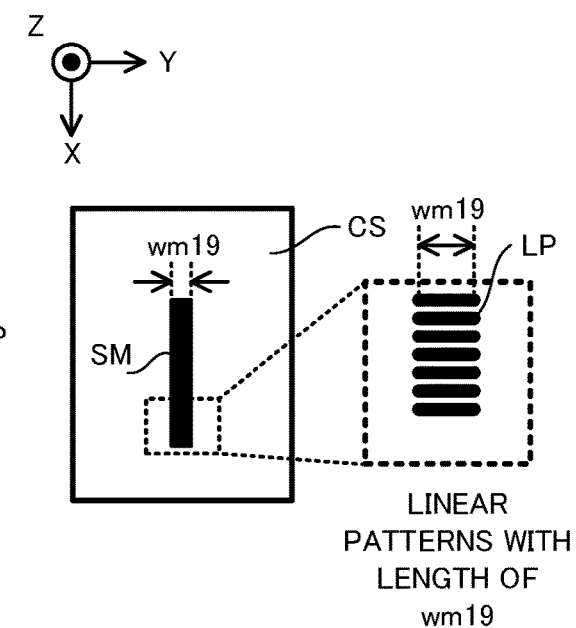
Figure 36A:
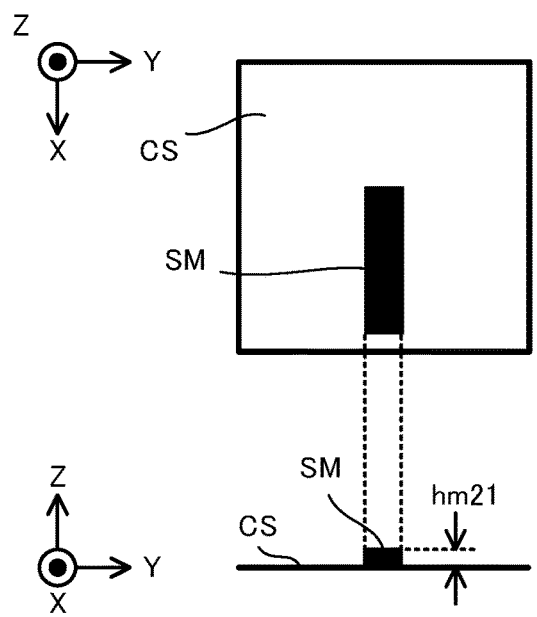
Figure 36B:
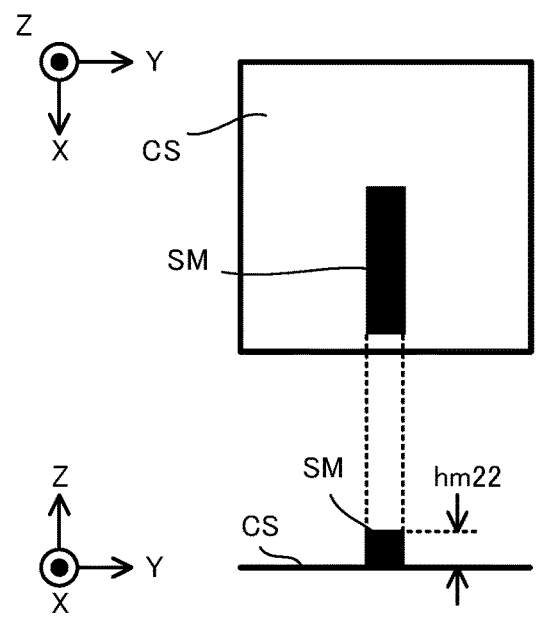
Figure 36C:
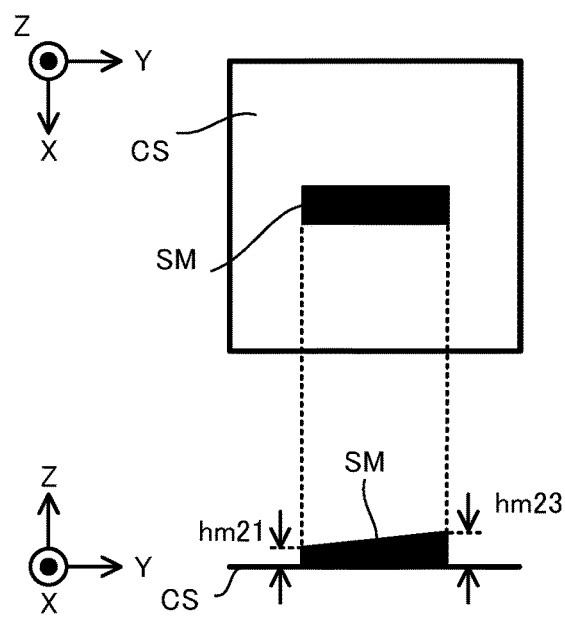
Figure 36D:
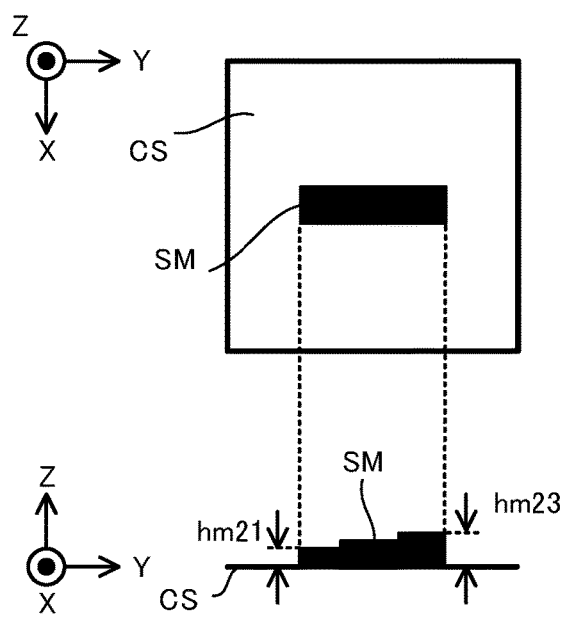

Each of FIG. 35A and FIG. 35B is a plan view that illustrates a relation between the size of the mark and the number of linear structural objects that constitute the mark, and Each of FIG. 35C and FIG. 35D is a plan view that illustrates a relation between the size of the mark and the length of the linear structural objects that constitute the mark.

Each of FIG. 36A to FIG. 36D is a plan view that illustrates the mark with a height controlled by a height controlling operation.

Figure 37:
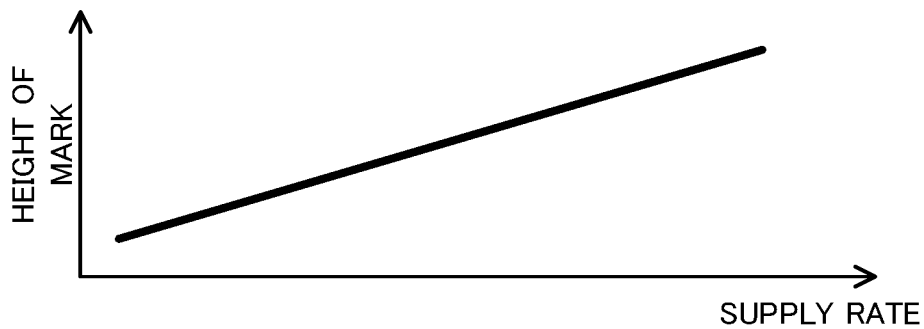

FIG. 37 is a graph that illustrates a relation between the supply rate and the height of the mark.

Figure 38:
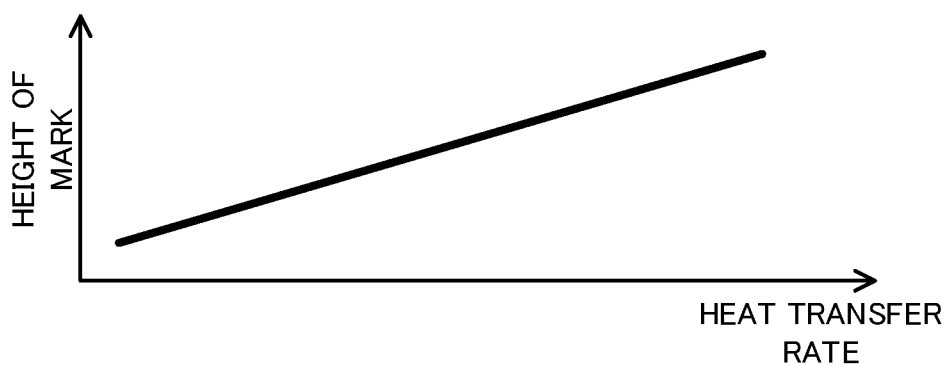

FIG. 38 is a graph that illustrates a relation between the heat transfer rate and the height of the mark.

Figure 39:
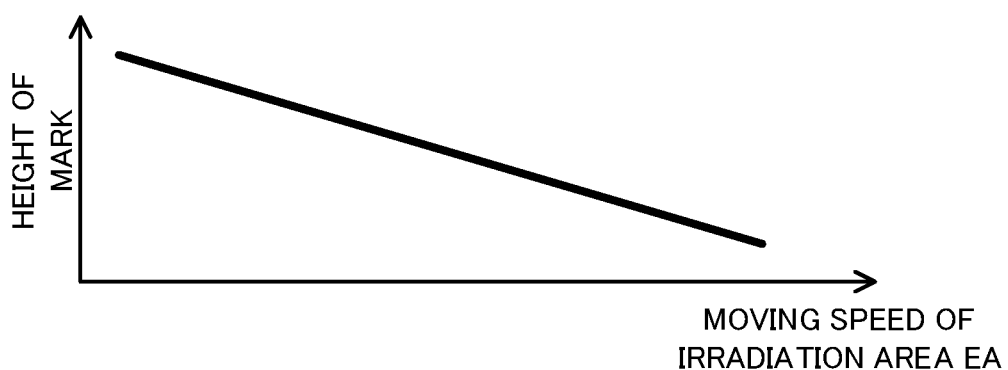

FIG. 39 is a graph that illustrates a relation between the moving speed of the irradiation area and the height of the mark.

Figure 40A:
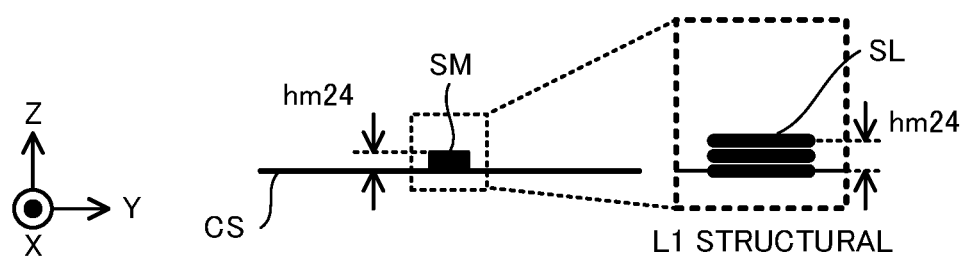
Figure 40B:
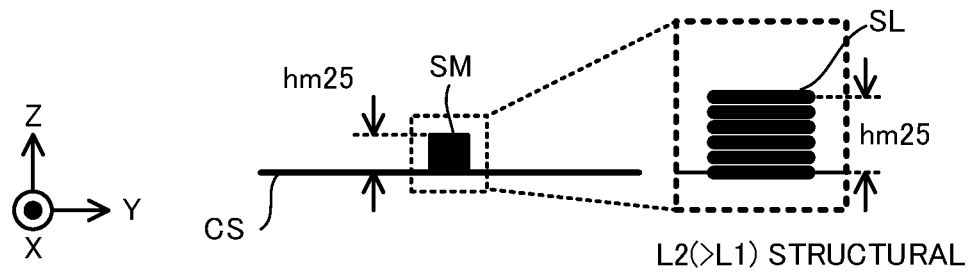

Each of FIG. 40A and FIG. 40B is a cross-sectional view that illustrates a relation between the height of the mark and the number of structural layers that constitute the mark.

Figure 41A:
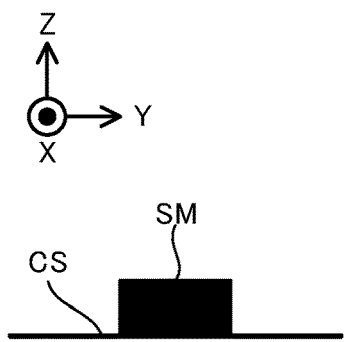
Figure 41B:
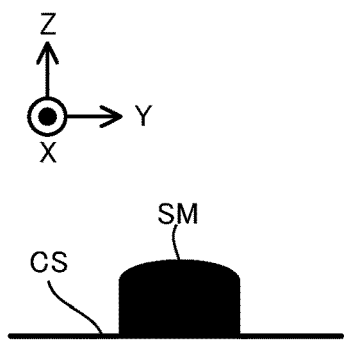
Figure 41C:
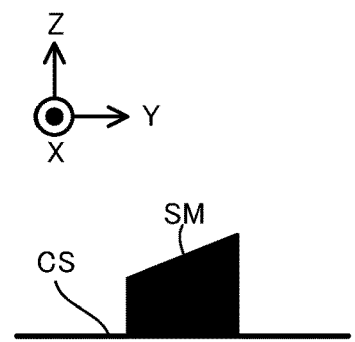

Each of FIG. 41A to FIG. 41C is a cross-sectional view that illustrates the mark with a shape of a surface controlled by a shape controlling operation.

Figure 42A:
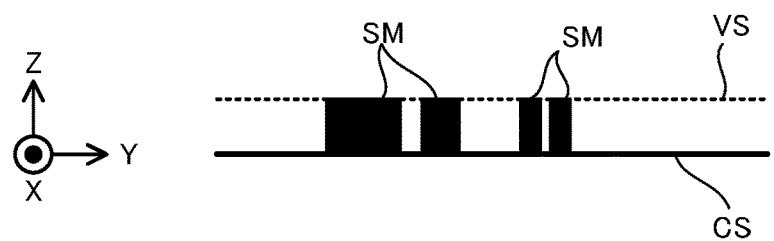
Figure 42B:
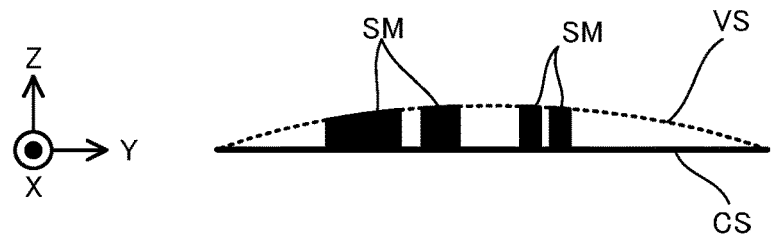
Figure 42C:
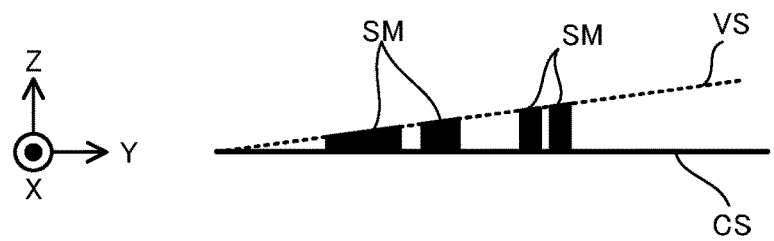

Each of FIG. 42A to FIG. 42C is a cross-sectional view that illustrates the mark with a shape of a connecting surface controlled by the shape controlling operation.

Figure 43A:
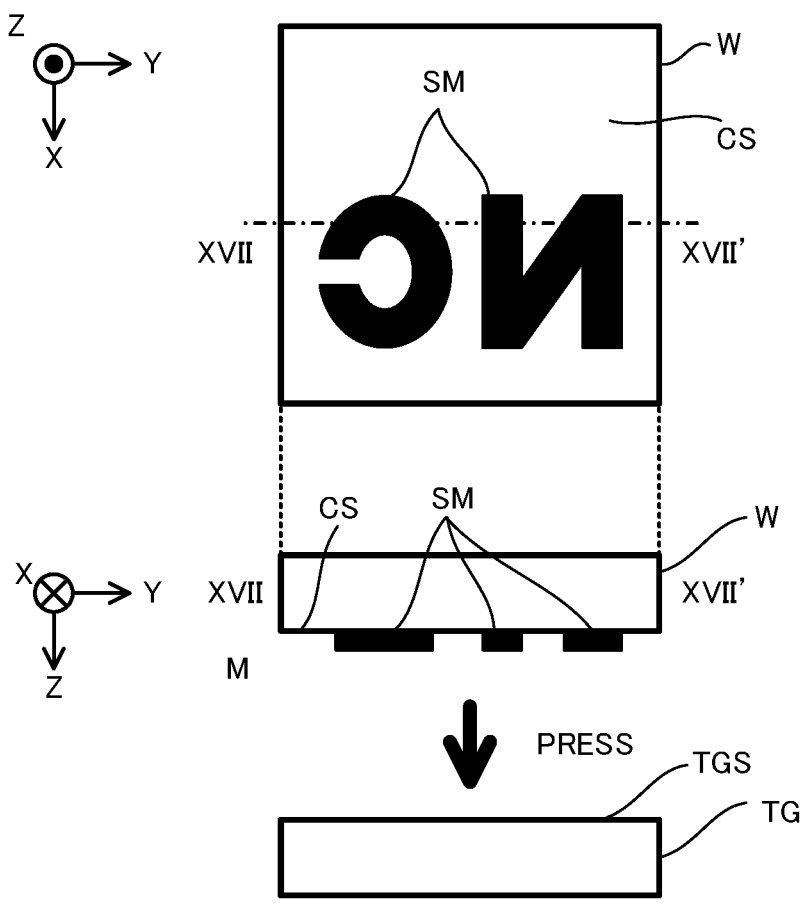
Figure 43B:
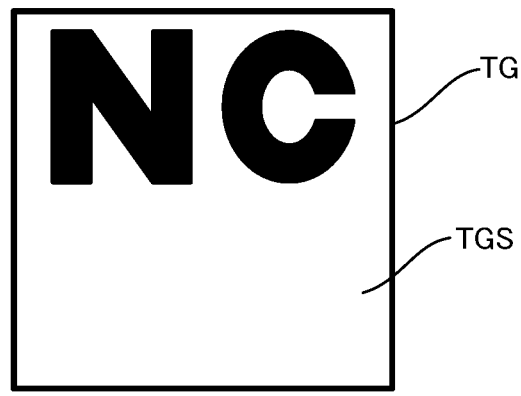

FIG. 43A is a plan view and a cross-sectional view that illustrate the mark for being pressed against a target object as a seal, and FIG. 43B is a plan view that illustrates a seal impression transferred to the target object against which the mark is pressed.

Figure 44A:
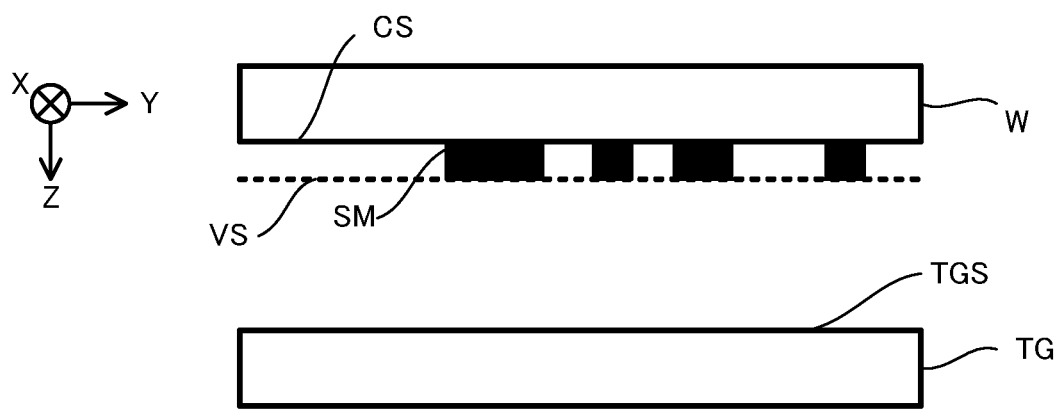
Figure 44B:
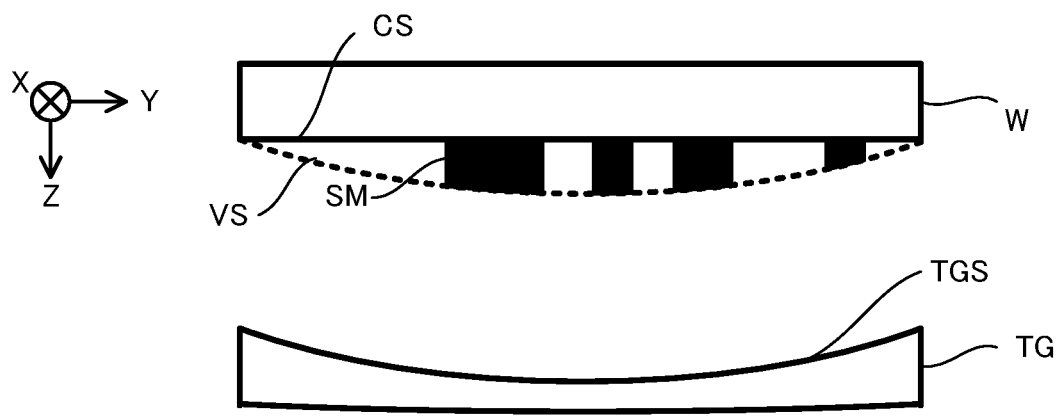
Figure 44C:
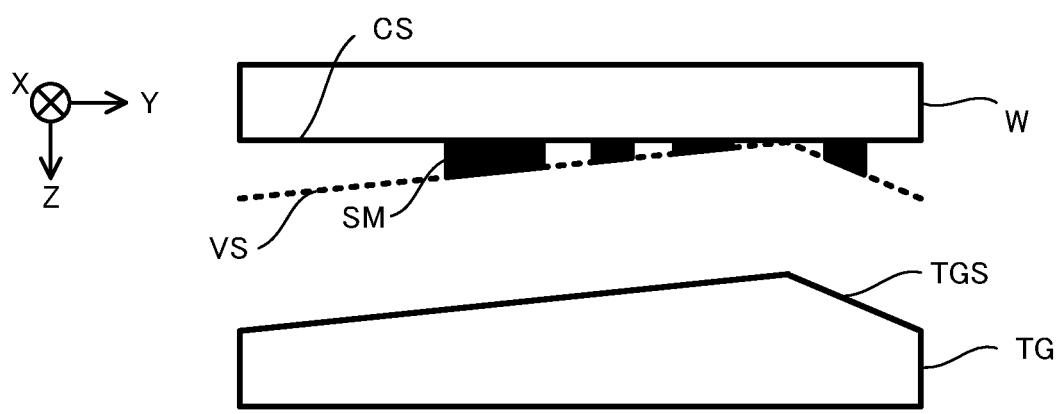

Each of FIG. 44A to FIG. 44C is a cross-sectional view that illustrates the mark that allows a connecting surface whose shape is controlled to have a complementary relationship with a target surface of the target object.

Figure 45A:
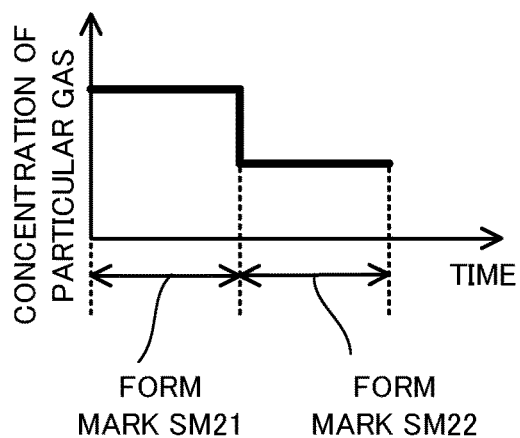
Figure 45B:
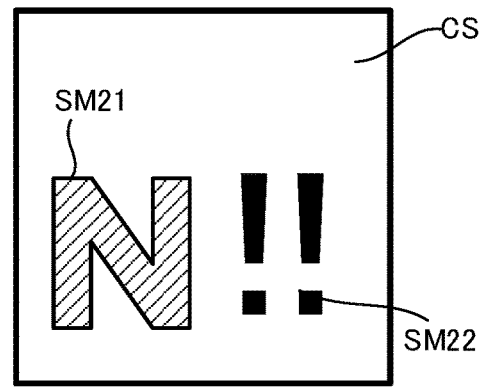
Figure 45C:
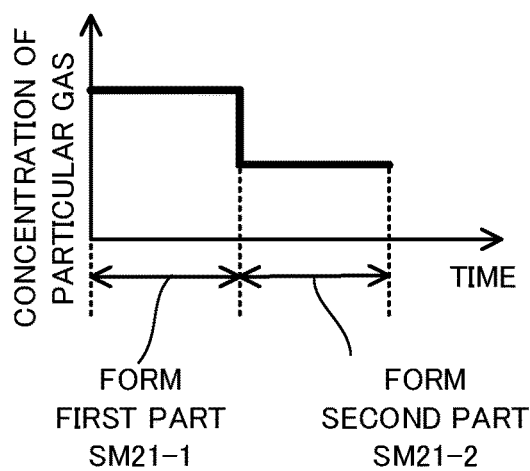
Figure 45D:
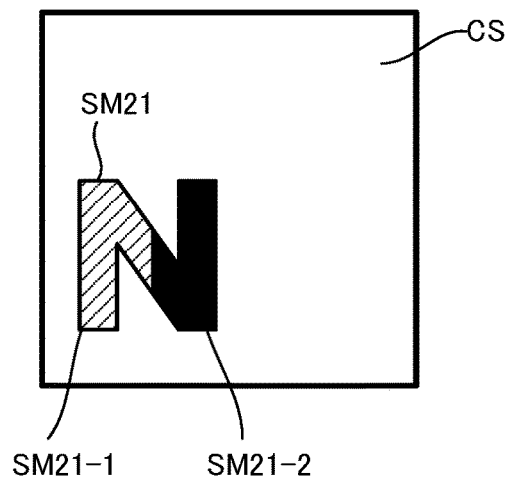

FIG. 45A is a graph that illustrates an example of a control aspect of controlling properties of a particular gas in a period of formation of a plurality of marks, FIG. 45B is a plan view that illustrates the plurality of marks formed when the properties of the particular gas are controlled in the control aspect illustrated in FIG. 45A, FIG. 45C is a graph that illustrates an example of a control aspect of controlling the properties of the particular gas in a period of formation of a single mark, and FIG. 45D is a plan view that illustrates the mark formed when the properties of the particular gas are controlled in the control aspect illustrated in FIG. 45C.

Figure 46A:
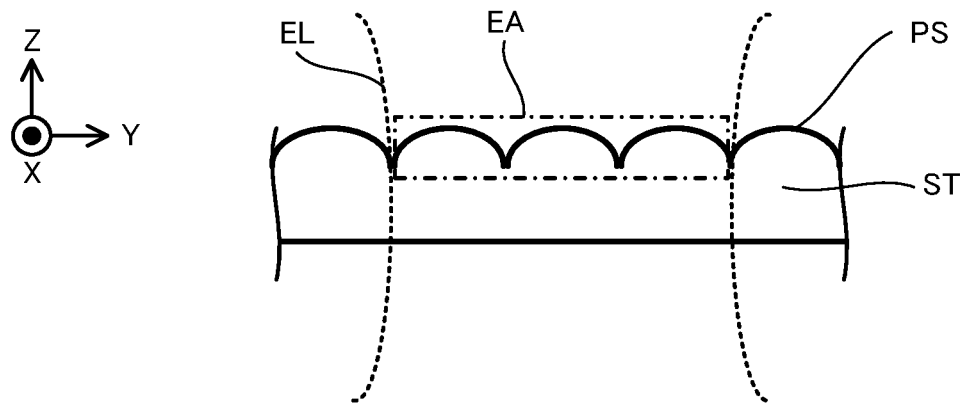
Figure 46B:
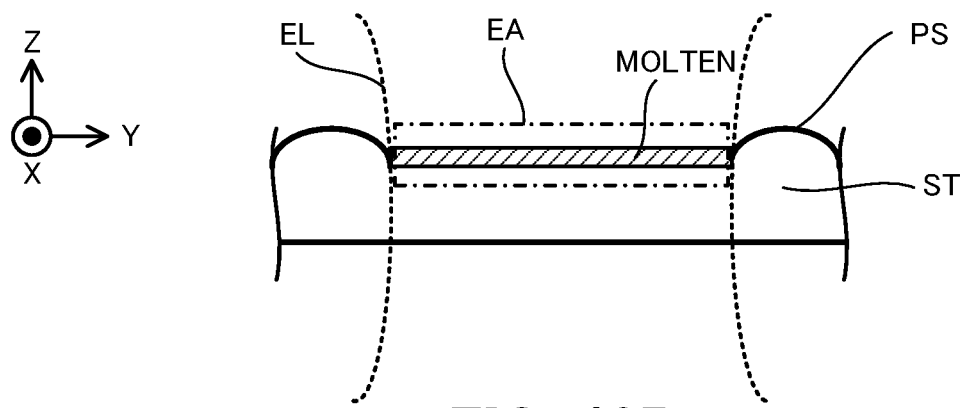
Figure 46C:
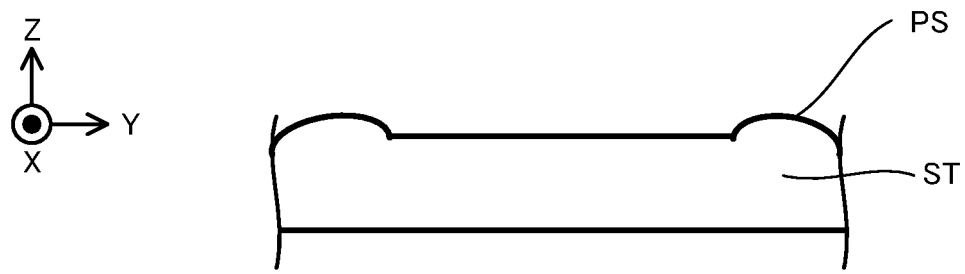

Each of FIG. 46A to FIG. 46C is a cross-sectional view that illustrates a state of the polishing target surface in a process for performing a polishing operation.

Figure 47A:
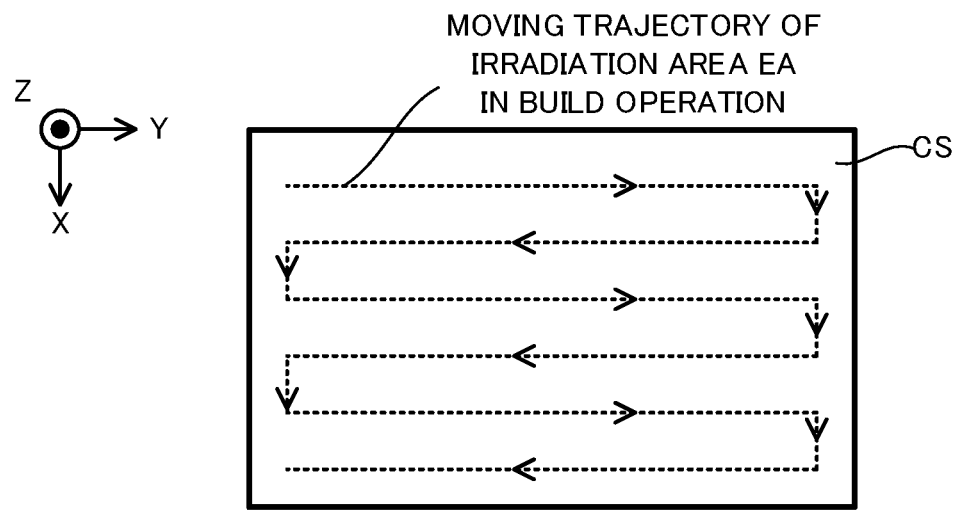
Figure 47B:
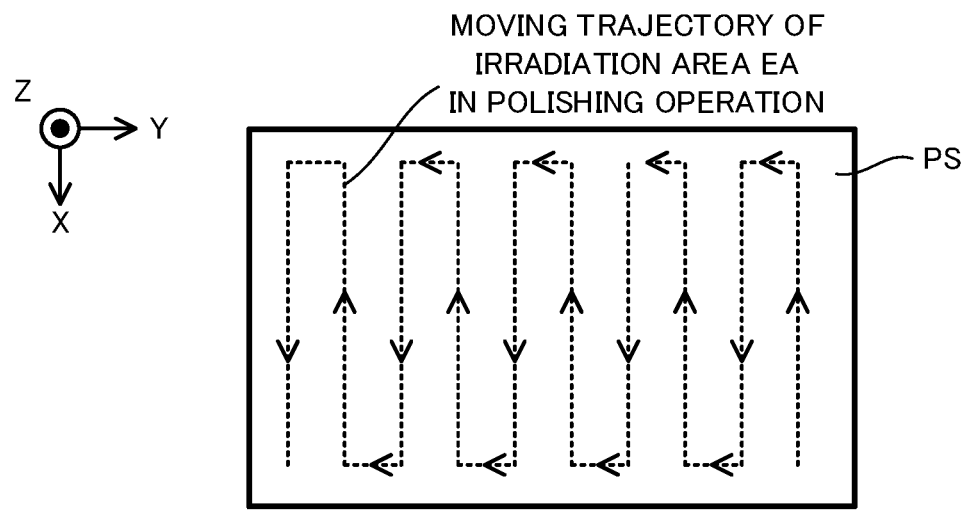

FIG. 47A is a plan view that illustrates a moving path of the irradiation area in a period of implementation of a build operation, and FIG. 47B is a plan view that illustrates a moving path of the irradiation area in a period of implementation of the polishing operation.

Figure 48A:
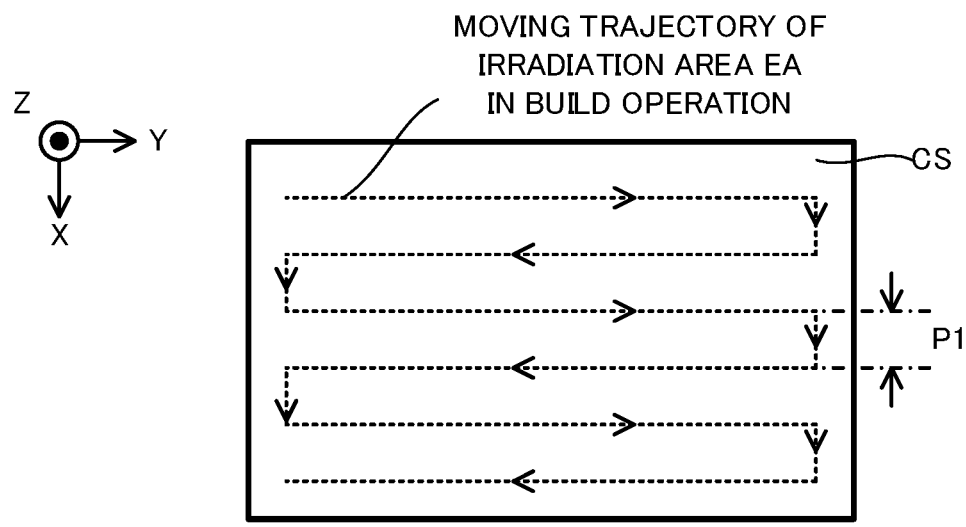
Figure 48B:
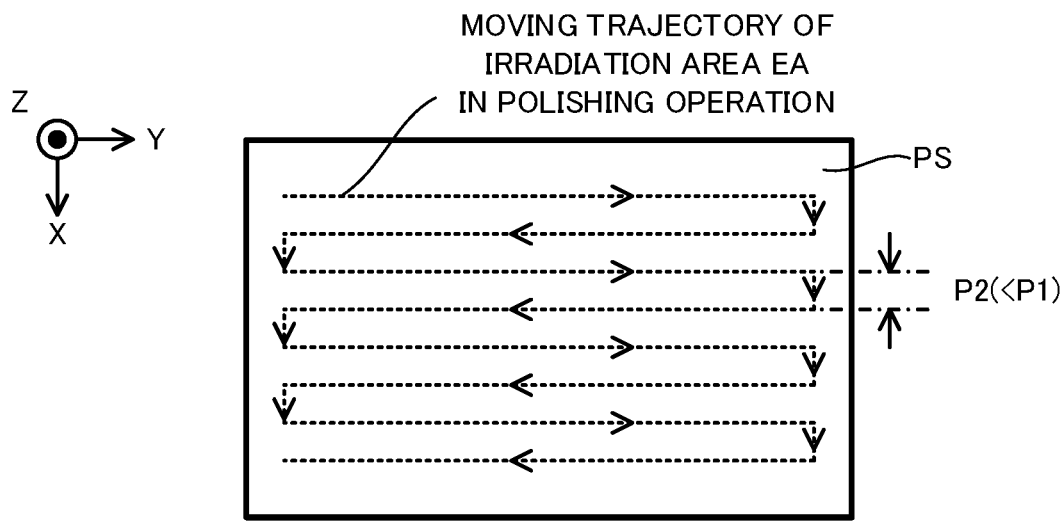

FIG. 48A is a plan view that illustrates a moving path of the irradiation area in a period of implementation of a build operation, and FIG. 48B is a plan view that illustrates a moving path of the irradiation area in a period of implementation of the polishing operation.

Figure 49:
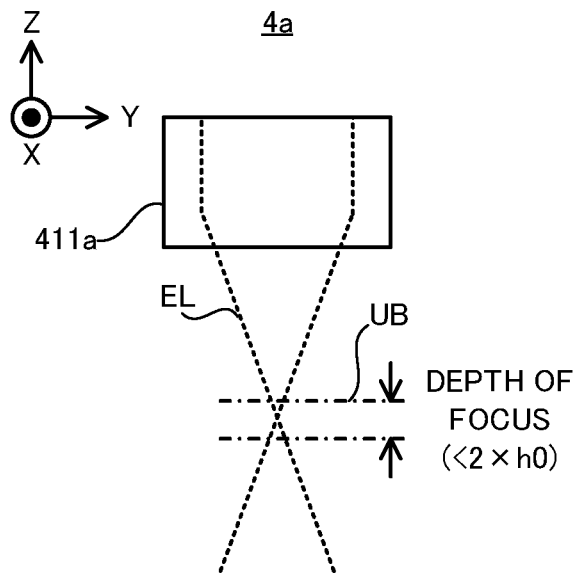

FIG. 49 is a cross-sectional view that illustrates the depth of focus of an irradiation optical system that is provided for a build system in a first modified example.

Figure 50A:
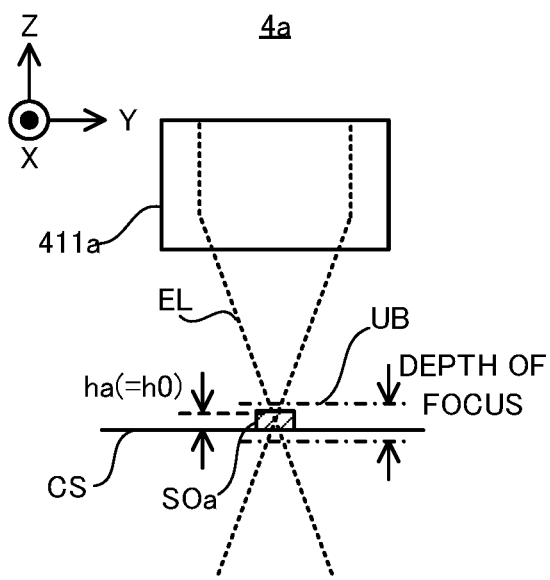
Figure 50B:
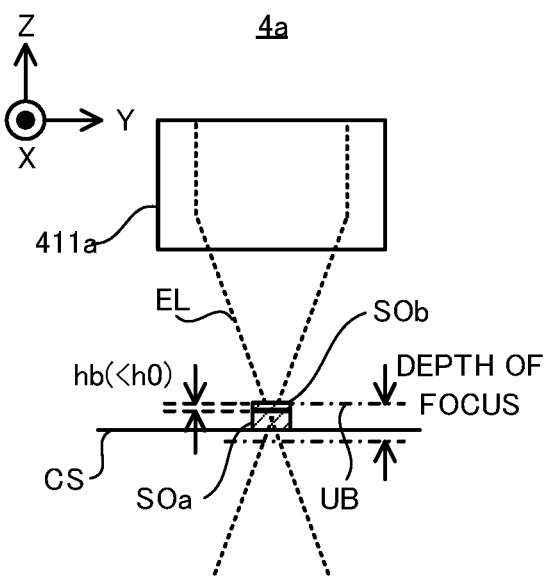

FIG. 50A is a cross-sectional view that illustrates structural layers formed by the build system in the first modified example when the irradiation area is set at a certain area part on the build surface, and FIG. 50B is a cross-sectional view that illustrates structural layers formed by the build system in the first modified example when the irradiation area is set again in the same area as the one illustrated in FIG. 50A.

Figure 51A:
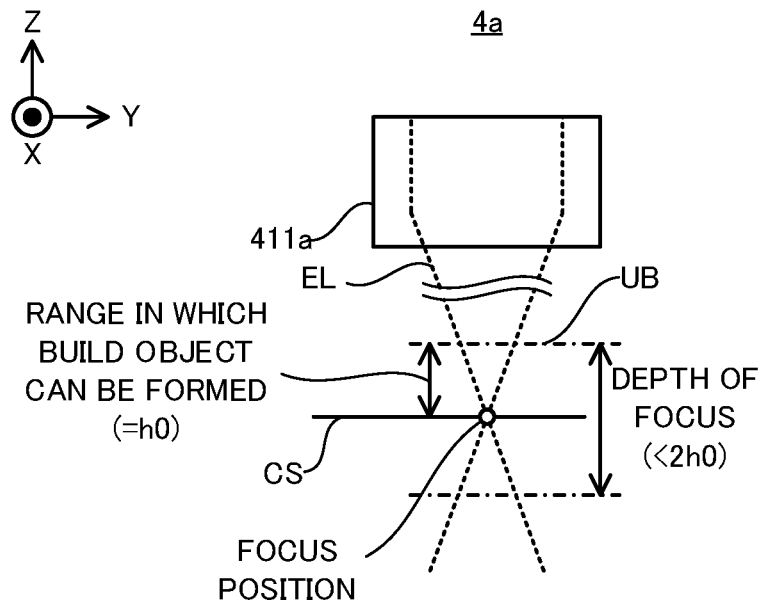
Figure 51B:
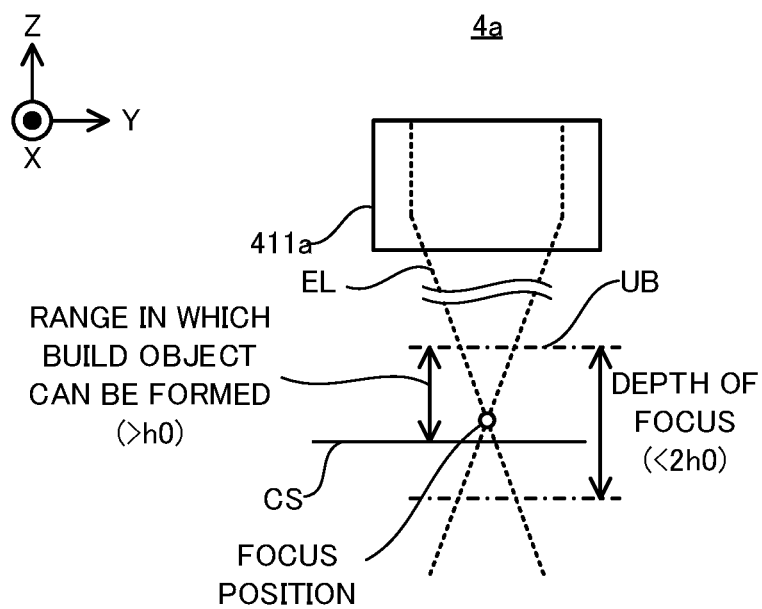

Each of FIG. 51A and FIG. 51B is a cross-sectional view that illustrates a positional relationship between the build surface and a range of the depth of focus of the irradiation optical system.

Figure 52:
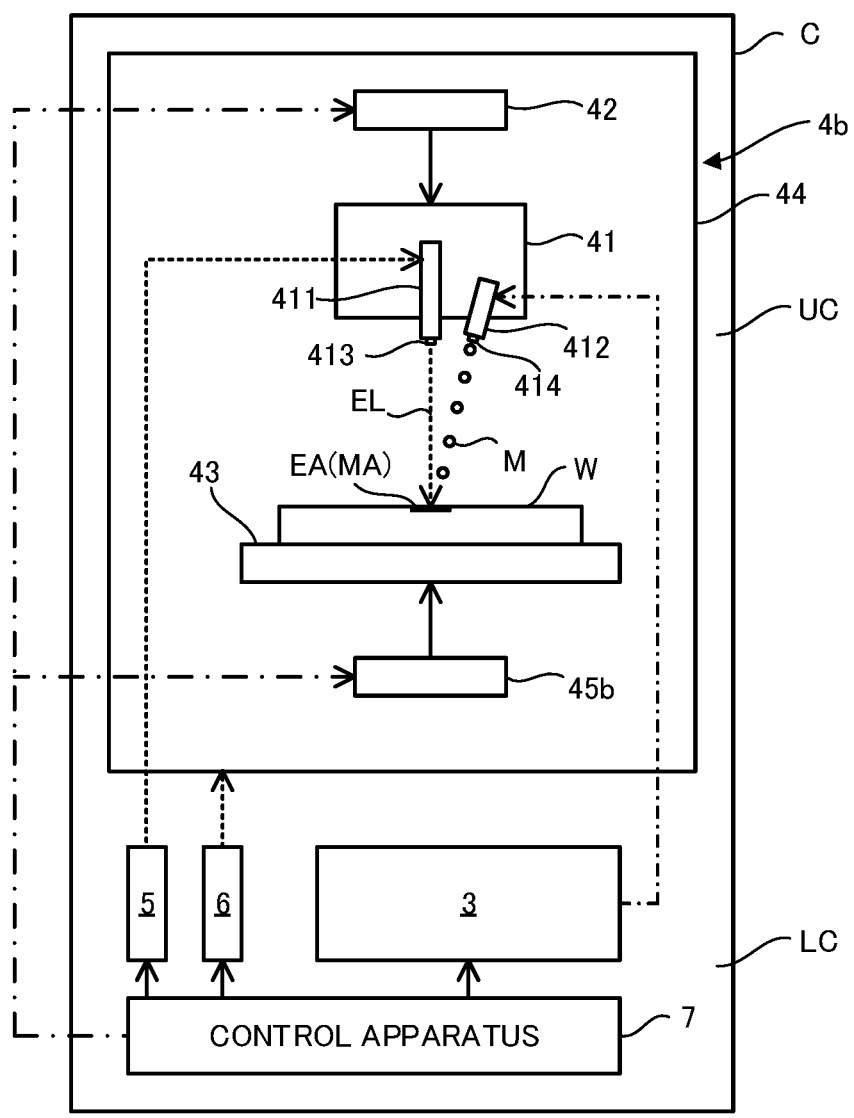

FIG. 52 is a cross-sectional view that illustrates a structure of a build system in a second modified example.

Figure 53A:
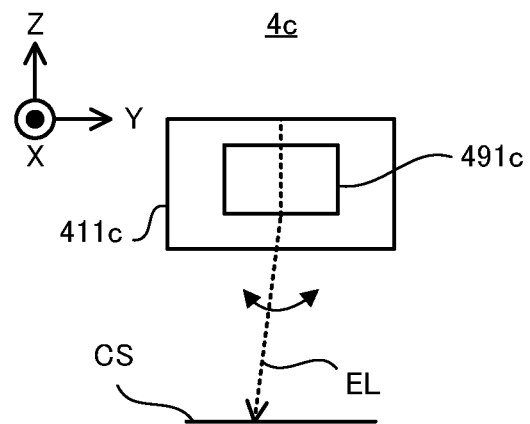
Figure 53B:
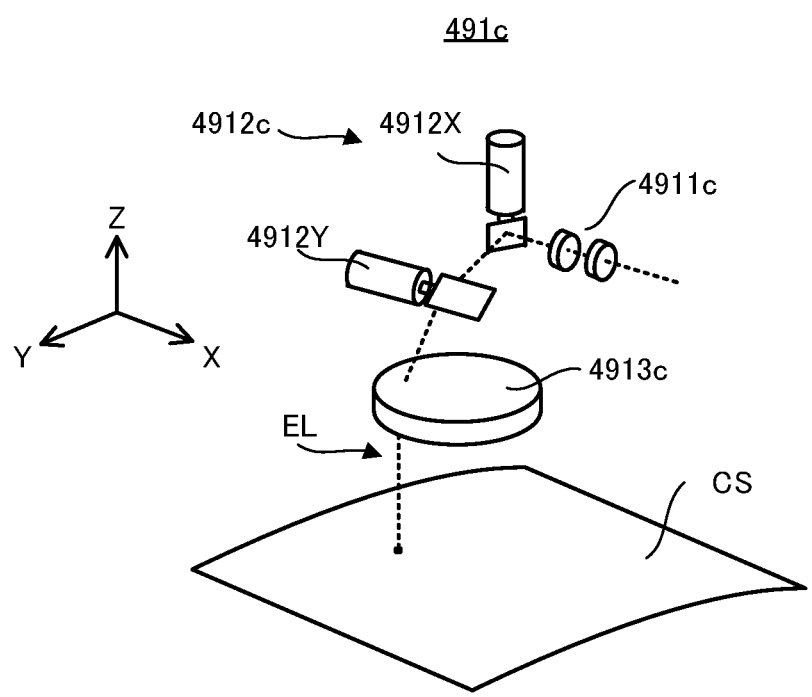

FIG. 53A is a cross-sectional view that illustrates a structure of an irradiation optical system that is provided for a build system in a third modified example, and FIG. 53B is a perspective view that illustrates a structure of an optical system that is provided for the irradiation optical system in the third modified example.

Figure 54:
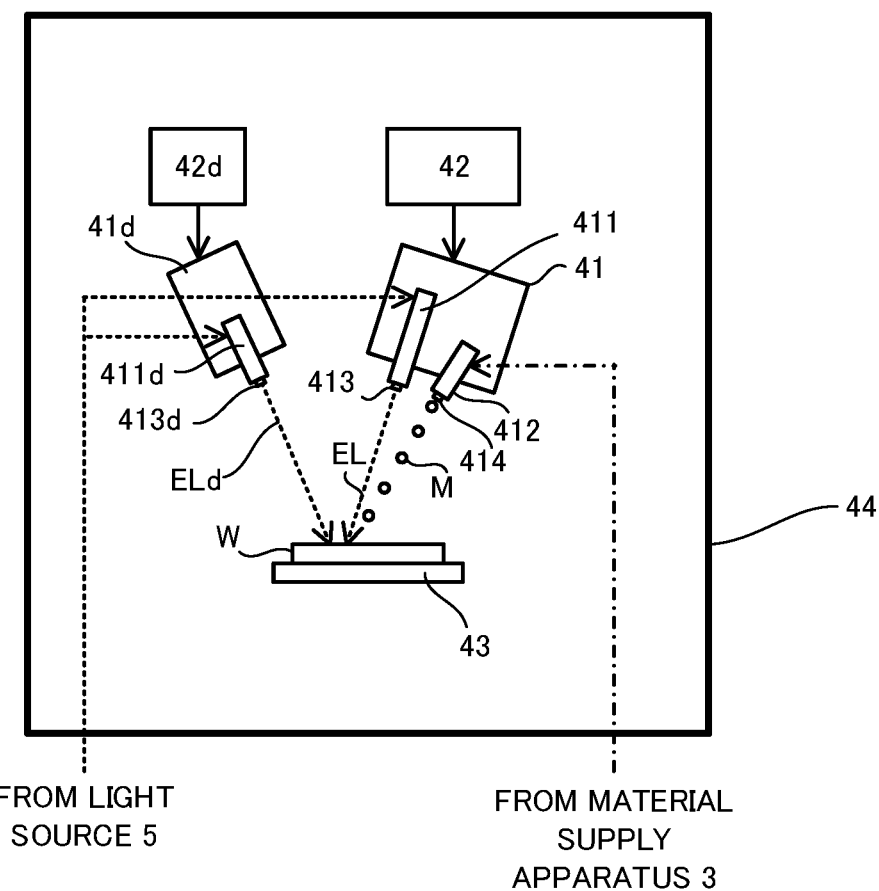

FIG. 54 is a cross-sectional view that illustrates a structure of a build apparatus that is provided for a build system in a fourth modified example.

Figure 55:
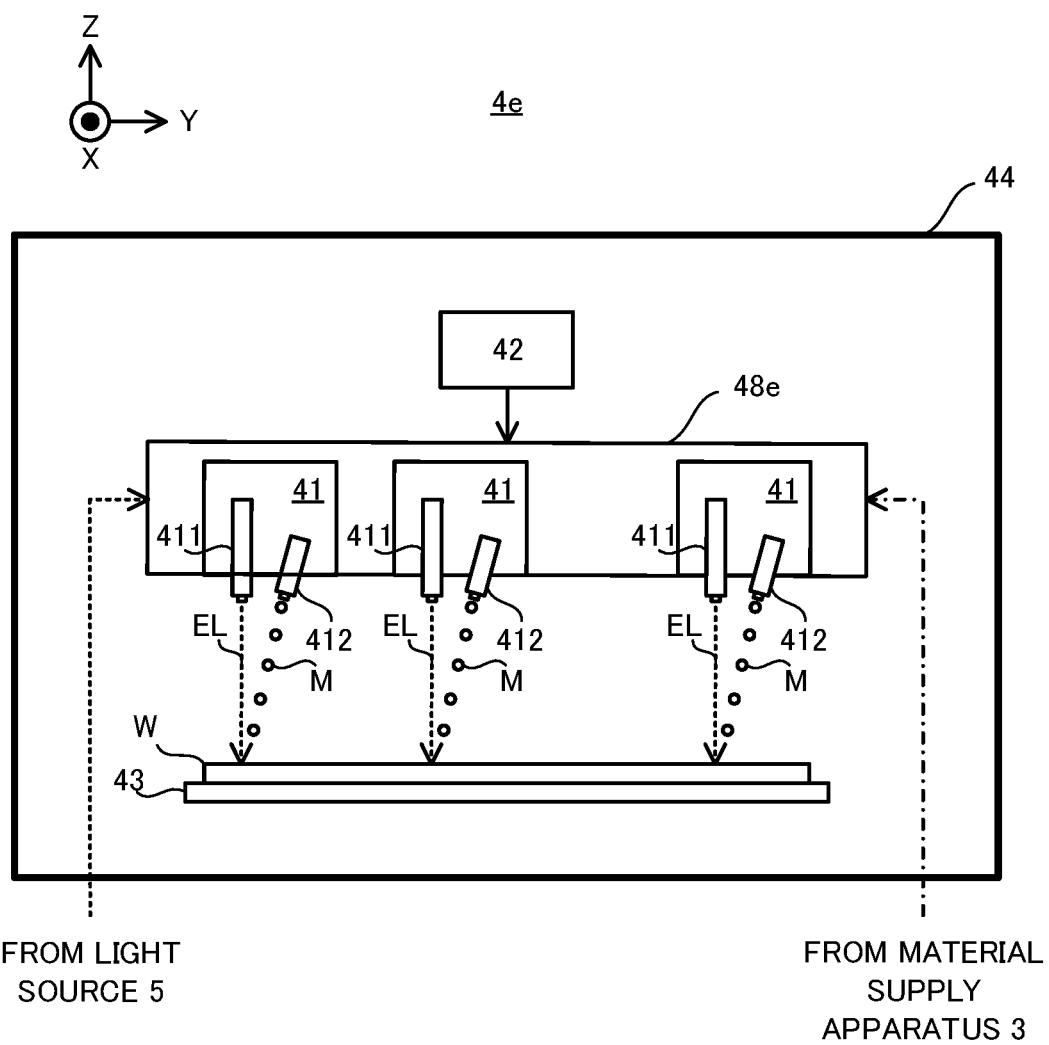

FIG. 55 is a cross-sectional view that illustrates a structure of a build apparatus that is provided for a build system in a fifth modified example.

Figure 56A:
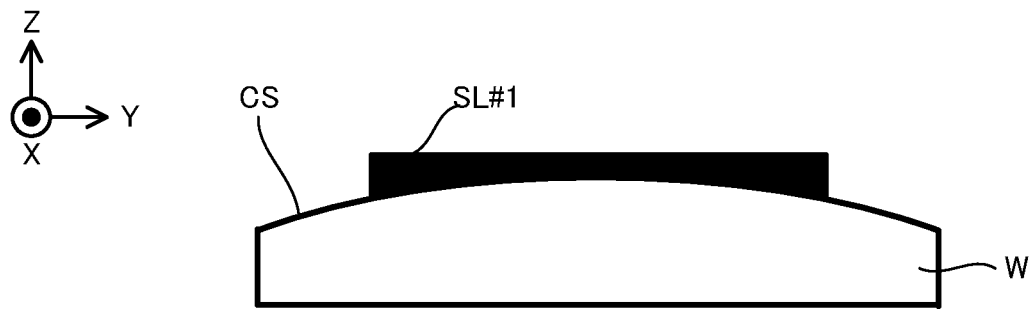
Figure 56B:
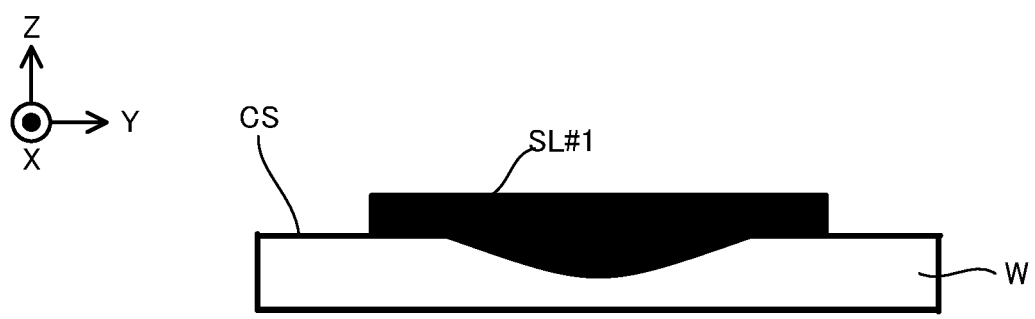
Figure 56C:
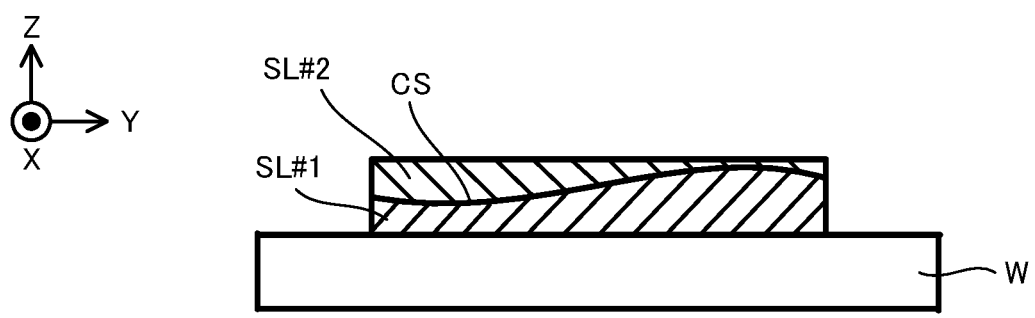

Each of FIG. 56A to FIG. 56C is a cross-sectional view that illustrates a structure of a build object that is formed in a sixth modified example.

Figure 57:
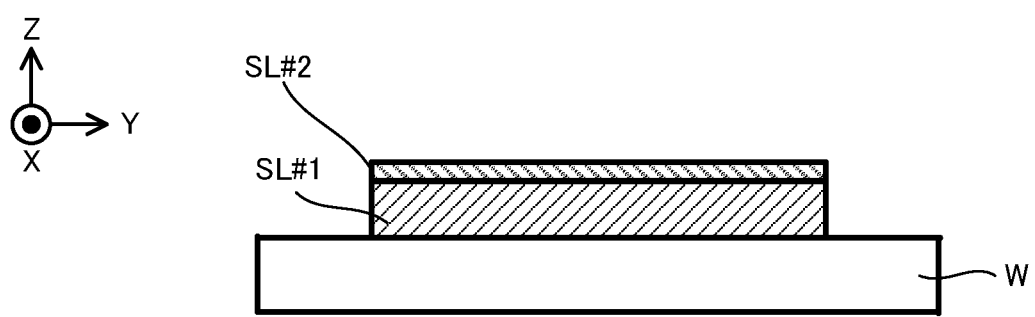

FIG. 57 is a cross-sectional view that illustrates a structure of a build object that is formed in a seventh modified example.

Figure 58A:
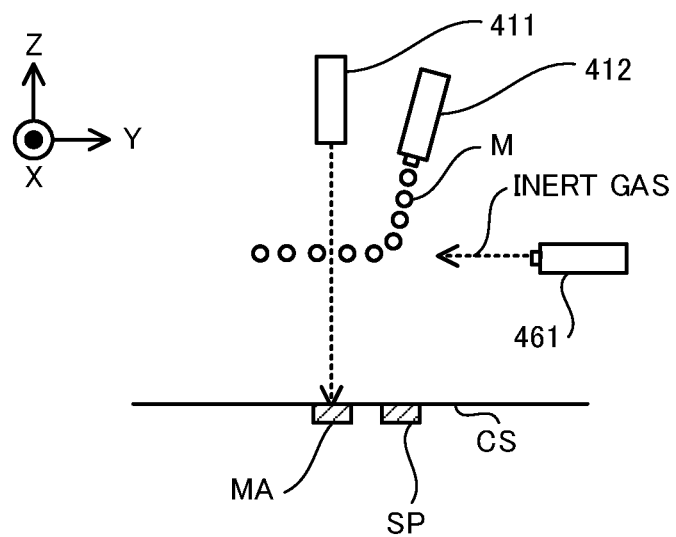
Figure 58B:
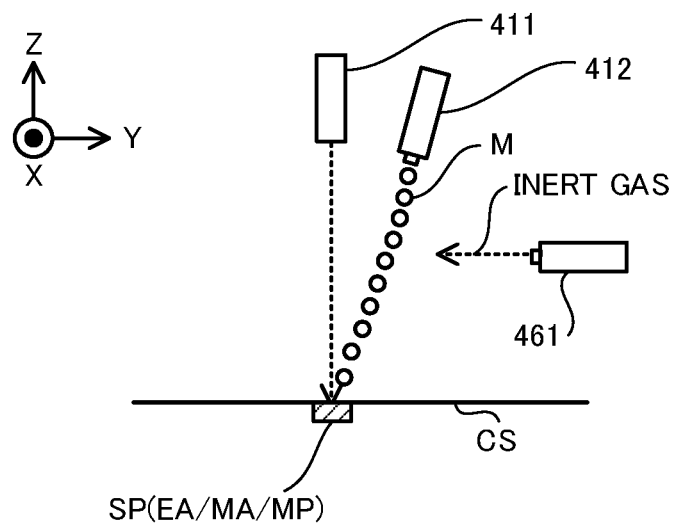

Each of FIG. 58A and FIG. 58B is a cross-sectional view that illustrates an operation in an eighth modified example.

Figure 59:
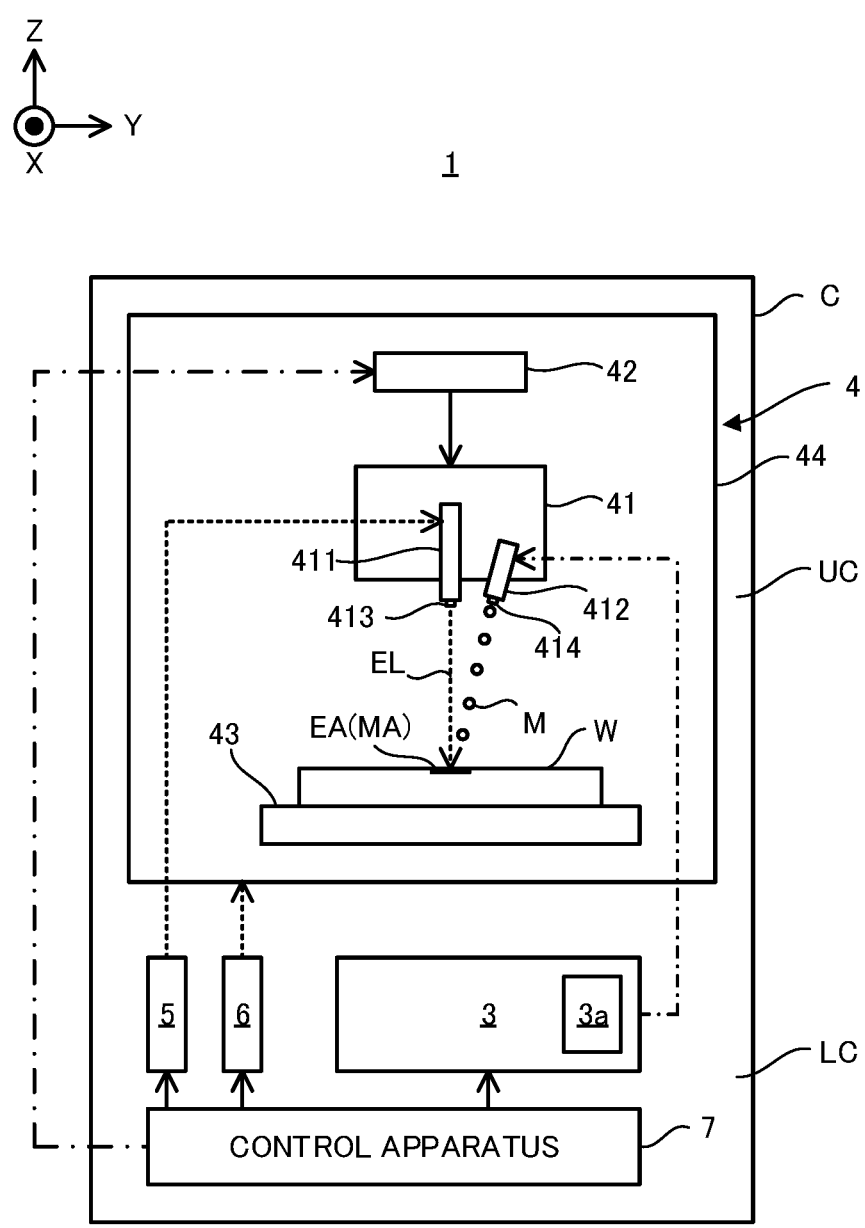

FIG. 59 is a cross-sectional view that illustrates an example of a supply amount change apparatus used in the eighth modified example.

Figure 60:
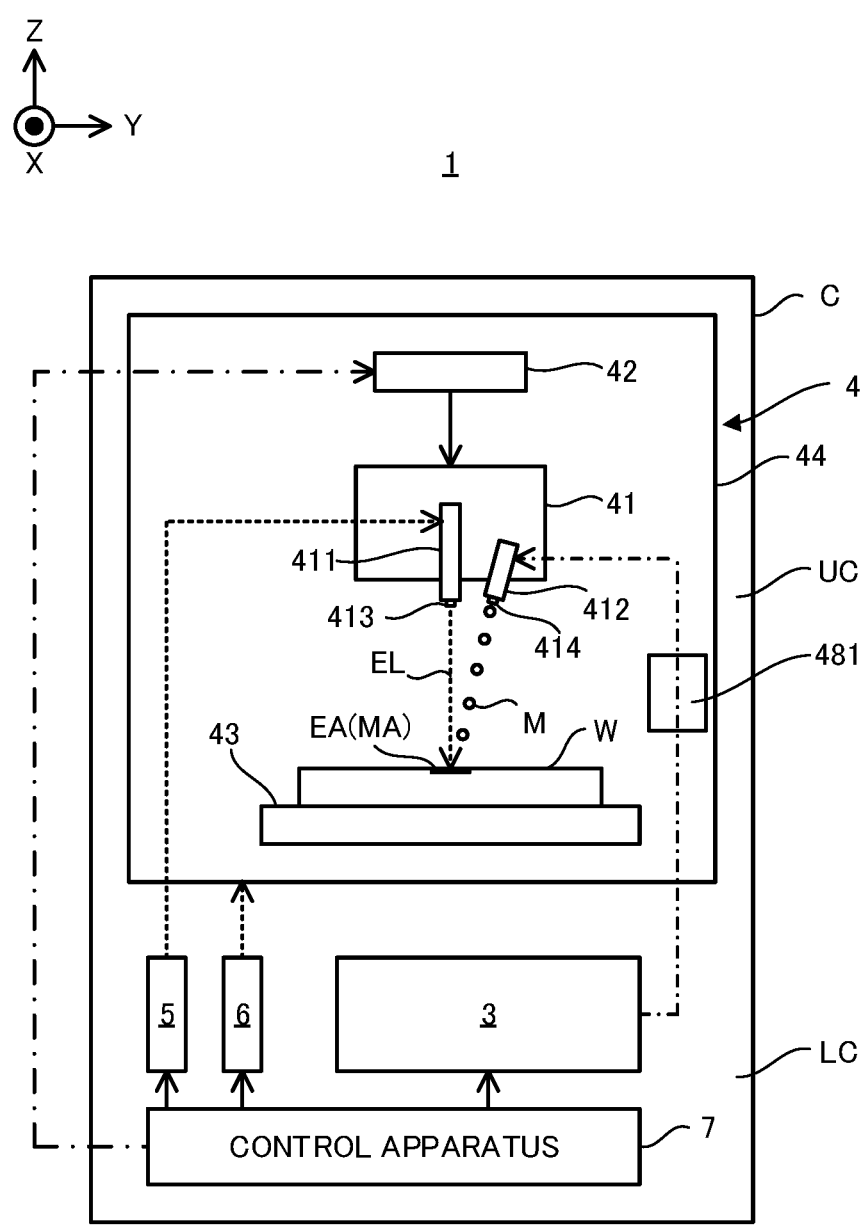

FIG. 60 is a cross-sectional view that illustrates an example of a supply amount change apparatus used in the eighth modified example.

Figure 61A:
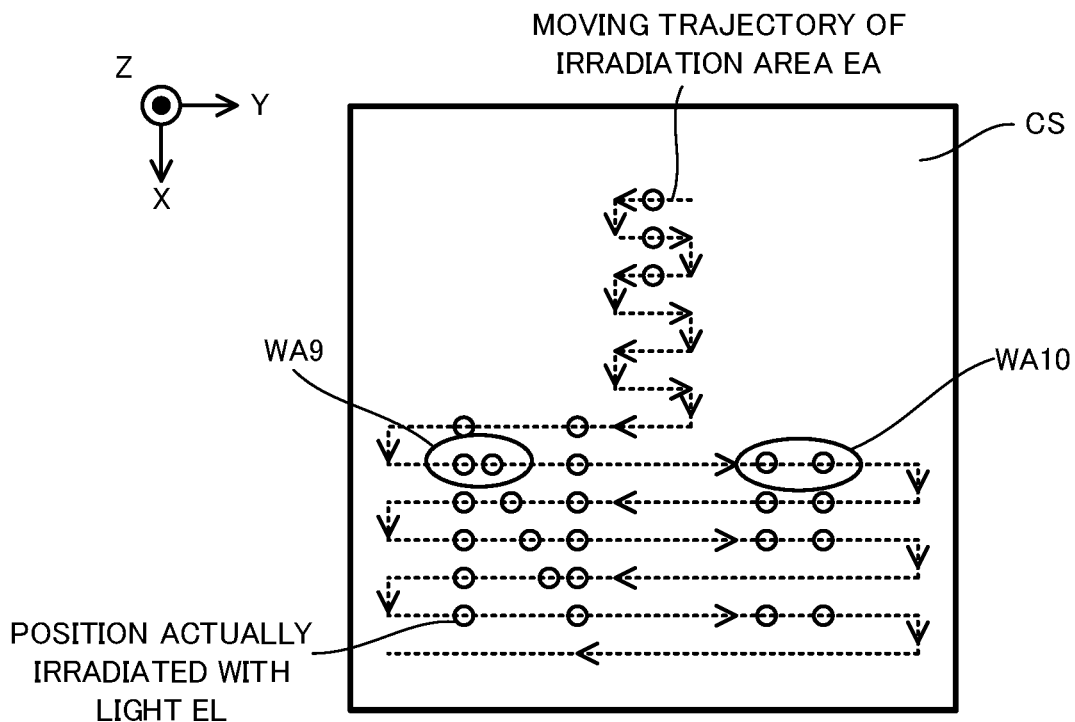
Figure 61B:
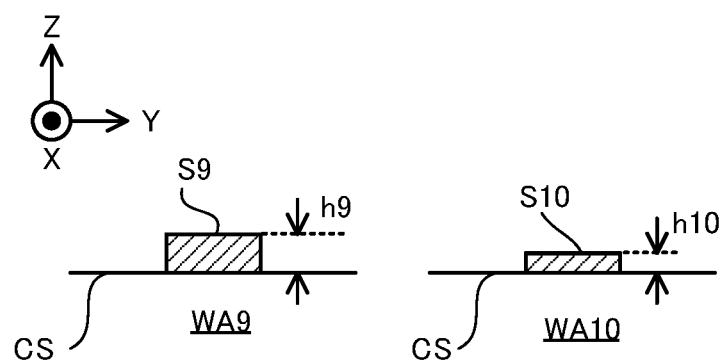

FIG. 61A is a plan view that illustrates a moving trajectory of the irradiation area on the build surface, and FIG. 61B is a cross-sectional view that illustrates a part of a build object that is formed when the irradiation area moves along the moving trajectory illustrated in FIG. 61A.

Figure 62A:
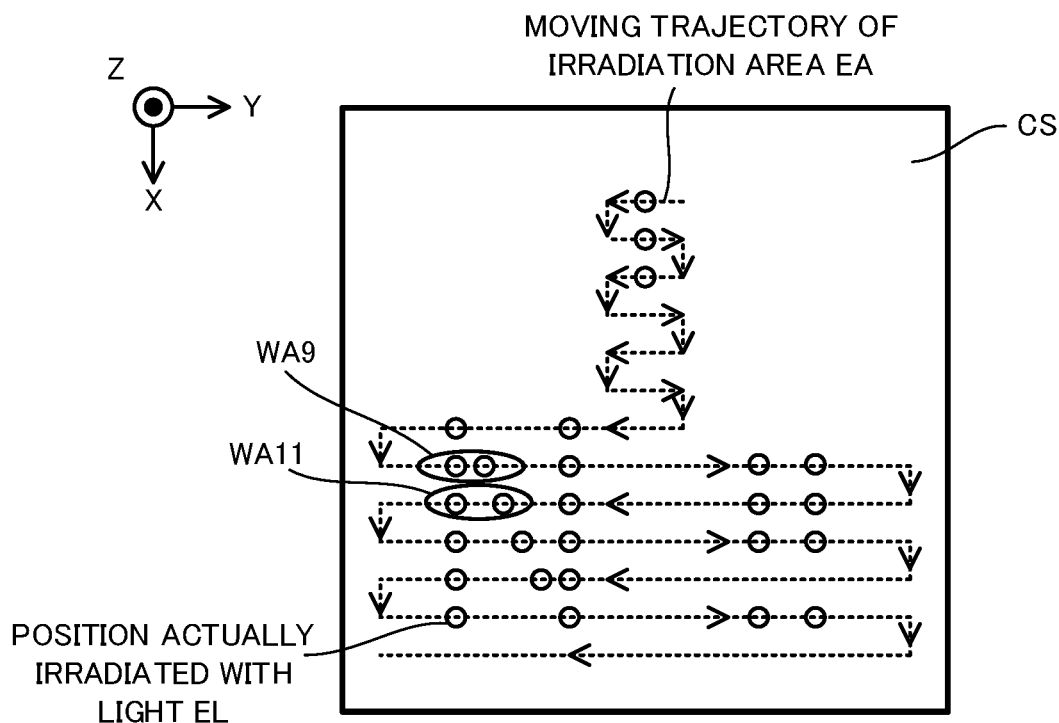
Figure 62B:
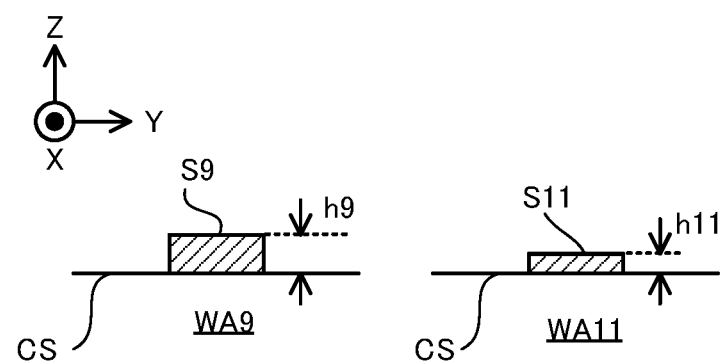

FIG. 62A is a plan view that illustrates a moving trajectory of the irradiation area on the build surface, and FIG. 62B is a cross-sectional view that illustrates a part of a build object that is formed when the irradiation area moves along the moving trajectory illustrated in FIG. 61A.

DESCRIPTION OF EMBODIMENTS

Next, with reference to drawings, embodiments of a processing apparatus, a processing method, a marking method, a build system, a build method, a computer program, a recording medium and a control apparatus will be described. In the below described description, the embodiments of a processing apparatus, a processing method, a marking method, a build system, a build method, a computer program, a recording medium and a control apparatus will be described by using a build system 1 that is configured to perform a process for forming a three-dimensional structural object ST by performing an additive processing using build materials M by a LMD (Laser Metal Deposition). Note that the Laser Metal Deposition may be referred to as a Direct Metal Deposition, a Direct Energy Deposition, a Laser Cladding, a Laser Engineered Net Shaping, a Direct Light Fabrication, a Laser Consolidation, a Shape Deposition Manufacturing, a Wire Feed Laser Deposition, a Gas Through Wire, a Laser Powder Fusion, a Laser Metal Forming, a Selective Laser Powder Re-melting, a Laser Direct Casting, a Laser Powder Deposition, a Laser Additive Manufacturing or a Laser Rapid Forming.

Moreover, in the below described description, a positional relationship of various components that constitute the build system 1 will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction), for the purpose of simple description. Moreover, rotational directions (in other words, inclination directions) around the X axis, the Y axis and the Z axis are referred to as a θX direction, a θY direction and a θZ direction, respectively. Here, the Z axis direction may be a gravity direction. An XY plane may be a horizontal direction.

(1) STRUCTURE OF BUILD SYSTEM 1

Figure 1:
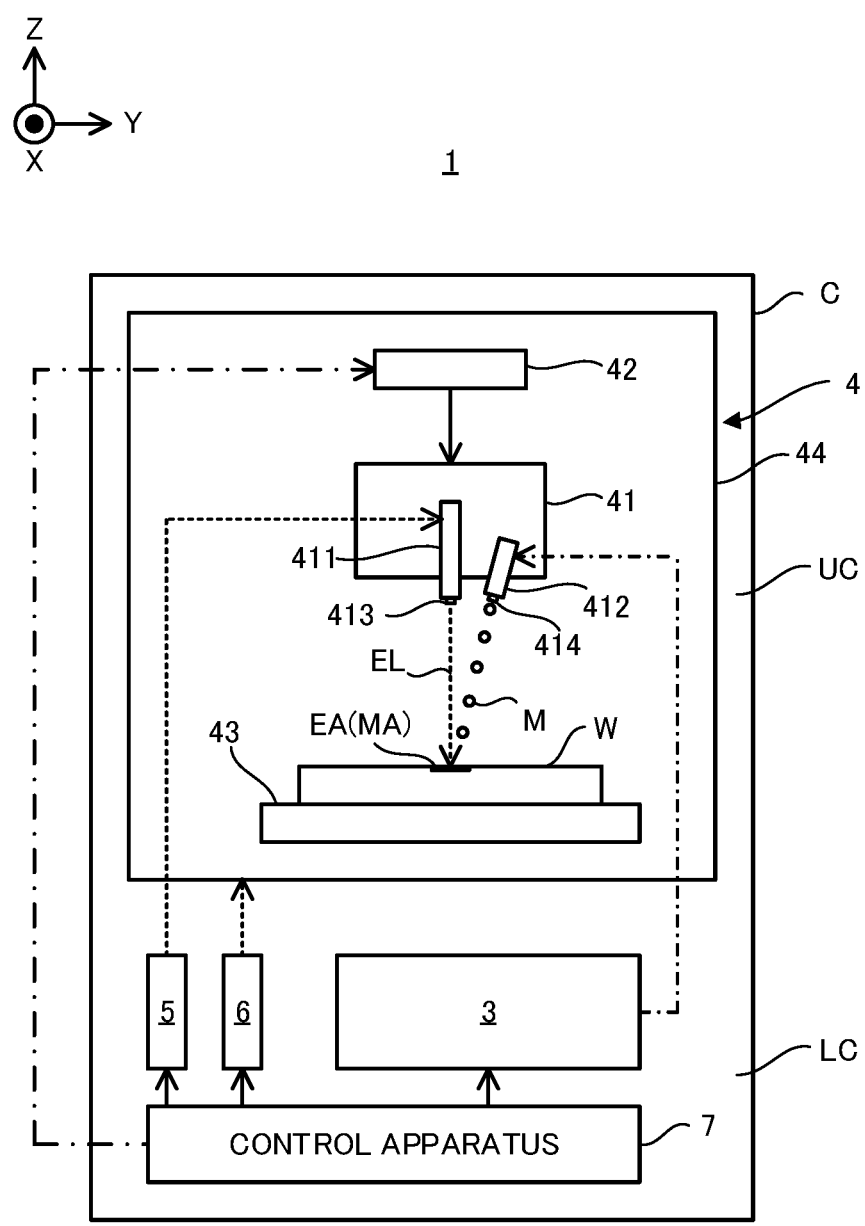
FIG. 1 is a cross-sectional view that illustrates a structure of a build system in the present embodiment.

Firstly, with reference to FIG. 1, an entire structure of the build system 1 in the present embodiment will be described. FIG. 1 is a cross-sectional view that illustrates one example of the structure of the build system 1 in the present embodiment.

The build system 1 is configured to form the three-dimensional structural object ST (namely, a three-dimensional object having a size in each of three-dimensional directions, and a solid object). The build system 1 is configured to form the three-dimensional structural object ST on a workpiece W that is a base (namely, a base member) for forming the three-dimensional structural object ST. The build system 1 is configured to form the three-dimensional structural object ST by performing the additive processing on the workpiece W. When the workpiece W is a below described stage 43, the build system 1 is configured to form the three-dimensional structural object ST on the stage 43. When the workpiece W is an existing structural object held by the stage 43, the build system 1 is configured to form the three-dimensional structural object ST on the existing structural object. In this case, the build system 1 may form the three-dimensional structural object ST that is integrated with the existing structural object. An operation for forming the three-dimensional structural object ST that is integrated with the existing structural object is equivalent to an operation for adding a new structural object to the existing structural object. Alternatively, the build system 1 may form the three-dimensional structural object ST that is separable from the existing structural object. Note that FIG. 1 illustrates an example in which the workpiece W is an existing structural object held by the stage 43. The below described description also uses the example in which the workpiece W is an existing structural object held by the stage 43.

As described above, the build system 1 is configured to form the three-dimensional structural object ST by the Laser Metal Deposition. Namely, it can be said that the build system 1 is a 3D printer that forms an object by using an Additive layer manufacturing technique. Note that the Additive layer manufacturing technique may be referred to as a Rapid Prototyping, a Rapid Manufacturing or an Additive Manufacturing.

In order to form the three-dimensional structural object ST, the build system 1 is provided with a material supply apparatus 3, a build apparatus 4, a light source 5, a gas supply apparatus 6 and a control apparatus 7, as illustrated in FIG. 1. The material supply apparatus 3, the build apparatus 4, the light source 5, the gas supply apparatus 6 and the control apparatus 7 are housed in a housing C. In an example illustrated in FIG. 1, the build apparatus 4 is housed in an upper space UC of the housing C and the material supply apparatus 3, the light source 5, the gas supply apparatus 6 and the control apparatus 7 are housed in a lower space LC of the housing C that is located below the upper space UC. However, an arranged position in the housing C of each of the material supply apparatus 3, the build apparatus 4, the light source 5, the gas supply apparatus 6 and the control apparatus 7 is not limited to an arranged position illustrated in FIG. 1.

The material supply apparatus 3 supplies build materials M to the build apparatus 4. The material supply apparatus 3 supplies, to the build apparatus 4, the build materials M the amount of which is necessary for the build apparatus 4 to form the three-dimensional structural object ST per unit time by supplying the build materials M at a desired supply rate that is based on the necessary amount.

The build material M is a material that is molten by an irradiation of a light EL having a predetermined intensity or more intensity. At least one of a metal material and a resin material is usable as the build material M, for example. However, another material that is different from the metal material and the resin material may be used as the build material M. The build materials M are powder-like or grain-like materials. Namely, the build materials M are powdery or granular materials. However, the build materials M may not be the powdery or granular materials, and a wire-like build materials or a gas-like material may be used, for example.

The build apparatus 4 forms the three-dimensional structural object ST by processing the build materials M supplied from the material supply apparatus 3. In order to process the build materials M, the build apparatus 4 is provided with a build head 41, a driving system 42 and the stage 43. Moreover, the build head 41 is provided with an irradiation optical system 411 and a material nozzle 412 (namely, a supply system that supplies the build materials M). The build head 41, the driving system 42 and the stage 43 are housed in a chamber 44.

The irradiation optical system 411 is an optical system (for example, a condensing optical system) for emitting the light EL from an emitting part 413. Specifically, the irradiation optical system 411 is optically connected to the light source 5 that generates the light EL through a non-illustrated light transmitting member such as an optical fiber and light pipe. The irradiation optical system 411 emits the light EL transmitted from the light source 5 through the light transmitting member. The irradiation optical system 411 emits the light EL in a downward direction (namely, toward a −Z side) from the irradiation optical system 411. The stage 43 is disposed below the irradiation optical system 411. When the workpiece W is loaded on the stage 43, the irradiation optical system 411 is configured to emit the light EL toward the workpiece W. Specifically, the irradiation optical system 411 irradiates an irradiation area EA that is set on the workpiece W as an area that is irradiated with the light EL (typically, in which the light is condensed). Moreover, a state of the irradiation optical system 411 is switchable between a state where the irradiation area EA is irradiated with the light EL and a state where the irradiation area EA is not irradiated with the light EL under the control of the control apparatus 7. Note that a direction of the light EL emitted from the irradiation optical system 411 is not limited to a direct downward direction (namely, coincident with the −Z axis direction), and may be a direction that is inclined with respect to the Z axis by a predetermined angle, for example.

The material nozzle 412 has a supply outlet 414 that supplies the build materials M. The material nozzle 412 supplies (specifically, injects, blows out or sprays) the build materials M from the supply outlet 414. The material nozzle 412 is physically connected to the material supply apparatus 3 that is a supply source of the build materials M through a non-illustrated pipe and the like. The material nozzle 412 supplies the build materials M supplied from the material supply apparatus 3 through the pipe. The material nozzle 412 may pressure-feed the build materials M supplied from the material supply apparatus 3 through the pipe. Namely, the build materials M from the material supply apparatus 3 and gas (for example, inert gas such as Nitrogen or Argon) for feeding are mixed and pressure-fed to the material nozzle 412 through the pipe. Note that although the material nozzle 412 is illustrated to have a tube-like shape in FIG. 1, the shape of the material nozzle 412 is not limited to this shape. The material nozzle 412 supplies the build materials M in a downward direction (namely, toward the −Z side) from the material nozzle 412. The stage 43 is disposed below the material nozzle 412. When the workpiece W is loaded on the stage 43, the material nozzle 412 supplies the build materials M toward the workpiece W. Note that although a moving direction of the build materials M supplied from the material nozzle 41 is a direction that is inclined with respect to the Z axis by a predetermined angle (as one example, an acute angle), it may be the −Z axis direction (namely, a direct downward direction).

In the present embodiment, the material nozzle 412 is aligned to the irradiation optical system 411 so as to supply the build materials M to the irradiation area EA that is irradiated with the light EL by the irradiation optical system 411. Namely, the material nozzle 412 is aligned to the irradiation optical system 411 so that the irradiation area EA is coincident with (alternatively, at least partially overlaps with) a supply area MA that is set on the workpiece W as an area to which the material nozzle 412 supplies the build materials M. Note that the material nozzle 412 may aligned so as to supply the build materials M to a melt pool MP that is formed at the workpiece W by the light emitted from the irradiation optical system 411.

The driving system 42 moves the build head 41. The driving system 42 moves the build head 41 along at least one of the X axis, the Y axis and the Z axis. When the build head 41 moves along at least one of the X axis and the Y axis, the irradiation area EA moves on the workpiece W along at least one of the X axis and the Y axis. Furthermore, the driving system 42 may move the build head 41 along at least one of the θX direction, the θY direction and the θZ direction, in addition to or instead of at least one of the X axis, the Y axis and the Z axis. The driving system 42 includes a motor or the like, for example. Note that the driving system 42 may move the irradiation optical system 411 and the material nozzle 412 separately. Specifically, for example, the driving system 42 may adjust at least one of a position of the emitting part 413, a direction of the emitting part 413, a position of the supply outlet 414 and a direction of the supply outlet 414. In this case, the irradiation area EA that is irradiated with the light EL by the irradiation optical system 411 and the supply area MA to which the material nozzle 412 supplies the build materials M are controllable separately. Note that the driving system 42 may be configured to rotate the build head 41 along a rotational axis around the X axis and a rotational axis around the Y axis.

The stage 43 is configured to hold the workpiece W. Moreover, the stage 43 is configured to release the held workpiece W. The above described irradiation optical system 411 emits the light EL in at least a part of a period when the stage 43 holds the workpiece W. Moreover, the above described material nozzle 412 supplies the build materials M in at least a part of the period when the stage 43 holds the workpiece W. Note that there is a possibility that a part of the build materials M supplied by the material nozzle 412 is scattered or drops outside the workpiece W (for example, around the stage 43) from a surface of the workpiece W. Thus, the build system 1 may be provided with a recovery apparatus that recovers the build material M scattered or dropping around the stage 43. Note that the stage 43 may be provided with a mechanical chuck, a vacuum chuck and the like in order to hold the workpiece W.

The light source 5 emits, as the light EL, at least one of an infrared light, a visible light and an ultraviolet light, for example. However, another type of light may be used as the light EL. The light EL is a laser light. In this case, the light source 5 may include a semiconductor laser such as a laser light source (for example, a Laser Diode (LD)). The laser light source may be a fiber laser, a $CO_2$ laser, a YAG laser, an Excimer laser or the like. However, the light EL may not be the laser light and the light source 5 may include any light source (for example, at least one of a LED (Light Emitting Diode), a discharge lamp and the like).

The gas supply apparatus 6 is a supply source of purge gas. The purge gas includes inert gas. The Nitrogen gas or Argon gas is one example of the inert gas. The gas supply apparatus 6 supplies the purge gas into the chamber 44 of the build apparatus 4. As a result, an inner space of the chamber 44 is a space that is purged by the purge gas. Note that the gas supply apparatus 6 may be a tank that stores the inert gas such as the Nitrogen gas or the Argon gas, and may be a Nitrogen gas generation apparatus that generates the Nitrogen gas by using air as material when the inert gas is the Nitrogen gas.

The control apparatus 7 controls an operation of the build system 1. The control apparatus 7 may include a CPU (Central Processing Unit), a GPU (Graphic Processing Unit) and a memory, for example. The control apparatus 7 serves as an apparatus for controlling the operation of the build system 1 by means of the CPU executing a computer program. The computer program is a computer program that allows the control apparatus 7 (for example, the CPU) to execute (namely, to perform) a below described operation that should be executed by the control apparatus 7. Namely, the computer program is a computer program that allows the control apparatus 7 to function so as to make the build system 1 execute the below described operation. The computer program executed by the CPU may be recorded in the memory (namely, a recording medium) of the control apparatus 7, or may be recorded in any recording medium (for example, a hard disk or a semiconductor memory) that is built in the control apparatus 7 or that is attachable to the control apparatus 7. Alternatively, the CPU may download the computer program that should be executed from an apparatus disposed outside the control apparatus 7 through a network interface. Moreover, the control apparatus 7 may not be disposed in the build system 1, and may be disposed outside the build system 1 as a server and the like. In this case, the control apparatus 7 may be connected to the build system 1 through a wired or a wireless communication line or a network. When they are physically connected through a wired line, a serial connection such as IEEE1394, RS-232x, RS-422, RS-423, RS-485 and USB, a parallel connection or an electric connection through a network such as 10-BASE-T, 100BASE-TX or 1000BASE-T may be used. When they are connected through a wireless line, a wireless LAN such as IEEE802.1x or OFDM, an electrical wave such as Bluetooth (registered trademark), an infrared ray, an optical communication or the like may be used. In this case, the control apparatus 7 and the build system 1 may be configured to transmit and receive various information through the communication line or the network. Moreover, the control apparatus 7 may be configured to transmit an information such as a command and a control parameter to the build system 1 through the above described communication line or the network. The build system 1 may be provided with a receiving apparatus that receives the information such as the command and the control parameter from the control apparatus 7 through the above described communication line or the network. Note that the recording medium recording therein the computer program that should be executed by the CPU may include a magnetic medium such as a magnetic disc or a magnetic tape, an optical disc, an optical-magnetic disc including a CD-ROM, a CD-R, a CD-RW, a flexible disc, a MO, a DVD-ROM, a DVD-RAM, a DVD-R, a DVD+R, a DVD-RW, a DVD+RW or a Blu-ray (registered trademark), a semiconductor memory such as a USB memory, and another medium that is configured to store the program. Moreover, the program includes not only the program that is stored in the above described recording medium and distributed but also a program that is distributed by a download through a network line such as an Internet and the like. Moreover, the recording medium includes a device that is configured to record the program and a device for universal use or exclusive use in which the above described program is embedded to be executable in a form of a software, a firmware or the like, for example. Moreover, various processes or functions included in the program may be executed by a program software that is executable by the computer or the process of each part may be realized by a hardware such as a predetermined gate array (a FPGA, an ASIC) or in a form in which a program software module and a partial hardware module that realizes an partial element of the hardware are combined. Especially in the present embodiment, the control apparatus 7 controls an emitting aspect of the light EL by the irradiation optical system 411. The emitting aspect includes at least one of an intensity of the light EL and an emitting timing of the light EL. When the light EL is a pulse light, the emitting aspect may include at least one of a length of an ON time of the pulse light and a ratio (a duty ratio) of the ON time to an OFF time of the light EL. Moreover, the control apparatus 7 controls a moving aspect of the build head 41 by the driving system 42. The moving aspect includes at least one of a moving distance, a moving speed, a moving direction and a moving timing. Moreover, the control apparatus 7 controls a supplying aspect of the build materials M by the material supply apparatus 3. The supplying aspect includes at least one of a supplied amount (especially, a supplied amount per unit time) and a supply timing. Note that the control apparatus 7 may not be disposed in the build system 1, and may be disposed outside the build system 1 as the server and the like.

(2) BUILD OPERATION OF BUILD SYSTEM 1

Next, a build operation (namely, an operation for forming the three-dimensional structural object ST) of the build system 1 will be described. As described above, the build system 1 forms the three-dimensional structural object ST by the Laser Metal Deposition. Thus, the build system 1 may form the three-dimensional structural object ST by performing an existing build operation based on the Laser Metal Deposition. One example of the build operation of the three-dimensional structural object ST by the Laser Metal Deposition will be briefly described in the below described description.

The build system 1 forms the three-dimensional structural object ST on the workpiece W on the basis of a three-dimensional model data or the like (for example, a CAD (Computer Aided Design) data) of the three-dimensional structural object ST that should be formed. A measured data of the solid object measured by a measurement apparatus disposed in the build system 1 or a measured data by a three-dimensional shape measurement device disposed separately from the build system 1 such as a contact-type of three-dimensional coordinate measurement device having a probe that is movable relative to the workpiece W and is allowed to contact the workpiece W and a non-contact-type of three-dimensional measurement device (as one example, a Pattern Projection type of three-dimensional measurement device, a Light Section type of three-dimensional measurement device, a Time Of Flight type of three-dimensional measurement device, a Moire Topography type of three-dimensional measurement device, a Holographic Interference type of three-dimensional measurement device, a CT (Computed Tomography) type of three-dimensional measurement device, a MRI (Magnetic Resonance Imaging) type of three-dimensional measurement device and the like) may be used as the three-dimensional model data, for example. Note that a STL (Stereo Lithography) format, a VRML (Virtual Reality Modeling language) format, an AMF (Additive manufacturing File format), an IGES (Initial Graphics Exchange Specification) format, a VDA-FS (Association of German Automotive manufactures-Surfaces Interface) format, a HP/GL (Hewlett-Packard Graphics Language) format, a Bitmap format and the like may be used as the three-dimensional model data, for example. The build system 1 sequentially forms a plurality of layered partial structural objects (it is referred to as a "structural layer" in the below described description) SL that are arranged along the Z axis direction in order to form the three-dimensional structural object ST, for example. For example, the build system 1 forms, one by one, the plurality of structural layers SL that are obtained by slicing the three-dimensional structural object ST along the Z axis direction. As a result, the three-dimensional structural object ST that is a layered structural body in which the plurality of structural layers SL are layered is formed. Next, a flow of an operation for forming the three-dimensional structural object ST by forming the plurality of structural layers SL one by one in order will be described.

Firstly, an operation for forming each structural layer SL will be described. The build system 1 sets the irradiation area EA at a desired area on a build surface CS that corresponds to a surface of the workpiece W or a surface of the formed structural layer SL and emits the light EL from the irradiation optical system 411 to the irradiation area EA under the control of the control apparatus 7. Note that an area on the build surface CS that is occupied by the light EL emitted from the irradiation optical system 411 may be referred to as the irradiation area EA. In the present embodiment, a light concentration position (namely, a condensed position) of the light EL is coincident with the build surface CS. As a result, as illustrated in FIG. 2A, a melt pool (namely, a pool of a metal molten by the light EL) MP is formed at the desired area on the build surface CS by the light EL emitted from the irradiation optical system 411. Moreover, the build system 1 sets the supply area MA at the desired area on the build surface CS and supplies the build materials M to the supply area MA from the material nozzle 412 under the control of the control apparatus 7. Here, since the irradiation area EA is coincident with the supply area MA as described above, the supply area MA is set at an area at which the melt pool MP is formed. Thus, the build system 1 supplies the build materials M to the melt pool MP from the material nozzle 412, as illustrated in FIG. 2B. As a result, the build materials M supplied to the melt pool MP are molten. When the melt pool MP is not irradiated with the light EL due to the movement of the build head 41, the build materials M molten in the melt pool MP are cooled and solidified (namely, coagulated) again. As a result, as illustrated in FIG. 2C, the build materials M solidified again are deposited on the build surface CS. Namely, a build object is formed by a deposition of the build materials M solidified again.

A series of build process including the formation of the melt pool MP by the irradiation of the light EL, the supply of the build materials M to the melt pool MP, the melting of the supplied build materials M and the re-solidification of the molten build materials M is repeated while relatively moving the build head 41 relative to the build surface CS along the XY plane. Namely, when the build head 41 relatively moves relative to the build surface CS, the irradiation area EA also relatively moves relative to the build surface CS. Therefore, the series of build process is repeated while relatively moving the irradiation area EA relative to the build surface CS along the XY plane (namely, in a two-dimensional plane). In this case, the irradiation area EA set at the area on which the build object should be formed on the build surface CS is selectively irradiated with the light EL and the irradiation area EA set at an area on which the build object should not be formed on the build surface CS is not selectively irradiated with the light EL (it can be said that the irradiation area EA is not set at the area on which the build object should not be formed). Namely, the build system 1 moves the irradiation area EA along a predetermined moving trajectory on the build surface CS and irradiates the build surface CS with the light EL at a timing based on a distribution pattern of an area on which the build object should be formed (namely, a pattern of the structural layer SL). As a result, the melt pool MP also moves on the build surface CS along a moving trajectory based on the moving trajectory of the irradiation area EA. Specifically, the melt pool MP is formed in series at a part that is irradiated with the light EL in the area along the moving trajectory of the irradiation area EA on the build surface CS. Moreover, since the irradiation area EA is coincident with the supply area MA as described above, the supply area MA also moves on the build surface CS along a moving trajectory based on the moving trajectory of the irradiation area EA. As a result, the structural layer SL that is an aggregation of the build object of the solidified build materials M is formed on the build surface CS. Namely, the structural layer SL that is an aggregation of the build object formed in a pattern based on the moving trajectory of the melt pool MP on the build surface CS (namely, the structural layer SL having a shape based on the moving trajectory of the melt pool MP in a planar view) is formed. Incidentally, when the irradiation area EA is set at the area on which the build object should not be formed, the irradiation area EA may be irradiated with the light EL and the supply of the build materials M may be stopped. Moreover, when the irradiation area EA is set at the area on which the build object should not be formed, the build materials M may be supplied to the irradiation area EL and the irradiation area EA may be irradiated with the light EL having an intensity by which the melt pool MP is not formed.

The irradiation area EA may move along a first moving trajectory in which the movement of the irradiation area EA along the Y axis direction and the movement of the irradiation area EA along the X axis direction are repeated as illustrated in FIG. 3A in a layer forming period in which one structural layer SL is formed on the build surface CS. In an example illustrated in FIG. 3A, the irradiation area EA moves along a moving trajectory in which the movement of the irradiation area EA toward +Y side, the movement of the irradiation area EA toward +X side, the movement of the irradiation area EA toward −Y side and the movement of the irradiation area EA toward +X side are repeated. In this case, the build system 1 emits the light EL at a timing when the irradiation area EA is set at the area on which the build object should be formed on the build surface CS. Especially, in the example illustrated in FIG. 3A, a moving distance of the irradiation area EA along the Y axis direction (especially, a moving distance by one-time movement before a moving direction of the irradiation area EA is switched to the X axis direction) is larger than a moving distance of the irradiation area EA along the X axis direction. In this case, the build system 1 emits the light EL in a period when the irradiation area EA moves along the Y axis (alternatively, either one of the X axis and Y axis along which the moving distance of the irradiation area EA by the one-time movement is larger than the other one) and does not emit the light EL in a period when the irradiation area EA moves along the X axis (alternatively, either one of the X axis and Y axis along which the moving distance of the irradiation area EA by the one-time movement is smaller than the other one). Incidentally, it can be said that the moving trajectory illustrated in FIG. 3A is a moving trajectory corresponding to a scan by what we call a raster scan. In this case, the moving trajectory of the irradiation area EA rarely intersects with itself, although the moving trajectory of the irradiation area EA does not always have no chance of intersecting.

Alternatively, the irradiation area EA may move along a second moving trajectory that is along the pattern of the structural layer SL as illustrated in FIG. 3B in the layer forming period. Even in this case, the build system 1 emits the light EL at the timing when the irradiation area EA is set at the area on which the build object should be formed on the build surface CS. However, since the irradiation area EA moves along the second moving trajectory that is along the pattern of the structural layer SL, it can be said that the irradiation area EA basically overlaps with the area on which the build object should be formed on the build surface CS. Therefore, the build system 1 may keep emitting the light EL during a period when the irradiation area EA moves. In this case, the melt pool MP also moves along the second moving trajectory that is along the pattern of the structural layer SL. As a result, the build process that extends the build object along a direction along which the irradiation area EA moves relative to the structural layer SL. Incidentally, it can be said that the moving trajectory illustrated in FIG. 3B is a moving trajectory corresponding to a scan by what we call a vector scan. In this case, the control apparatus 7 may set the moving trajectory of the irradiation area EA so that the moving trajectory of the irradiation area EA does not intersects with itself on the build surface CS (especially, the moving trajectory of the melt pool MP does not intersects with itself on the build surface CS). However, there is a possibility that the moving trajectory of the irradiation area EA (especially, the moving trajectory of the melt pool MP) intersects with itself on the build surface CS depending on the distribution pattern of the area on which the build object should be formed on the build surface CS.

Note that although the irradiation area EA is moved relative to the build surface CS by moving the build head 41 (namely, the light EL) relative to the build surface CS in the above described description, the build surface CS may be moved and both of the build head 41 (namely, the light EL) and the build surface CS may be moved.

The build system 1 repeats the operation for forming the structural layer SL on the basis of the three-dimensional model data under the control of the control apparatus 7. Specifically, a slice data is firstly generated by performing a slicing process on the three-dimensional model data by a layer pitch. Note that a data obtained by partially modifying the slice data on the basis of a characteristic of the build system 1 may be used. The build system 1 performs an operation for forming the first structural layer SL #1 on the build surface CS that corresponds to the surface of the workpiece W on the basis of the three-dimensional model data corresponding to a structural layer SL #1, namely, the slice data corresponding to the structural layer SL #1. As a result, as illustrated in FIG. 4A, the structural layer SL #1 is formed on the build surface CS. Then, the build system 1 sets the surface (namely, an upper surface) of the structural layer SL #1 to a new build surface CS and forms a second structural layer SL #2 on the new build surface CS. In order to form the structural layer SL #2, firstly, the control apparatus 7 controls the driving system 42 so that the build head 41 moves along the Z axis direction. Specifically, the control apparatus 7 controls the driving system 42 to move the build head 41 toward the +Z axis side so that the irradiation area EA and the supply area MA are set on the surface of the structural layer SL #1 (namely, the new build surface CS). By this, the light concentration position of the light EL is coincident with the new build surface CS. Then, the build system 1 forms the structural layer SL #2 on the structural layer SL #1 on the basis of the slice data corresponding to the structural layer SL #2 by the operation that is the same as the operation for forming the structural layer SL #1 under the control of the control apparatus 7. As a result, as illustrated in FIG. 4B, the structural layer SL #2 is formed. Then, the same operation is repeated until all structural layers SL constituting the three-dimensional structural object ST that should be formed on the workpiece W are formed. As a result, the three-dimensional structural object ST is formed by a layered structural object in which the plurality of structural layers SL are layered along the Z axis, as illustrated in FIG. 4C.

(3) VARIATION REDUCING OPERATION

Next, a variation reducing operation for reducing the variation of a characteristic of the build object (namely, the build object constituting each structural layer SL) formed by the build operation will be described. In the present embodiment, the build system 1 performs at least one of a first variation reducing operation, a second variation reducing operation, a third variation reducing operation and a fourth variation reducing operation. Thus, in the below described description, the first variation reducing operation to the fourth variation reducing operation are described in order.

In the below described description, the height of the build object from the build surface CS (namely, a size in the Z axis direction, or a dimension in the Z axis direction, and basically, thickness of the build object) may be used as the characteristic of the build object. In other words, hereinafter a variation reducing operation for reducing variation in the height of the build object will be described. However, any characteristic other than the height of the build object may be also used as the characteristic of the build object. For example, a size of the build object along the build surface CS (namely, a size in at least one of the X axis direction and the Y axis direction, and for example, a width) may be also used as the characteristic of the build object, in addition to or instead of the height of the build object from the build surface CS.

(3-1) First Variation Reducing Operation

Firstly, the first variation reducing operation will be described. The first variation reducing operation corresponds to an operation for reducing the variation in the height of the build object when the irradiation area EA is set twice or more times at the same area on the build surface CS in the layer forming period in which one structural layer SL is formed on the build surface CS. Note that the first variation reducing operation may be an operation for reducing, in one structural layer SL, the variation in the height at each position within a surface on which the structural layer SL is located (or a size in a direction that intersects with the surface on which the structural layer SL is located).

Specifically, as illustrated in FIG. 5A, in the layer forming period in which one structural layer SL is formed on the build surface CS, the irradiation area EA moves on the build surface CS along a moving trajectory based on the pattern of the structural layer SL on the build surface CS. Here, there is a possibility that the moving trajectory of the irradiation area EA intersects with itself on the build surface CS depending on the pattern of the structural layer SL. In an example illustrated in FIG. 5A, the moving trajectory of the irradiation area EA intersects with itself at an area WA1 on the build surface CS. At the area WA1 on the build surface CS at which the moving trajectory of the irradiation area EA intersects with itself, the irradiation area EA is set twice or more times. In contrast, at an area WA2 on the build surface CS at which the moving trajectory of the irradiation area EA does not intersect with itself and that overlaps with the moving trajectory of the irradiation area EA, the irradiation area EA is set only once. In other words, the build surface CS includes the area WA1 at which the irradiation area EA is set twice or more times in the layer forming period, and the area WA2 at which the irradiation area EA is set only once in the layer forming period. Note that the area WA1 may be an area at which the irradiation area EA is set M times (wherein M is an integral number of 2 or more) in the layer forming period and the area WA2 may be an area at which the irradiation area EA is set N times (wherein N is an integral number of 2 or more and satisfies a relation of N<M) in the layer forming period. In other words, the number of times of the build process performed at the area WA1 is different from the number of times of the build process performed at the area WA2, and specifically, the number of times of the build process performed at the area WA1 is greater than the number of times at the area WA2.

In other words, the number of times of the build process performed at the area WA2 is less than the number of times of the build process performed at the area WA1.

At the area WA1, there is a possibility that the series of build process including the formation of the melt pool MP by the irradiation of the light EL, the supply of the build materials M to the melt pool MP, the melting of the supplied build materials M and the re-solidification of the molten build materials M is performed twice or more times at a timing when the area WA1 is coincident with at least a part of the irradiation area EA. In other words, at the area WA1, there is a possibility that the moving trajectory of the melt pool MP on the build surface CS intersects with itself. On the other hand, at the area WA2, the series of build process is not performed twice or more times. At the area WA2, the series of build process is performed once at most at a timing when the area WA2 is coincident with at least a part of the irradiation area EA. In other words, at the area WA2, the moving trajectory of the melt pool MP on the build surface CS does not intersect with itself. In the layer forming period in which one structural layer SL is formed, at least a part of the melt pool MP formed for the second or subsequent build process may be formed on the build object that is formed at the area WA1 by the first build process. Namely, at least a part of the melt pool MP formed for the second or subsequent build process may be formed of the build materials M.

The series of build process is performed twice or more times at the area WA1, whereas the series of build process is performed once at the area WA2. In other words, a difference between the number of times of the build process performed at the area WA1 and the number of times of the build process performed at the area WA2 causes the following technical problems. Specifically, at the area WA1, the build materials M may be supplied, molten and re-solidified more, compared to the area WA2. Thus, if the series of build process is performed without distinguishing the area WA1 from the area WA2 in a situation in which the build objects of the same heights should be formed at the area WA1 and the area WA2, there is a possibility that the height of the build object formed at the area WA1 is not the same as the height of the build object formed at the area WA2. Typically, as illustrated in FIG. 5B, a height h1 of the build object formed at the area WA1 is possibly higher than a height h2 of the build object formed at the area WA2, because the number of times of the series of build process is more. In other words, there is a possibility that the height of the build object varies when the irradiation area EA is set twice or more times at a certain area on the build surface CS in the layer forming period. In the below described description, for the purpose of simple description, the build object formed at the area WA1 is referred to as a "build object S1" and the build object formed at the area WA2 is referred to as a "build object S2".

Thus, in the present embodiment, the control apparatus 7 (in other words, the build system 1 under the control of the control apparatus 7) performs the first variation reducing operation to reduce the variation between the height h1 of the build object S1 and the height h2 of the build object S2. Note that in the present embodiment, the operation for "reducing the variation between the height of one build object and the height of another build object" includes an operation for decreasing a difference (namely, reducing a difference) between the height of one build object and the height of another build object, compared to the case where the variation reducing operation is not performed. The operation for "reducing the variation between the height of one build object and the height of another build object" includes an operation for making the height of one build object coincident with (namely, the same as) the height of another build object.

As illustrated in FIG. 5C, in a situation in which the build object having the same size should be formed at the area WA1 and the area wa2, a size (here, the size in the X axis direction, and substantially a width) w1 of the build object formed at the area WA1 is possibly larger than a size w2 of the build object formed at the area WA2. In other words, there is a possibility that the size of the build object varies when the irradiation area EA is set twice or more times at a certain area on the build surface CS in the layer forming period. Thus, as described above, the size (especially, a size along the XY plane) of the build object may be the characteristic of the build object in which the variation should be reduced by the first variation reducing operation. In this case, the first variation reducing operation may be an operation for reducing, in one structural layer SL, the variation of the size along a surface on which the structural layer SL is located at each position within this surface. Conversely, any characteristic that satisfies the following condition may be used as the characteristic of the build object in which the variation should be reduced by the first variation reducing operation, the condition is as follows; the characteristic of the build object formed at the area WA1 is possibly not the same as the characteristic at the area WA2 if the series of build process is performed without distinguishing the area WA1 from the area WA2 in a situation in which the build object with the same characteristic should be formed at the area WA1 and the area WA2. The same shall apply in the second to fourth variation reducing operations described later.

The control apparatus 7 may perform the first variation reducing operation for reducing the variation in the height of the build object by controlling (e.g., adjusting, changing or setting, and the same shall apply hereinafter) a supplied amount of the build materials M supplied to the supply area MA per unit time (namely, the irradiation area EA or the melt pool MP). In the below described description, the supplied amount of the build materials M supplied to the supply area MA per unit time is referred to as a "supply rate", for the purpose of simple description. Note that weight or volume may be used as a unit of the supplied amount of the build materials M. The control apparatus 7 may perform the first variation reducing operation for reducing the variation in the height of the build object by controlling a heat amount transferred from the light EL to the build surface CS per unit time through the irradiation area EA (namely, the supply area MA), in addition to or instead of controlling the supply rate. In the below described description, the heat amount transferred from the light EL to the build surface CS per unit time through the irradiation area EA is referred to as a "heat transfer rate", for the purpose of simple description. The control apparatus 7 may perform the first variation reducing operation for reducing the variation in the height of the build object by controlling a relative moving speed of the irradiation area EA (namely, the supply are MA or the melt pool MP) relative to the build surface CS, in addition to or instead of controlling at least one of the supply rate and the heat transfer rate. Hereinafter, the first variation reducing operation for controlling the supply rate, the first variation reducing operation for controlling the heat transfer rate, and the first variation reducing operation for controlling the moving speed of the irradiation area EA will be described in order.

(3-1-1) First Variation Reducing Operation for Controlling Supply Rate of Build Materials M Firstly, with reference to FIG. 6A to FIG. 6C, the first variation reducing operation for controlling the supply rate of the build materials M will be described. Note that each of FIG. 6A to FIG. 6C illustrates a method of controlling the supply rate of the build materials M when the irradiation area EA is set twice at the area WA1 in the layer forming period, for the purpose of simple description.

Each of FIG. 6A to FIG. 6C is a graph that illustrates time on the horizontal axis and the supply rate of the build materials M on the vertical axis. Since the irradiation area EA moves on the build surface CS with time, the horizontal axis in FIG. 6A to FIG. 6C substantially corresponds to the position of the irradiation area EA set on the build surface. In other words, each of FIG. 6A to FIG. 6C illustrates the supply rate of the build materials M at a certain area part, during a period when the irradiation area EA is set at the certain area part on the build surface CS.

As illustrated in FIG. 6A, the control apparatus 7 may control the supply rate (i) such that the supply rate for the area WA1 during a period when the irradiation area EA is set at the area WA1 at the first time is the same as the supply rate for the area WA2, and (ii) such that the supply rate for the area WA1 during a period when the irradiation area EA is set at the area WA1 at the second time is zero. In other words, the control apparatus 7 may control the supply rate (i) such that the supply rate for the area WA1 at which the irradiation area EA is set for the first time is the same as the supply rate for the area WA2, and (ii) such that the supply rate for the area WA1 at which the irradiation area EA is set again is zero. Note that the control apparatus 7 may control the supply rate such that the supply rate for the area WA1 at which the irradiation area EA is set again is lower than the supply rate for the area WA1 at which the irradiation area EA is set for the first time.

Alternatively, the control apparatus 7 may control the supply rate (i) such that the supply rate for the area WA1 during the period when the irradiation area EA is set at the area WA1 at the second time is the same as the supply rate for the area WA2, and (ii) such that the supply rate for the area WA1 during the period when the irradiation area EA is set at the area WA1 at the first time is zero. In other words, the control apparatus 7 may control the supply rate (i) such that the supply rate for the area WA1 at which the irradiation area EA is set at a certain timing is the same as the supply rate for the area WA2, and (ii) such that the supply rate for the area WA1 at which the irradiation area EA is set at the other timing is zero. Even when the irradiation area EA is set twice or more times at the area WA1 in the layer forming period, in the same manner, the control apparatus 7 may control the supply rate (i) such that the supply rate for the area WA1 at which the irradiation area EA is set at a certain timing is the same as the supply rate for the area WA2, and (ii) such that the supply rate for the area WA1 at which the irradiation area EA is set at the other timing is zero. Note that the control apparatus 7 may control the supply rate such that the supply rate for the area WA1 at which the irradiation area EA is set at a certain timing is the same as the supply rate for the area WA2, and such that the supply rate for the area WA1 at which the irradiation area EA is set at the other timing is lower than the supply rate for the area WA2.

As a result of the control of the supply rate as described above, a total amount of the build materials M supplied to the area WA1 in the layer forming period is same as a total amount of the build materials M supplied to the area WA2 in the layer forming period. More specifically, the total amount of the build materials M supplied to the area WA1 having a certain size in the layer forming period is the same as the total amount of the build materials M supplied to the area WA2 having the same size in the layer forming period. In other words, a value obtained by dividing the total amount of the build materials M supplied to the area WA1 in the layer forming period by the area size of the area WA1 (namely, the supplied amount of the build materials M per unit area) is the same as a value obtained by dividing the total amount of the build materials M supplied to the area WA2 in the layer forming period by the area size of the area WA2. Thus, at the area WA1 and the area WA2, the build materials M of the same amount per unit area are supplied, molten and re-solidified. As a result, the variation is reduced between the height h1 of the build object S1 formed at the area WA1 and the height h2 of the build object S2 formed at the area WA2. In other words, the difference between the height h1 of the build object S1 and the height h2 of the build object S2 decreases in comparison with when the supply rate of the build materials M is not controlled. Typically, the height h1 of the build object S1 is same as the height h2 of the build object S2. This results in an improved formation accuracy of the three-dimensional structural object ST that is an aggregation of the build object. Note that when there is a nonlinear relationship between the supply rate and the total amount of the build materials M supplied to each of the area WA1 and the area WA2 in the layer forming period, the supply rate may be controlled in view of the nonlinear relationship. Moreover, if there is a nonlinear relationship between the supply rate and the heights h1 and h2 of the build object, the supply rate may be controlled in view of the nonlinear relationship.

Alternatively, as illustrated in FIG. 6B and FIG. 6C, the control apparatus 7 may control the supply rate such that the build materials M are supplied at each time when the irradiation area EA is set at the area WA1 (namely, such that the supply rate for the area WA1 will never be zero). In this case, the control apparatus 7 controls the supply rate such that both of the supply rate for the area WA1 during the period when the irradiation are EA is set at the area WA1 at the first time and the supply rate for the area WA1 during the period when the irradiation area EA is set at the area WA1 at the second time are lower than the supply rate for the area WA2. Note that the control apparatus 7 may control the supply rate, as illustrated in FIG. 6B, such that the supply rate for the area WA1 during the period when the irradiation are EA is set at the area WA1 at the first time is different from the supply rate for the area WA1 during the period when the irradiation area EA is set at the area WA1 at the second time. Alternatively, as illustrated in FIG. 6C, the control apparatus 7 may control the supply rate such that the supply rate for the area WA1 during the period when the irradiation are EA is set at the area WA1 at the first time is the same as the supply rate for the area WA1 during the period when the irradiation area EA is set at the area WA1 at the second time. When the supply rate is controlled as illustrated in FIG. 6B or FIG. 6C, the difference between the total amount of the build materials M supplied to the area WA1 in the layer forming period and the total amount of the build materials M supplied to the area WA2 in the layer forming period decreases in comparison with a case where the supply rate for the area WA1 is always the same as the supply rate for the area WA2. As a result, the variation is reduced between the height h1 of the build object S1 formed at the area WA1 and the height h2 of the build object S2 formed at the area WA2.

When controlling the supply rate such that the build materials M are supplied at each time when the irradiation area EA is set at the area WA1, the control apparatus 7 may control the supply rate for the area WA1 during the period when the irradiation area EA is set at the area WA1 at the first time and the supply rate for the area WA1 during the period when the irradiation area EA is set at the area WA1 at the second time such that the total amount of the build materials M supplied at the area WA1 in the layer forming period is the same as the total amount of the build materials M supplied at the area WA2 in the layer forming period. As a result, in the same manner as a case where the supply rate is controlled as illustrated in FIG. 5A, the total amount of the build materials M supplied to the area WA1 in the layer forming period is the same as the total amount of the build materials M supplied to the area WA2 in the layer forming period. The variation between the height h1 of the build object S1 formed at the area WA1 and the height h2 of the build object S2 formed at the area WA2 is more appropriately reduced. Note that when there is a nonlinear relationship between the supply rate and the total amount of the build materials M supplied to each of the area WA1 and the area WA2 in the layer forming period, the supply rate may be controlled in view of the nonlinear relationship. Moreover, if there is a nonlinear relationship between the supply rate and the heights h1 and h2 of the build object, the supply rate may be controlled in view of the nonlinear relationship.

Even when the irradiation area EA is set twice or more times at the area WA1 in the layer forming period, in the same manner, the control apparatus 7 may control the supply rate such that the supply rate for the area WA1 during each period when the irradiation area EA is set at the area WA1 is lower than the supply rate for the area WA2. Moreover, the control apparatus 7 may control the supply rate for the area WA1 during each period when the irradiation area EA is set at the area WA1 such that the total amount of the build materials M supplied to the area WA1 in the layer forming period is the same as the total amount of the build materials M supplied to the area WA2 in the layer forming period. Note that the supply rate may be controlled such that the total amount of the build materials M supplied to the area WA1 in the layer forming period is different from the total amount of the build materials M supplied to the area WA2 in the layer forming period.

Next, with reference to FIG. 7 to FIG. 10, a specific method for controlling the supply rate of the build materials M will be described.

The control apparatus 7 may control a supplied amount (namely, an injected amount) per unit time of the build materials M from the material nozzle 412 so as to control the supply rate. Specifically, as illustrated in FIG. 7, the supply rate increases as the supplied amount per unit time of the build materials M from the material nozzle 412 increases. Thus, the control apparatus 7 may control the supply rate by controlling the supplied amount per unit time of the build materials M from the material nozzle 412. In order to control the supplied amount per unit time of the build materials M from the material nozzle 412, the control apparatus 7 may control a supplied amount per unit time of the build materials M to the material nozzle 412 from the material supply apparatus 3 by controlling the material supply apparatus 3. Alternatively, in order to control the supplied amount per unit time of the build materials M from the material nozzle 412, the control apparatus 7 may control the material nozzle 412. For example, when the material nozzle 412 is provided with a valve that is disposed on a supply path of the build materials M in the material nozzle 412, the control apparatus 7 may control the valve to control the supplied amount per unit time of the build materials M from the material nozzle 412.

As illustrated in FIG. 8A and FIG. 8B, in order to control the supply rate, the control apparatus 7 may control a gas jet apparatus 461 that is provided for the build apparatus 4 to blow away at least a part of the build materials M supplied from the material nozzle 412 before it arrives at the supply area MA (namely, the irradiation are EA or the melt pool MP). Specifically, the gas jet apparatus 461 emits a jet of inert gas to at least a part of the supply path of the build materials M between the material nozzle 412 and the supply area MA. Note that the gas jet apparatus 461 may emit a jet of the inert gas along a direction that intersects with a direction of the supply path of the build materials M between the material nozzle 412 and the supply area MA. The inert gas blown by the gas jet apparatus 461 is supplied to the gas jet apparatus 461 from the gas supply apparatus 6, for example. When the gas jet apparatus 461 emits a jet of the inert gas, as illustrated in FIG. 8A, at least a part of the build materials M supplied from the material nozzle 412 is blown to be away from the supply area MA before it arrives at the supply area MA. In other words, at least a part of the build materials M supplied from the material nozzle 412 does not arrive at the supply area MA. On the other hand, when the gas jet apparatus 461 does not emit a jet of the inert gas, as illustrated in FIG. 8B, the build materials M supplied from the material nozzle 412 are not blown to be away from the supply area MA. In other words, the build materials M supplied from the material nozzle 412 arrive at the supply area MA. As a result, when the gas jet apparatus 461 emits a jet of the inert gas, the supplied amount per unit time of the build materials M to the supply area MA is reduced in comparison with a case where the gas jet apparatus 461 does not emit a jet of the inert gas. In other words, when the gas jet apparatus 461 emits a jet of the inert gas, the supply rate is reduced in comparison with the case where the gas jet apparatus 461 does not emit a jet of the inert gas. Thus, the supply rate is controllable by the control apparatus 7 controlling the gas jet apparatus 461.

As illustrated in FIG. 9A and FIG. 9B, in order to control the supply rate, the control apparatus 7 may control a blocking member 462 that is disposed in the build apparatus 4 such that it is insertable to or detachable from the supply path of the build materials M between the material nozzle 412 and the supply area MA. Specifically, the blocking member 462 is movable relative to the supply path of the build materials M by a not-illustrated driving system (e.g., an actuator, etc.). Note that the blocking member 462 may be movable along the direction that intersects with the direction of the supply path of the build materials M between the material nozzle 412 and the supply area MA. With the movement of the blocking member 462, a state of the blocking member 462 is switchable between a non-blocking state where the blocking member 462 does not block the supply path of the build materials M (refer to FIG. 9A) and a blocking state where the blocking member 462 blocks the supply path of the build materials M (refer to FIG. 9B). When the blocking member 462 is in the non-blocking state, as illustrated in FIG. 9A, the build materials M supplied from the material nozzle 412 are not blocked by the blocking member 462 and arrive at the supply area MA. On the other hand, when the blocking member 462 is in the blocking state, as illustrated in FIG. 9B, at least a part of the build materials M supplied from the material nozzle 412 is blocked by the blocking member 462 before arriving at the supply area MA. In other words, at least a part of the build materials M supplied from the material nozzle 412 does not arrive at the supply area MA. As a result, when the blocking member 462 is in the blocking state, the supplied amount per unit time of the build materials M to the supply area MA is reduced in comparison with the case where the blocking member 462 is in the non-blocking state. In other words, when the blocking member 462 is in the blocking state, the supply rate is reduced in comparison with the case where the blocking member 462 is in the non-blocking state. Thus, the supply rate of the build materials M is controllable by the control apparatus 7 controlling the blocking member 462. Note that the state of the blocking member 462 may be in a semi-blocking state in which the blocking member 462 blocks a part of the supply path of the build materials M. Moreover, the state of the blocking member 462 may be controlled such that the build materials M is supplied intermittently to one supply area MA. In this case, the supplied amount per unit time of the build materials M to the one supply area MA may be controlled by controlling a ratio (or a duty ratio) between the non-blocking state and the blocking state. At this time, each of a time of the non-blocking state and a time of the blocking state may be shorter than the unit time.

It can be said that each of the gas jet apparatus 461 and the blocking member 462 is a supply amount change apparatus for preventing at least a part of the build materials M supplied from the material nozzle 412 from arriving at the supply area MA. Thus, when the build apparatus 4 is provided with any supply amount change apparatus that is different from the gas jet apparatus 461 and the blocking member 462, the control apparatus 7 may control any supply amount change apparatus so as to control the supply rate of the build materials M. Note that any supply amount change apparatus may be disposed on at least one of the material supply apparatus 3 and a supply path leading to the supply outlet 414 of the material nozzle 412 from the material supply apparatus 3. For example, a valve that is allowed to change a passing flow rate may be used as such a supply amount change apparatus. Moreover, the valve that is allowed to change the passing flow rate may be disposed at least in the material supply apparatus 3 and on the supply path. A butterfly valve, a gate valve, a globe valve, a ball valve and the like may be used as such a valve, for example.

In order to control the supply rate, the control apparatus 7 may control a direction of supply (namely, a direction of injection) of the build materials M from the material nozzle 412. Specifically, as illustrated in FIG. 10A and FIG. 10B, the control apparatus 7 may control the direction of supply of the build materials M from the material nozzle 412 by controlling a direction of the material nozzle 412 to the build surface CS. The direction of the material nozzle 412 is controllable by moving the material nozzle 412 by using the driving system 42. In this case, however, the driving system 42 separately moves the irradiation optical system 411 and the material nozzle 412. With the control of the direction of the material nozzle 412, a state of the material nozzle 412 is switchable between a supply state where the build materials M is supplied to the supply area MA (namely, the irradiation area EA or the melt pool MP) (refer to FIG. 10A) and a non-supply state where the build materials M is not supplied to the supply area MA (namely, the irradiation area EA or the melt pool MP) (refer to FIG. 10B). When the material nozzle 412 is in the supply state, as illustrated in FIG. 10A, the build materials M supplied from the material nozzle 412 arrive at the supply area MA. On the other hand, when the material nozzle 412 is in the non-supply state, as illustrated in FIG. 10B, the build materials M supplied from the material nozzle 412 do not arrive at the supply area MA. Therefore, as a period when the material nozzle 412 is in the non-supply state becomes longer, the supplied amount per unit time of the build materials M to the supply area MA decreases. In other words, as the period when the material nozzle 412 is in the non-supply state becomes longer, the supply rate of the build materials M decreases. Thus, the supply rate of the build materials M is controllable by the control apparatus 7 controlling the direction of supply of the build materials M. Note that the state of the material nozzle 412 may be in a semi-supply state in which the build materials M is supplied to a part of the supply area MA (namely, the irradiation area EA or the melt pool MP). In this case, the supply rate of the build materials M may be controlled by changing the area size of the above described part to which the build materials are supplied from the material nozzle 412.

(3-1-2) First Variation Reducing Operation for Controlling Heat Transfer Rate

Next, with reference to FIG. 11A to FIG. 11C, the first variation reducing operation for controlling the heat transfer rate will be described. Note that each of FIG. 11A to FIG. 11C illustrates the method of controlling the supply rate of the build materials M when the irradiation area EA is set twice at the area WA1 in the layer forming period, for the purpose of simple description.

Each of FIG. 11A to FIG. 11C is a graph that illustrates time on the horizontal axis and the heat transfer rate on the vertical axis. Since the irradiation area EA moves on the build surface CS with time, the horizontal axis in FIG. 11A to FIG. 11C corresponds to the position of the irradiation area EA set on the build surface CS, as with the horizontal axis in FIG. 6A to FIG. 6C described above.

As illustrated in FIG. 11A, the control apparatus 7 may control the heat transfer rate (i) such that the heat transfer rate for the area WA1 during the period when the irradiation area EA is set at the area WA1 at the first time is the same as the heat transfer rate for the area WA2, and (ii) such that the heat transfer rate for the area WA1 during the period when the irradiation area EA is set at the area WA1 at the second time is zero. In other words, the control apparatus 7 may control the heat transfer rate (i) such that the heat transfer rate for the area WA1 at which the irradiation area EA is set for the first time is the same as the heat transfer rate for the area WA2, and (ii) such that the heat transfer rate for the area WA1 at which the irradiation area EA is set again is zero. Note that a state where the heat transfer rate is zero is equivalent to a state where the light EL is not irradiated. Therefore, it can be said that the control apparatus 7 controls the build apparatus 4 (i) such that the area WA1 at which the irradiation area EA is set for the first time is irradiated with the light EL as with the area WA2 and (ii) such that the area WA1 at which the irradiation area EA is set again is not irradiated with the light EL. Note that the control apparatus 7 may control the heat transfer rate such that the heat transfer rate for the area WA1 at which the irradiation area EA is set at the second time is lower than the heat transfer rate for the area WA1 at which the irradiation area EA is set at the first time. Moreover, the control apparatus 7 may also perform such a control that the intensity or energy amount per unit time of the light EL for the area WA1 at which the irradiation area EA is set at the second time is lower than the intensity or energy amount per unit time of the light EL for the area WA1 at which the irradiation area EA is set at the first time.

Alternatively, the control apparatus 7 may control the heat transfer rate (i) such that the heat transfer rate for the area WA1 during the period when the irradiation area EA is set at the area WA1 at the second time is the same as the heat transfer rate for the area WA2, and (ii) such that the heat transfer rate for the area WA1 during the period when the irradiation area EA is set at the area WA1 at the first time is zero. In other words, the control apparatus 7 may control the heat transfer rate (i) such that the heat transfer rate for the area WA1 at which the irradiation area EA is set at a certain timing is the same as the heat transfer rate for the area WA2, and (ii) such that the heat transfer rate for the area WA1 at which the irradiation area EA is set at the other timing is zero. Even when the irradiation area EA is set twice or more times at the area WA1 in the layer forming period, in the same manner, the control apparatus 7 may control the heat transfer rate (i) such that the heat transfer rate for the area WA1 at which the irradiation area EA is set at a certain timing is the same as the heat transfer rate for the area WA2, and (ii) such that the heat transfer rate for the area WA1 at which the irradiation area EA is set at the other timing is zero. Note that the control apparatus 7 may control the heat transfer rate such that the heat transfer rate for the area WA1 at which the irradiation area EA is set at the first time is lower than the heat transfer rate for the area WA1 at which the irradiation area EA is set at the second time. Moreover, the control apparatus 7 may also perform such a control that the intensity or energy per unit time of the light EL for the area WA1 at which the irradiation area EA is set at the first time is lower than the intensity or energy per unit time of the light EL for the area WA1 at which the irradiation area EA is set at the second time. Moreover, the control apparatus 7 may control the heat transfer rate such that the heat transfer rate for the area WA1 at which the irradiation area EA is set at a certain timing is the same as the heat transfer rate for the area WA2, and such that the heat transfer rate for the area WA1 at which the irradiation area EA is set at the other timing is lower than the heat transfer rate for the area WA2.

As a result of the control of the heat transfer rate as described above, a total amount of the heat transferred to the area WA1 from the light EL in the layer forming period is the same as the total amount of the heat transferred to the area WA2 from the light EL in the layer forming period. More specifically, the total amount of the heat transferred to the area WA1 having a certain size from the light EL in the layer forming period is the same as the total amount of the heat transferred to the area WA2 having the same size from the light EL in the layer forming period. In other words, a value obtained by dividing the total amount of the heat transferred to the area WA1 from the light EL in the layer forming period by the area size of the area WA1 (namely, the heat amount transferred from the light EL per unit area) is the same as a value obtained by dividing the total amount of the heat transferred to the area WA2 from the light EL in the layer forming period by the area size of the area WA2. Thus, at the area WA1 and the area WA2, the build materials M of the same amount per unit area are supplied, molten and re-solidified. Here is the reason why. Although there is a possibility that a larger amount of build materials M are molten with increasing the amount of the heat transferred from the light EL, the total amount of the heat transferred to the area WA1 from the light EL is the same as the total amount of the heat transferred to the area WA2 from the light EL. Thus, there is a relatively high possibility that a molten amount (specifically, a molten amount per unit area) of the build materials M at the area WA1 is the same as a molten amount of the build materials M at the area WA2. As a result, as with the case where the supply rate is controlled as described above, the variation between the height h1 of the build object S1 formed at the area WA1 and the height h2 of the build object S2 formed at the area WA2 is reduced. This results in an improved formation accuracy of the three-dimensional structural object ST that is an aggregation of the build object. Note that when there is a nonlinear relationship between the heat transfer rate and the heights h1 and h2 of the build object, the heat transfer rate may be controlled in view of the nonlinear relationship.

Moreover, when the heat transfer rate is controlled, the melt pool MP having the same size as that at the area WA2 is formed at the area WA1. Here is the reason why. Although there is a possibility that a larger melt pool MP is formed with increasing the amount of the heat transferred from the light EL, the total amount of the heat transferred to the area WA1 from the light EL is the same as the total amount of the heat transferred to the area WA2 from the light EL. Thus, there is a relatively high possibility that the size of the melt pool MP formed at the area WA1 is the same as the size of the melt pool MP formed at the area WA2. As a result, as with the case where the supply rate is controlled as described above, the variation between the height h1 of the build object S1 formed at the area WA1 and the height h2 of the build object S2 formed at the area WA2 is reduced. This is because there is a possibility that the width of the build materials M (or the size in a direction along the build surface CS) that are re-solidified after being molten at the melt pool MP increases as the size of the melt pool MP increases. Thus, if the build materials M having the same amount are supplied to the melt pool MP that is relatively large and the melt pool MP that is relatively small, the build object having a relatively low height may be formed at a part at which the relatively large melt pool MP is formed due to a relatively increased width, whereas the build object having a relatively high height may be formed at a part at which the relatively small melt pool MP is formed due to a relatively reduced width. In the present embodiment, however, since the size of the melt pool MP formed at the area WA1 is the same as the size of the melt pool MP formed at the area WA2, the variation between the height h1 of the build object S1 formed at the area WA1 and the height h2 of the build object S2 formed at the area WA2 is reduced. This results in an improved formation accuracy of the three-dimensional structural object ST that is an aggregation of the build object.

Alternatively, as illustrated in FIG. 11B and FIG. 11C, the control apparatus 7 may control the heat transfer rate such that the area WA1 is irradiated with the light EL at each time when the irradiation area EA is set at the area WA1 (namely, such that the heat transfer rate for the area WA1 will never be zero). In this case, the control apparatus 7 controls the supply rate of the build materials M such that both of the heat transfer rate for the area WA1 during the period when the irradiation are EA is set at the area WA1 at the first time and the heat transfer rate for the area WA1 during the period when the irradiation area EA is set at the area WA1 at the second time are lower than the heat transfer rate for the area WA2. Note that the control apparatus 7 may control the heat transfer rate, as illustrated in FIG. 11B, such that the heat transfer rate for the area WA1 during the period when the irradiation are EA is set at the area WA1 at the first time is different from the heat transfer rate for the area WA1 during the period when the irradiation area EA is set at the area WA1 at the second time. Alternatively, as illustrated in FIG. 11C, the control apparatus 7 may control the heat transfer rate such that the heat transfer rate for the area WA1 during the period when the irradiation are EA is set at the area WA1 at the first time is the same as the heat transfer rate for the area WA1 during the period when the irradiation area EA is set at the area WA1 at the second time. When the heat transfer rate is controlled as illustrated in FIG. 11B or FIG. 11C, the difference between the total amount of the heat transferred to the area WA1 in the layer forming period and the total amount of the heat transferred to the area WA2 in the layer forming period decreases in comparison with the case where the heat transfer rate for the area WA1 is always the same as the heat transfer rate for the area WA2. As a result, the variation between the height h1 of the build object S1 formed at the area WA1 and the height h2 of the build object S2 formed at the area WA2 is reduced. Note that when there is a nonlinear relationship between the heat transfer rate and the heights h1 and h2 of the build object, the heat transfer rate may be controlled in view of the nonlinear relationship.

When controlling the heat transfer rate such that the area WA1 is irradiated with the light EL at each time when the irradiation area EA is set at the area WA1, the control apparatus 7 may control the heat transfer rate for the area WA1 during the period when the irradiation area EA is set at the area WA1 at the first time and the heat transfer rate for the area WA1 during the period when the irradiation area EA is set at the area WA1 at the second time such that the total amount of the heat transferred to the area WA1 in the layer forming period is the same as the total amount of the heat transferred to the area WA2 in the layer forming period. As a result, in the same manner as the case where the heat transfer rate is controlled as illustrated in FIG. 11A, the total number of the heat transferred to the area WA1 in the layer forming period is the same as the total number of the heat transferred to the area WA2 in the layer forming period. As a result, the variation between the height h1 of the build object S1 formed at the area WA1 and the height h2 of the build object S2 formed at the area WA2 is more appropriately reduced.

Even when the irradiation area EA is set twice or more times at the area WA1 in the layer forming period, in the same manner, the control apparatus 7 may control the heat transfer rate such that the heat transfer rate for the area WA1 during each period when the irradiation area EA is set at the area WA1 is lower than the heat transfer rate for the area WA2. Moreover, the control apparatus 7 may control the heat transfer rate for the area WA1 during each period when the irradiation area EA is set at the area WA1 such that the total amount of the heat transferred to the area WA1 in the layer forming period is the same as the total amount of the heat transferred to the area WA2 in the layer forming period.

Next, with reference to FIG. 12 to FIG. 14, a specific method for controlling the heat transfer rate will be described.

The control apparatus 7 may control the intensity or energy amount per unit area of the light EL on the irradiation area EA in order to control the heat transfer rate. Specifically, as illustrated in FIG. 12, the heat transfer rate increases as the intensity or energy amount per unit area of the light EL on the irradiation area EA increases. Thus, the control apparatus 7 may control the heat transfer rate by controlling the intensity or energy amount per unit area of the light EL on the irradiation area EA.

In order to control the intensity per unit area of the light EL on the irradiation area EA, the control apparatus 7 may control the light source 5. For example, the control apparatus 7 may control the intensity of the light EL emitted from the light source 5. When the light EL is the pulse light, the intensity per unit area of the light EL on the irradiation area EA increases as the emission time (or ON time) of the pulse light becomes longer (in other words, as the quenching time (or OFF time) of the pulse light becomes shorter). Thus, when the light EL is the pulse light, for example, the control apparatus 7 may control the duty ratio of the light EL emitted from the light source 5.

In order to control the intensity or energy amount per unit area of the light EL on the irradiation area EA, the control apparatus 7 may control the irradiation optical system 411. For example, the control apparatus 7 may control the intensity or energy amount per unit area of the light EL emitted from the irradiation optical system 411. In this case, the irradiation optical system 411 may be provided with an optical member for controlling the intensity or energy amount of the light EL in the irradiation optical system 411.

In order to control the intensity or energy amount per unit area of the light EL on the irradiation area EA, as illustrated in FIG. 0.13A and FIG. 13B, the control apparatus 7 may control a light shielding member 471 that is disposed on the build apparatus 4 such that it is insertable to or detachable from an optical path of the light EL between the irradiation optical system 411 and the irradiation area EA. Specifically, the light shielding member 471 is movable relative to the optical path of the light EL by a not-illustrated driving system (e.g., an actuator, etc.). With the movement of the light shielding member 471, a state of the light shielding member 471 is switchable between a light shielding state where the optical path of the light EL is shielded (refer to FIG. 13A) and a non-light shielding state where the optical path of the light EL is not shielded (refer to FIG. 13B). When the light shielding member 471 is in the light shielding state, as illustrated in FIG. 13A, the light EL emitted from the irradiation optical system 411 is shielded by the light shielding member 471. When the light shielding member 471 is formed of a material through which the light EL is not transmitted, the light EL does not arrive at the irradiation area EA. When the light shielding member 471 is formed of a material through which a part of the light EL is transmitted, a part of the light EL does not arrive at the irradiation area EA. In other words, the irradiation area EA is irradiated with the light EL the intensity of which is attenuated by the light shielding member 471. On the other hand, when the light shielding member 471 is in the non-light shielding state, as illustrated in FIG. 13B, the light EL emitted from the irradiation optical system 411 is not shielded by the light shielding member 471 and arrives at the irradiation area EA. As a result, when the light shielding member 471 is in the light shielding state, the intensity per unit area of the light EL on the irradiation area EA is reduced in comparison with when the light shielding member 471 is in the non-light shielding state. Note that the light shielding member 471 may be controlled by the control apparatus 7 to be in a semi-light shielding state in which the light shielding member 471 shields a part of the light EL emitted from the irradiation optical path 411. Note that the control apparatus 7 may control a ratio between a period when the light shielding member 471 is in the light shielding state and a period when the light shielding member 471 is in the non-light shielding state. As the period when the light shielding member 471 is in the light shielding state becomes longer (in other words, as the period when the light shielding member 471 is in the non-light shielding state becomes shorter), the intensity per unit area of the light EL on the irradiation area EA decreases. Moreover, the light shielding member 471 may be disposed inside the irradiation optical system 411 or may be disposed on an optical path between the light source 5 and the irradiation optical system 411.

In order to control the heat transfer rate, the control apparatus 7 may control a light concentration position (namely, a defocus amount) of the light EL. Specifically, as the light concentration position moves away from the build surface CS (namely, as the defocus amount increases), the intensity per unit area of the light EL on the irradiation area EA decreases. Therefore, as the light concentration position moves away from the build surface CS (namely, as the defocus amount increases), the heat transfer rate decreases. Thus, the control apparatus 7 may control the heat transfer rate by controlling the light concentration position. In order to control the light concentration position, as illustrated in FIG. 14A and FIG. 14B, the control apparatus 7 may control a condensing optical member 472 provided for the irradiation optical system 411. Note that FIG. 14A illustrates a state where the intensity or energy amount per unit area of the light EL on the irradiation area EA is relatively high because the light concentration position is set on the build surface CS. On the other hand, FIG. 14B illustrates a state where the intensity or energy amount per unit area of the light EL on the irradiation area EA is relatively low because the light concentration position is set at a distance from on the build surface CS. Alternatively, the control apparatus 7 may control the driving system 42 in order to control the light concentration position. Specifically, the control apparatus 7 may control a relative position between the build surface CS and the light concentration position by moving the build head 41 (especially, the irradiation optical system 411) along the Z axis relative to the build surface CS. As described later, if the build apparatus 4 is provided with a driving system for moving the stage 43, the control apparatus 7 may control the relative position between the build surface CS and the light concentration position by moving the stage 43 (namely, the build surface CS) along the Z axis relative to the build head 41. Note that the relative position between the build surface CS and the light concentration position may be controlled by moving a part of the optical member that constitutes the irradiation optical system 411.

In order to so control the heat transfer rate, the control apparatus 7 may control an intensity distribution or an energy amount distribution of the light EL in the irradiation area EA. Note that the control of the intensity or energy amount per unit area of the light EL in the irradiation area EA and the control of the light concentration position described above are a specific example of the control of the intensity distribution of the light EL in the irradiation area EA. In order to control the intensity distribution of the light EL in the irradiation area EA, the control apparatus 7 may control an optical member for controlling the intensity distribution provided for the irradiation optical system 411. At least one of a filter having a desired density distribution in a plane that intersects with an optical path of the light EL, an aspheric optical member (for example, a refractive type of optical member or a reflective type of optical member) having a desired surface shape in the plane that intersects with the optical path of the light EL, a diffractive optical element, a spatial light modulator and the like may be used as the optical member for controlling the intensity distribution.

In order to so control the heat transfer rate, the control apparatus 7 may control at least one of the size, shape and position of the irradiation area EA on the build surface CS. A change in at least one of the size, shape and position of the irradiation area EA on the build surface CS causes a change in the intensity distribution or energy amount distribution of the light EL on the build surface CS. Therefore, the control apparatus 7 may control the heat transfer rate by controlling at least one of the size, shape and position of the irradiation area EA on the build surface CS.

The control apparatus 7 may control any property of the light EL that is correlated with the intensity of the light EL in order to so control the heat transfer rate, the. The control apparatus 7 may control any property of the light EL that is correlated with the heat transfer rate in order to control the heat transfer rate. At least one of the size, shape and position of the irradiation area EA on the build surface CS may be an example of any property of the light EL. That is because the change in at least one of the size, shape and position of the irradiation area EA on the build surface CS causes a change in the intensity distribution of the light EL on the build surface CS. Moreover, a wavelength of the light EL directed to the build surface CS may be an example of any characteristic. When the wavelength of the light EL varies, an absorption rate of the light of the build materials M varies, and this changes the heat transfer rate that is the heat amount transferred from the light EL to the build surface CS per unit time. As described above, the melt pool may be formed at the build object of the build materials M in the second or subsequent build process. In this case, there is a possibility that the absorption rate of the light EL is different between the build materials M and the build surface CS. For example, when a material constituting the build surface CS is different from the build materials M, the absorption rate of the light EL is possibly different between the build materials M and the build surface CS. Even in this case, the heat transfer rate may be controlled in view of the absorption rate of the light EL in a part that is irradiated with the light EL.

(3-1-3) First Variation Reducing Operation for Controlling Moving Speed of Irradiation Area EA Next, with reference to FIG. 15A and FIG. 15B, the first variation reducing operation for controlling the moving speed of the irradiation area EA will be described. Note that each of FIG. 15A and FIG. 15B illustrates a method of controlling the moving speed of the irradiation area EA when the irradiation area EA is set twice at the area WA1 in the layer forming period, for the purpose of simple description.

Each of FIG. 15A and FIG. 15B is a graph that illustrates time on the horizontal axis and the moving speed of the irradiation area EA on the vertical axis. Since the irradiation area EA moves on the build surface CS with time, the horizontal axis in FIG. 15A and FIG. 15B corresponds to the position of the irradiation area EA set on the build surface CS, as with the horizontal axis in FIG. 6A to FIG. 6C described above.

As illustrated in FIG. 15A and FIG. 15B, the control apparatus 7 controls the moving speed of the irradiation area EA such that both of the moving speed of the irradiation area EA during the period when the irradiation area EA is set at the area WA1 at the first time and the moving speed of the irradiation area EA during the period when the irradiation area EA is set at the area WA1 at the second time are higher than the moving speed of the irradiation area EA during the period when the irradiation area EA is set at the area WA2. Note that the control apparatus 7 may control the moving speed of the irradiation area EA, as illustrated in FIG. 15A, such that the moving speed of the irradiation area EA during the period when the irradiation area EA is set at the area WA1 at the first time is different from the moving speed of the irradiation area EA during the period when the irradiation area EA is set at the area WA1 at the second time. Alternatively, as illustrated in FIG. 15B, the control apparatus 7 may control the moving speed of the irradiation area EA such that the moving speed of the irradiation area EA during the period when the irradiation area EA is set at the area WA1 at the first time is the same as the moving speed of the irradiation area EA during the period when the irradiation area EA is set at the area WA1 at the second time.

Here, as the moving speed of the irradiation area EA increases, a time when the irradiation area EA is set at a certain area part on the build surface CS becomes shorter. As the time when the irradiation area EA is set at a certain area part on the build surface CS becomes shorter, the heat amount transferred from the light EL to the area part decreases. As the heat amount transferred from the light EL to a certain area part on the build surface CS decreases, the molten amount of the build materials M at the area part decreases. Moreover, as the moving speed of the irradiation area EA increases, a moving speed of the supply area MA that is set at the same position as that of the irradiation area EA increases. As the moving speed of the supply area MA increases, a time when the supply area MA is set at a certain area part on the build surface CS becomes shorter. As the time when the supply area MA is set at a certain area part on the build surface CS becomes shorter, a supplied amount of the build materials EL to the area part on the build surface CS decreases. As the supplied amount of the build materials to a certain area part on the build surface CS decreases, the molten amount of the build materials M at the area part decreases. Thus, when the moving speed of the irradiation area EA is controlled as illustrated in FIG. 15A or FIG. 15B, the difference between the total amount of the build materials M molten at the area WA1 in the layer forming period and the total amount of the build materials M molten at the area WA2 in the layer forming period decreases in comparison with the case where the moving speed of the irradiation area EA is always constant. More specifically, the difference between the total amount of the build materials M molten at the area WA1 having a certain size in the layer forming period and the total amount of the build materials M molten at the area WA2 having the same size in the layer forming period decreases. In other words, the difference between a value obtained by dividing the total amount of the build materials M molten at the area WA1 in the layer forming period by the area size of the area WA1 (namely, the molten amount of the build materials M per unit area) and a value obtained by dividing the total amount of the build materials M molten at the area WA2 in the layer forming period by the area size of the area WA2. As a result, the variation between the height h1 of the build object S1 formed at the area WA1 and the height h2 of the build object S2 formed at the area WA2 is reduced.

The control apparatus 7 may control the moving speed of the irradiation area EA such that the total amount of the build materials M molten at the area WA1 in the layer forming period is the same as the total amount of the build materials M molten at the area WA2 in the layer forming period. For example, when the series of build process is performed N times due to N times of setting the irradiation area EA at the area WA1 (wherein N is an integer of 2 or more), the control apparatus 7 may control the moving speed of the irradiation area EA such that the moving speed of the irradiation area EA during each period when the irradiation area EA is set at the area WA1 is N times the moving speed of the irradiation area EA during the period when the irradiation area EA is set at the area WA2. Alternatively, for example, when the series of build process is performed N times due to N times of setting the irradiation area EA at the area WA1, the control apparatus 7 may control the moving speed of the irradiation area EA such that an average of the moving speed of the irradiation area EA during each period when the irradiation area EA is set at the area WA1 is the same as the moving speed of the irradiation area EA during the period when the irradiation area EA is set at the area WA2. As a result, the variation between the height h1 of the build object S1 formed at the area WA1 and the height h2 of the build object S2 formed at the area WA2 is more appropriately reduced. Note that when there is a nonlinear relationship between the moving speed of the irradiation area EA and the heights h1 and h2 of the build object, the moving speed may be controlled in view of the nonlinear relationship.

The control apparatus 7 may control the driving system 42 in order to control the moving speed of the irradiation area EA. In other words, the control apparatus 7 may control the relative moving speed of the irradiation area EA relative to the build surface CS by controlling a moving speed of the build head 41 (especially, a moving speed in a direction along the XY plane). As described later, when the build apparatus 4 is provided with the driving system for moving the stage 43, the control apparatus 7 may control the relative moving speed of the irradiation area EA relative to the build surface CS by controlling the moving speed of the build head 41 (especially, the moving speed in the direction along the XY plane). As described late, when the irradiation optical system 411 is provided with an optical member (for example, a Galvano scanner and the like) that is allowed to deflect the light EL, the control apparatus 7 may control the relative moving speed of the irradiation area EA relative to the build surface CS by controlling the optical member that is allowed to deflect the light EL.

(3-2) Second Variation Reducing Operation

Next, the second variation reducing operation will be described. The second variation reducing operation corresponds to an operation for reducing the variation in the height of the build object or the like when the build surface CS includes areas having different characteristics to the heat transferred from the light EL (hereinafter referred to as "heat characteristics"). In particular, the second variation reducing operation corresponds to an operation for reducing the variation in the height of the build object when the build surface CS includes the areas having different heat characteristics due to a difference in the relative moving speed of the irradiation area EA (namely, the supply area MA or the melt pool MP) relative to the build surface CS.

Specifically, as illustrated in FIG. 16A, during the layer forming period when one structural layer SL is formed on the build surface CS, the irradiation area EA moves on the build surface CS along the moving trajectory based on the pattern of the structural layer SL on the build surface CS, as described above. Here, the irradiation area EA does not always move at a constant moving speed along the moving trajectory. In other words, the moving speed of the irradiation area EA may change in the layer forming period. For example, as illustrated in FIG. 16A, the moving direction of the irradiation area EA may change at a certain point P3 on the build surface CS. In this case, as illustrated in FIG. 16B, the moving speed of the irradiation area EA that used to be constant in the beginning gradually decreases as the irradiation area EA approaches the point P3. Then, the moving speed of the irradiation area EA becomes minimum (for example, zero) at a time point when the irradiation area EA arrives at the point P3. Then, the moving speed of the irradiation area EA gradually increases as the irradiation area EA moves away from the point P3. Then, after the moving speed of the irradiation area EA increases to some extent, the irradiation area EA moves at a certain moving speed.

A change in the moving speed of the irradiation area EA as described above also causes a change in the time when the irradiation area EA is set at a certain area part on the build surface CS. The change in the time when the irradiation area EA is set at a certain area part on the build surface CS also causes a change in the heat amount transferred from the light EL to the area part. Thus, when the moving speed of the irradiation area EA changes, the build surface CS includes the areas having different heat characteristics regarding the heat amount transferred from the light EL. More specifically, as the moving speed of the irradiation area EA decreases, the time when the irradiation EA is set at a certain area part on the build surface CS becomes longer. As the time when the irradiation EA is set at a certain area part on the build surface CS becomes longer, the heat amount transferred from the light EL to the area part increases.

A change in the heat amount transferred from the light EL to a certain area part on the build surface CS may cause a change in the molten amount of the build materials M at the area part. The change in the molten amount of the build materials M at a certain area part on the build surface CS may also causes a change in the height (or any characteristic such as a size) of the build object formed of the build materials M that are molten at the area part. More specifically, as the heat amount transferred from the light EL to a certain area part on the build surface increases, the molten amount of the build materials M at the area part may increase. As the molten amount of the build materials M at a certain area part on the build surface CS increases, the height of the build object formed of the build materials M that are molten at the area part may increase. Thus, if the series of build process is performed without considering the change in the moving speed of the irradiation area EA in a situation in which the build object having a constant height should be formed on the build surface CS, as illustrated in a lower part of FIG. 16B, the build object having different heights may be formed depending on the moving speed of the irradiation area EA. More specifically, as the moving speed of the irradiation area EA that moves at a certain area part on the build surface CS decreases, the height of the build object formed at the area part may increase.

As an example, when the moving speed of the irradiation area EA changes, as illustrated in FIG. 16A and FIG. 16B, it can be said that the moving surface CS includes an area WA3 at which the irradiation area EA moves at a first moving speed and an area WA4 at which the irradiation area EA moves at a second moving speed that is lower than the first moving speed. In this case, if the series of build process is performed without distinguishing the area WA3 from the area WA4 in a situation where the build object having the same height should be formed at the area WA3 and the area WA4, as illustrated in the lower part of FIG. 16B, there is a possibility that the height of the build object formed at the area WA3 is not the same as the height of the build object formed at the area WA4. Typically, as illustrated in FIG. 16B, the height of the build object formed at the area WA3 is possibly higher than the height of the build object formed at the area WA4 by an increased heat amount transferred from the light EL.

Thus, in the present embodiment, the control apparatus 7 (in other words, the build system 1 under the control of the control apparatus 7) performs the second variation reducing operation to reduce the variation in the height of the build object formed at the areas having different heat characteristics due to a difference in the moving speed of the irradiation area EA. For example, the control apparatus 7 performs the second variation reducing operation to reduce the variation between the height of the build object formed at the area WA1 and the height of the build object formed at the area WA4.

The control apparatus 7 may perform the second variation reducing operation for reducing the variation in the height of the build object by controlling the supply rate of the build materials M. Specifically, as illustrated in FIG. 17, the control apparatus 7 may control the supply rate such that the supply rate decreases as the moving speed of the irradiation area EA decreases. In other words, the control apparatus 7 may control the supply rate such that the supply rate to a certain area part on the build surface CS decreases as the moving speed of the irradiation area EA that moves on the certain area part decreases. As a result, in a situation where the build object formed at an area part at which the irradiation area EA moves at a relatively low moving speed has a relatively high height, the supplied amount of the build materials M to the area part decreases. The reduction in the supplied amount of the build materials M also reduces the molten amount of the build materials M. Thus, the build object formed at the area part at which the irradiation area EA moves at a relatively low moving speed is prevented from having a relatively high height. As a result, the variation in the height of the build object formed at the areas having different heat characteristics due to the difference in the relative moving speed of the irradiation area EA is reduced. Note that when there is a nonlinear relationship between the moving speed and the height of the build object, the supply rate may be controlled in view of the nonlinear relationship.

As an example, when the moving speed of the irradiation area EA changes as illustrated in the first graph at the top in FIG. 18 (which is the same as the upper graph in FIG. 16B), the control apparatus 7 may control the supply rate such that the supply rate changes as illustrated in the second graph in FIG. 18. In other words, the control apparatus 7 may control the supply rate such that the supply rate for the area WA3 at which the irradiation area EA moves at the first moving speed that is relatively fast is higher than the supply rate for the area WA4 at which the irradiation area EA moves at the second moving speed that is relatively slow. As a result, as illustrated in the third part in FIG. 18, the build object having the constant height is formed at the areas having different heat characteristics due to the difference in the moving speed of the irradiation area EA. In other words, the variation between the height of the build object formed at the area WA3 and the height of the build object formed at the area WA4 is reduced. Note that FIG. 18 illustrates the supply rate that is kept constant regardless of the moving speed of the irradiation area EA and the build object formed in that case by alternate long and short dashes lines as a comparative example.

The control apparatus 7 may perform the second variation reducing operation for reducing the variation in the height of the build object by controlling the heat transfer rate, in addition to or instead of controlling the supply rate. Specifically, as illustrated in FIG. 19, the control apparatus 7 may control the heat transfer rate such that the heat transfer rate decreases as the moving speed of the irradiation area EA decreases. In other words, the control apparatus 7 may control the heat transfer rate such that the heat transfer rate for a certain area part on the build surface CS decreases as the moving speed of the irradiation area EA that moves at the certain area part decreases. As a result, in the situation in which the build object formed at an area part at which the irradiation area EA moves at a relatively low moving speed has a relatively high height, the heat amount transferred from the light EL to the area part decreases. The reduction in the transferred heat amount also reduces the molten amount of the build materials M. Thus, the build object formed at the area part at which the irradiation area EA moves at a relatively low moving speed is prevented from having a relatively high height. As a result, the variation in the height of the build object formed at the areas having different heat characteristics due to the difference in the relative moving speed of the irradiation area EA is reduced. Note that when there is a nonlinear relationship between the moving speed and the height of the build object, the heat transfer rate may be controlled in view of the nonlinear relationship.

As an example, when the moving speed of the irradiation area EA changes as illustrated in the first graph at the top in FIG. 20 (which is the same as the upper graph in FIG. 16B), the control apparatus 7 may control the heat transfer rate such that the heat transfer rate changes as illustrated in the second graph in FIG. 20. In other words, the control apparatus 7 may control the heat transfer rate such that the heat transfer rate for the area WA3 at which the irradiation area EA moves at the first moving speed that is relatively fast is higher than the heat transfer rate for the area WA4 at which the irradiation area EA moves at the second moving speed that is relatively slow. As a result, as illustrated in the third part in FIG. 20, the build object having the constant height is formed at the areas having different heat characteristics due to the difference in the moving speed of the irradiation area EA. In other words, the variation between the height of the build object formed at the area WA3 and the height of the build object formed at the area WA4 is reduced. Note that FIG. 20 illustrates the heat transfer rate that is kept constant regardless of the moving speed of the irradiation area EA and the build object formed in that case by alternate long and short dashes lines as a comparative example.

Note that a specific method for controlling each of the supply rate and the heat transfer rate in the second variation reducing operation may be the same as that in the first variation reducing operation described above. Thus, an explanation of the specific method for controlling each of the supply rate and the heat transfer rate is omitted.

Moreover, one of the causes of the variation in the height of the build object that should be reduced in the second variation reducing operation is a change in the relative moving speed of the irradiation area EA (namely, the supply area MA) relative to the build surface CS, as described above. Then, when a desired structural layer SL (furthermore, three-dimensional structural object ST) is formed even if the moving speed of the irradiation area EA is controlled and changed from an original moving speed, the control apparatus 7 may perform the second variation reducing operation for reducing the variation in the height of the build object by controlling the moving speed of the irradiation area EA. In this case, the causes of the variation in the height of the build object (namely, the technical problems that the variation in the height of the build object occurs) are solved by controlling the moving speed of the irradiation area EA. Thus, it can be said that he second variation reducing operation for controlling the moving speed of the irradiation area EA is an operation for eliminating the causes of the variation in the height of the build object. On the other hand, there is a possibility that the moving speed of the irradiation area EA is not allowed to be controlled nor changed from the original moving speed in some patterns of the moving trajectory of the irradiation area EA. In this case, the control apparatus 7 may not control the moving speed of the irradiation area EA so as to perform the second variation reducing operation for reducing the variation in the height of the build object. Note that when there is a nonlinear relationship between the moving speed and the height of the build object, the moving speed may be controlled in view of the nonlinear relationship.

(3-3) Third Variation Reducing Operation

Next, the third variation reducing operation will be described. The third variation reducing operation corresponds to an operation for reducing the variation in the height of the build object or the like when the build surface CS includes the areas having different heat characteristics, as with the second variation reducing operation. The third variation reducing operation, however, corresponds to an operation for reducing the variation in the height of the build object when the build surface CS includes the areas having different heat characteristics due to a difference in a diffusion degree of the heat of the existing structural object in which at least a part of its surface is set on the build surface CS (e.g., at least one of the workpiece W and the structural layer SL already formed).

Specifically, when the three-dimensional structural object ST is formed, the build surface CS is irradiated with the light EL, as described above. The heat is transferred from the light EL to the build surface CS. This heat is transferred (or substantially diffused) even into the existing structural object through the build surface CS. Here, the diffusion degree (namely, an index indicating easiness or difficulty of the diffusion) of the heat of the existing structural object is not always uniform depending on a characteristic of the existing structural object (e.g., at least one of a structure, a material and a shape). In other words, there is a possibility that the build surface CS includes the areas having different heat characteristics regarding the diffusion degree of the heat transferred from the light EL. For example, there is a possibility that the build surface CS includes an area at which the heat transferred from the light EL is not diffused relatively easily and an area at which the heat transferred from the light EL is diffused relatively easily.

For example, as illustrated in FIG. 21A, the existing structural object has a surface SF2 on which the build surface CS is not set, in addition to a surface SF1 on which the irradiation area EA is set. In this case, the diffusion degree of the heat transferred to a certain area part on the build surface CS is presumable on the basis of a degree of a proximity of the certain area part on the build surface CS and the surface SF2. Specifically, as illustrated in FIG. 21A, an area WA5 on the build surface CS is closer to the surface SF2 than an area WA6 on the build surface CS is. Thus, a diffusion path (namely, a diffusion path inside the existing structural object) of the heat transferred to the area WA5 is smaller or fewer than a diffusion path of the heat transferred to the area WA6. Therefore, as a distance decreases between the certain area part on the build surface CS and the surface SF2 on which the build surface CS is not set, the heat transferred to the certain area part is diffused more hardly. Note that it can be also said in the example illustrated in FIG. 21A that the build surface CS includes the area WA5 at which the heat transferred from the light EL is not diffused relatively easily and the area WA6 at which the heat transferred from the light EL is diffused relatively easily.

The area WA5 at which the heat is not diffused relatively easily, stores the heat for a relatively long time, compared to the area WA6 at which the heat transferred from the light EL is diffused relatively easily. As a result, there is a possibility that a larger amount of build materials M are molten at the area WA5 than at the area WA6 by a degree of the relatively long-time storage of the heat. Thus, if the series of build process is performed without considering the difference in the diffusion degree of the heat in the situation in which the build object having the constant height should be formed on the build surface CS, the build object having different heights may be formed on the basis of the difference in the diffusion degree of the heat. More specifically, as the heat transferred to a certain area part on the build surface CS is diffused more hardly, the height of the build object formed at the area part may increase. As an example, for example, if the series of build process is performed without distinguishing the area WA5 from the area WA6 in a situation in which the build object having the same height should be formed at the area WA5 and the area WA6, as illustrated in FIG. 21B, there is a possibility that a height h5 of a build object S5 formed at the area WA5 is not the same as a height h6 of a build object S6 formed at the area WA6.

Thus, in the present embodiment, the control apparatus 7 (in other words, the build system 1 under the control of the control apparatus 7) performs the third variation reducing operation to reduce the variation in the height of the build object formed at the areas having different heat characteristics due to the difference in the diffusion degree of the heat. For example, the control apparatus 7 performs the third variation reducing operation to reduce the variation between the height of the build object formed at the area WA5 and the height of the build object formed at the area WA6.

The control apparatus 7 may perform the third variation reducing operation for reducing the variation in the height of the build object by controlling the supply rate of the build materials M. Specifically, as illustrated in FIG. 22, the control apparatus 7 may control the supply rate such that the supply rate decreases as the heat is diffused more hardly. In other words, the control apparatus 7 may control the supply rate such that the supply rate to a certain area part on the build surface CS decreases as the heat transferred to the certain area part is diffused more hardly. As a result, in a situation in which the build object formed at an area part at which the heat is not diffused relatively easily has a relatively high height, the supplied amount of the build materials M to the area part decreases. The reduction in the supplied amount of the build materials M also reduces the molten amount of the build materials M. Thus, the build object formed at the area part at which the heat is not diffused relatively easily is prevented from having a relatively high height. As a result, the variation is reduced in the height of the build object formed at the areas having different heat characteristics due to the difference in the diffusion degree of the heat. Note that when there is a nonlinear relationship between the diffusion degree of the heat and the height of the build object, the supply rate may be controlled in view of the nonlinear relationship.

The control apparatus 7 may perform the third variation reducing operation for reducing the variation in the height of the build object by controlling the heat transfer rate, in addition to or instead of controlling the supply rate. Specifically, as illustrated in FIG. 23, the control apparatus 7 may control the heat transfer rate such that the heat transfer rate decreases as the heat is diffused more hardly. In other words, the control apparatus 7 may control the heat transfer rate such that the heat transfer rate for a certain area part on the build surface CS decreases as the heat transferred to the certain area part is diffused more hardly. As a result, in the situation in which the build object formed at an area part at which the heat is not diffused relatively easily has a relatively high height, the heat amount transferred to the area part decreases. The reduction in the transferred heat amount also reduces the molten amount of the build materials M. Thus, the build object formed at the area part at which the heat is not diffused relatively easily is prevented from having a relatively high height. As a result, the variation is reduced in the height of the build object formed at the areas having different heat characteristics due to the difference in the diffusion degree of the heat. Note that when there is a nonlinear relationship between the diffusion degree of the heat and the height of the build object, the heat transfer rate may be controlled in view of the nonlinear relationship.

The control apparatus 7 may perform the third variation reducing operation for reducing the variation in the height of the build object by controlling the relative moving speed of the irradiation area EA relative to the build surface CS, in addition to or instead of controlling at least one of the supply rate and the heat transfer rate. Specifically, as illustrated in FIG. 24, the control apparatus 7 may control the moving speed of the irradiation area EA such that the moving speed of the irradiation area EA increases as the heat is diffused more hardly. In other words, the control apparatus 7 may control the moving speed of the irradiation area EA such that the moving speed of the irradiation area EA increases when the irradiation area EA is set on a certain area part on the build surface CS as the heat transferred to the certain area part is diffused more hardly. As the moving speed of the irradiation area EA increases when the irradiation area EA is set on a certain area part on the build surface CS, the supplied amount of the build materials M to the area part and the heat amount transferred from the light EL to the area part decrease, as described above. Thus, when the moving speed of the irradiation area EA is controlled as illustrated in FIG. 24, in the situation in which the build object formed at an area part at which the heat is not diffused relatively easily has a relatively high height, the supplied amount of the build materials M to the area part and the heat amount transferred to the area part decrease. Thus, the build object formed at the area part at which the heat is not diffused relatively easily is prevented from having a relatively high height. As a result, the variation is reduced in the height of the build object formed at the areas having different heat characteristics due to the difference in the diffusion degree of the heat. Note that when there is a nonlinear relationship between the diffusion degree of the heat and the height of the build object, the moving speed may be controlled in view of the nonlinear relationship.

Note that a specific method for controlling each of the supply rate, the heat transfer rate and the moving speed of the irradiation area EA in the third variation reducing operation may be the same as that in the first variation reducing operation described above. Thus, an explanation of the specific method for controlling each of the supply rate, the heat transfer rate and the moving speed of the irradiation area EA is omitted.

Note that although temporal characteristics of the heat are exemplified as the heat characteristics in the description of the third variation reducing operation, other characteristics regarding the heat may be also used.

(3-4) Fourth Variation Reducing Operation

Next, the fourth variation reducing operation will be described. The fourth variation reducing operation corresponds to an operation for reducing the variation in the height of the build object or the like when the build surface CS includes the areas having different heat characteristics, as with the second variation reducing operation. The fourth variation reducing operation, however, corresponds to an operation for reducing the variation in the height of the build object when the build surface CS includes the areas having different heat characteristics due to a difference in frequency of the irradiation of the light EL.

Specifically, when each structural layer SL that constitutes the three-dimensional structural object ST is formed, the irradiation area EA moves on the build surface CS and is irradiated with the light EL at the timing when the irradiation area EA is set at the area on which the build object should be formed on the build surface CS, as described above. Here, depending on at least one of the pattern of the moving trajectory of the irradiation area EA and the pattern of the structural layer SL (namely, the distribution pattern of the area on which the build object should be formed on the build surface CS), there is a possibility that the build surface CS includes areas having different frequencies of the irradiation of the light EL. For example, as illustrated in FIG. 25A, there is a possibility that the build surface CS includes an area WA7 that is irradiated with the light EL with relatively high frequency and an area WA8 that is irradiated with the light EL with relatively low frequency.

Note that the frequency of the irradiation of the light EL on a certain area on the build surface CS increases as a period from a time when a part of the certain area is irradiated with the light EL to a time when another part of the certain area is then irradiated with the light EL decreases. The frequency of the irradiation of the light EL on the certain area on the build surface CS increases as the number of times when the certain area is irradiated with the light EL per unit time increases. The frequency of the irradiation of the light EL on the certain area on the build surface CS increases as the number of times when the certain area is irradiated with the light EL per unit area increases.

The area WA7 that is irradiated with the light EL with relatively high frequency has a higher possibility that it is further heated by the heat from the light that is newly irradiated to the area WA7 before the area WA7 heated by the heat transferred from the light EL is cooled, than the area WA8 that is irradiated with the light EL with relatively low frequency. In other words, at the area WA7 that is irradiated with the light EL with relatively high frequency, the heat from the light EL is hardly released, compared to the area WA8 that is irradiated with the light EL with relatively low frequency. In other words, the area WA7 that is irradiated with the light EL with relatively high frequency stores the heat from the light EL for a relatively long time, compared to the area WA8 that is irradiated with the light EL with relatively low frequency. As a result, there is a possibility that a larger amount of build materials M are molten at the area WA7 than at the area WA8 by a degree of the relatively long-time storage of the heat. Thus, if the series of build process is performed without considering the difference in the frequency of the irradiation of the light EL in the situation in which the build object having the constant height should be formed on the build surface CS, the build object having different heights may be formed on the basis of the difference in the frequency of the irradiation of the light EL. More specifically, as the frequency of the irradiation of the light EL on a certain area part on the build surface CS increases, the height of the build object formed at the area part may increase. As an example, for example, if the series of build process is performed without distinguishing the area WA7 from the area WA8 in a situation in which the build object of the same height should be formed at the area WA7 and the area WA8, as illustrated in FIG. 25B, there is a possibility that a height h7 of a build object S7 formed at the area WA7 is not the same as a height h8 of a build object S8 formed at the area WA8.

Thus, in the present embodiment, the control apparatus 7 (in other words, the build system 1 under the control of the control apparatus 7) performs the fourth variation reducing operation to reduce the variation in the height of the build object formed at the areas having different heat characteristics due to the difference in the frequency of the irradiation of the light EL. For example, the control apparatus 7 performs the fourth variation reducing operation to reduce the variation between the height of the build object formed at the area WA7 and the height of the build object formed at the area WA8.

The control apparatus 7 may perform the fourth variation reducing operation for reducing the variation in the height of the build object by controlling the supply rate of the build materials M. Specifically, as illustrated in FIG. 26, the control apparatus 7 may control the supply rate such that the supply rate decreases as the frequency of the irradiation of the light EL increases. In other words, the control apparatus 7 may control the supply rate such that the supply rate to a certain area part on the build surface CS decreases as the frequency of the irradiation of the light EL on the certain area part increases. As a result, in a situation in which the build object formed at an area part that is irradiated with the light EL with high frequency has a relatively high height, the supplied amount of the build materials M to the area part decreases. The reduction in the supplied amount of the build materials M also reduces the molten amount of the build materials M. Thus, the build object formed at the area part that is irradiated with the light LE with high frequency is prevented from having a relatively high height. As a result, the variation is reduced in the height of the build object formed at the areas having different heat characteristics due to the difference in the frequency of the irradiation of the light EL. Note that when there is a nonlinear relationship between the frequency of the irradiation of the light EL and the height of the build object, the supply rate may be controlled in view of the nonlinear relationship.

The control apparatus 7 may perform the fourth variation reducing operation for reducing the variation in the height of the build object by controlling the heat transfer rate, in addition to or instead of controlling the supply rate. Specifically, as illustrated in FIG. 27, the control apparatus 7 may control the heat transfer rate such that the heat transfer rate decreases as the frequency of the irradiation of the light EL increases. In other words, the control apparatus 7 may control the heat transfer rate such that the heat transfer rate for on a certain area part on the build surface CS decreases as the frequency of the irradiation of the light EL on the certain area part increases. As a result, in the situation in which the build object formed at an area part that is irradiated with the light EL with high frequency has a relatively high height, the heat amount transferred to the area part decreases. The reduction in the transferred heat amount also reduces the molten amount of the build materials M. Thus, the build object formed at the area part that is irradiated with the light EL with high frequency is prevented from having a relatively high height. As a result, the variation is reduced in the height of the build object formed at the areas having different heat characteristics due to the difference in the frequency of the irradiation of the light EL. Note that when there is a nonlinear relationship between the frequency of the irradiation of the light EL and the height of the build object, the heat transfer rate may be controlled in view of the nonlinear relationship.

The control apparatus 7 may perform the fourth variation reducing operation for reducing the variation in the height of the build object by controlling the relative moving speed of the irradiation area EA relative to the build surface CS, in addition to or instead of controlling at least one of the supply rate and the heat transfer rate. Specifically, as illustrated in FIG. 28, the control apparatus 7 may control the moving speed of the irradiation area EA such that the moving speed of the irradiation area EA increases as the frequency of the irradiation of the light EL increases. In other words, the control apparatus 7 may control the moving speed of the irradiation area EA such that the moving speed of the irradiation area EA increases when the irradiation area EA is set on t a certain area part on the build surface CS as the frequency of the irradiation of the light EL on the certain area part increases. As the moving speed of the irradiation area EA increases when the irradiation area EA is set on a certain area part on the build surface CS, the supplied amount of the build materials M to the area part and the heat amount transferred from the light EL to the area part decrease, as described above. Thus, when the moving speed of the irradiation area EA is controlled as illustrated in FIG. 28, in the situation in which the build object formed at an area part that is irradiated with the light EL with high frequency has a relatively high height, the supplied amount of the build materials M to the area part and the heat amount transferred to the area part decrease. Thus, the build object formed at the area part that is irradiated with the light EL with high frequency is prevented from having a relatively high height. As a result, the variation is reduced in the height of the build object formed at the areas having different heat characteristics due to the difference in the frequency of the irradiation of the light EL. Note that when there is a nonlinear relationship between the frequency of the irradiation of the light EL and the height of the build object, the moving speed may be controlled in view of the nonlinear relationship.

Note that a specific method for controlling each of the supply rate, the heat transfer rate and the moving speed of the irradiation area EA in the fourth variation reducing operation may be the same as that in the first variation reducing operation described above. Thus, an explanation of the specific method for controlling each of the supply rate, the heat transfer rate and the moving speed of the irradiation area EA is omitted.

Note that although the temporal characteristics of the heat are exemplified as the heat characteristics in the description of the fourth variation reducing operation, other characteristics regarding the heat may be also used.

(3-5) Modified Example of Variation Reducing Operation

In the above described description, the control apparatus 7 controls at least one of the supply rate of the build materials M, the heat transfer rate and the moving speed of the irradiation area EA relative to the build surface CS in order to reduce the variation in the height (or any characteristic such as a size) of the build object formed at different areas on the build surface CS. Conversely, however, the control apparatus 7 is allowed to control the characteristic of the build object (furthermore, the structural layer SL and the three-dimensional structural object ST) formed on the build surface CS by controlling at least one of the supply rate, the heat transfer rate and the moving speed of the irradiation area EA relative to the build surface CS. Thus, the control apparatus 7 may control at least one of the supply rate, the heat transfer rate and the moving speed of the irradiation area EA relative to the build surface CS such that the characteristic of the build object (furthermore, the structural layer SL and the three-dimensional structural object ST) formed on the build surface CS is a desired characteristic. Namely, the control apparatus 7 may control at least one of the supply rate, the heat transfer rate and the moving speed of the irradiation area EA relative to the build surface CS, for a purpose that is different from the purpose of reducing the variation of the characteristic. For example, the control apparatus 7 may control at least one of the supply rate, the heat transfer rate and the moving speed of the irradiation area EA relative to the build surface CS in order to control a characteristic (e.g., at least one of the height and the size) of a mark formed by a marking operation described later.

In the above described description, as an example of a cause of the presence of the plurality of areas having different heat characteristics on the build surface CS, the difference in the relative moving speed of the irradiation area EA relative to the build surface CS, the difference in the diffusion degree of the heat of the existing structural object in which at least a part of its surface is set on the build surface CS, and the difference in the frequency of the irradiation of the light EL are described. There is, however, also a possibility that the build surface CS includes the areas having different heat characteristics for another reason. Even in this case, if the series of build process is performed without considering the difference in the heat characteristics in a situation in which the build object with the same characteristic should be formed at the areas having different heat characteristics, the build object with varied characteristics may be formed. Thus, the control apparatus 7 may perform the variation reduction operation for reducing the variation in the height of the build object formed at the areas having different heat characteristics due to another cause that is different from the above described cause. Note that an example of the situation in which the build surface CS includes the plurality of areas having different heat characteristics may be a situation in which a type, a density, or the like of the materials varies depending on the place of the build surface CS.

(4) MARKING OPERATION

Next, a marking operation for forming a mark SM on the build surface CS by using the build operation described above will be described.

(4-1) Overview of Marking Operation

The marking operation is an operation for forming the mark SM that includes an aggregation of the build object on the build surface CS by forming the build object that is distributed with a predetermined distribution pattern on the build surface CS by using the build operation.

The mark SM may include a mark regarding a sign that has a predetermined meaning on a plane along the build surface CS. The sign may include, for example, at least one of a sign that means any character, a sign that means any number, a sign that means any figure, a sign that means any symbol and a sign that has another meaning. For example, FIG. 29 illustrates an example in which a mark SM1 regarding a sign that means a letter N in alphabet, a SM2 regarding a sign that means an exclamation mark, and a SM3 regarding a sign that means a circular figure are formed on the build surface CS.

The mark SM is a structural object that projects in convexity from the build surface CS, as illustrated in a lower part of FIG. 29. The mark SM may be a structural object including a single structural layer SL. In other words, the mark SM may be formed from the single structural layer SL. In this case, a height of the mark SM (namely, a length from the build surface CS to an upper surface (namely, a +Z-side surface), the same is applied to the below description) is the same as the height of the structural layer SL. Alternatively, the mark SM may be a structural object including a plurality of structural layers SL laminated. In other words, the mark SM may be formed from the plurality of layered structural layers SL. In this case, the height of the mark SM is the same as the height of the plurality of layered structural layers SL. Therefore, typically, the height of the mark SM increases as the number of the structural layers SL that constitute the mark SM increases.

A maximum value of the height of the mark SM, however, does not exceed a minimum value of a size of the mark SM in the direction along the build surface CS. In other words, the height of a highest part of the mark SM does not exceed the size of a thinnest part of the mark SM. For example, in an example illustrated in FIG. 29, a maximum value hm1 of the height of the mark SM1 does not exceed a minimum value wm1 of the size of the mark SM1 in the direction along the build surface CS. A maximum value hm2 of the height of the mark SM2 does not exceed a minimum value wm2 of the size of the mark SM2 in the direction along the build surface CS. However, there may be formed the mark SM in which the maximum value of the height exceeds the minimum value of the size of the mark SM in the direction along the build surface CS.

In order to form such a mark SM, the control apparatus 7 firstly obtains coordinate data relating to the mark SM that should be formed on the build surface CS. The coordinate data are data that represent a position at which the mark SM is distributed on the build surface CS (namely, a position of the distribution of a mark forming area at which the build object that constitutes the mark SM should be formed). Since the build surface CS is a flat surface, the coordinate data correspond to data that are associated with (or are correlated with) a position at which the mark SM is distributed on a two-dimensional coordinate system. An example of such coordinate data may be at least one of font data (e.g., Bitmap font data, etc.) and image data (e.g., Bitmap image data, etc.). The control apparatus 7 may obtain the coordinate data from another apparatus that provides the coordinate data. Alternatively, the control apparatus 7 itself may generate the coordinate data. In this case, the control apparatus 7 firstly obtains a sign information, which represents a sign corresponding to the mark SM that should be formed on the build surface CS. For example, the control apparatus 7 obtains, from an input apparatus that is operated by a user to input a sign that should be formed on the build surface CS, an information relating to the content of an operation by the user who designates the sign, as the sign information. The control apparatus 7 then converts the obtained sign information to the coordinate data. For example, the control apparatus 7 converts the sign indicated by the sign information to a sign pattern on the two-dimensional plane and specifies the coordinates of an area at which the sign pattern is distributed on the two-dimensional plane. As a result, the control apparatus 7 obtains the coordinate data indicating the specified coordinates.

After obtaining the coordinate data, the control apparatus 7 forms the mark SM by performing the build operation on the basis of the coordinate data. Specifically, the control apparatus 7 forms at least one structural layer SL on the basis of the coordinate data, thereby to form the mark SM including the structural layer SL. When forming each structural layer SL, as illustrated in FIG. 30A, the control apparatus 7 may control the build apparatus 4 to emit the light EL at a timing when the mark forming area indicated by the coordinate data overlaps with the irradiation area EA while moving the irradiation area EA relative to the build surface CS such that the movement of the irradiation area EA along the Y axis direction and the movement of the irradiation area EA along the X axis direction are repeated. In other words, the irradiation area EA may be moved to perform the raster scan on the build surface CS. Alternatively, as illustrated in FIG. 30B, the control apparatus 7 may control the build apparatus 4 to emit the light EL while moving the irradiation area EA along the distribution pattern of the mark forming area indicated by the coordinate data. In other words, the irradiation area EA may be moved to perform the vector scan on the build surface CS. In any case, the structural layer SL of a pattern based on the mark SM (namely, a pattern based on the moving trajectory of the melt pool MP) is formed on the build surface CS.

Note that the control apparatus 7 may perform the variation reducing operation described above in at least a part of a period when the marking operation is performed. In other words, the control apparatus 7 may perform the variation reducing operation in at least a part of the period when the marking operation is performed, thereby to reduce the variation of the characteristic (e.g., at least one of the height and the size) of the mark SM formed by the marking operation. For example, when the irradiation area EA is set twice or more times at the same area on the build surface CS in at least a part of a period when the mark SM is formed, the control apparatus 7 may perform the first variation reducing operation. For example, when the build surface CS includes the areas having different heat characteristics due to the difference in the relative moving speed of the irradiation area EA relative to the build surface CS in at least a part of the period when the mark SM is formed, the control apparatus 7 may perform the second variation reducing operation. For example, when the build surface CS includes the areas having different heat characteristics due to the difference in the diffusion degree of the heat of the existing structural object in which at least a part of its surface is set on the build surface CS in at least a part of the period when the mark SM is formed, the control apparatus 7 may perform the third variation reducing operation. For example, when the build surface CS includes the areas having different heat characteristics due to the difference in the frequency of the irradiation of the light EL in at least a part of the period when the mark SM is formed, the control apparatus 7 may perform the fourth variation reducing operation.

(4-2) Characteristic Controlling Operation for controlling Characteristic of Mark SM Next, a characteristic controlling operation for controlling the characteristic of the mark SM formed by the marking operation will be described. In the present embodiment, as an example of the characteristic controlling operation, the build system 1 performs at least one of a size controlling operation for controlling the size of the mark SM, a height controlling operation for controlling the height of the mark SM, a shape controlling operation for controlling a shape of the surface of the mark SM (especially, an upper surface of a convex structural object that constitutes the mark SM) and a color controlling operation for controlling a color of the mark SM. Thus, hereinafter, the size controlling operation, the height controlling operation, the shape controlling operation and the color controlling operation will be described in order. Note that the build system 1 may perform the characteristic controlling operation for reducing another characteristic of the mark SM.

(4-2-1) Size Controlling Operation

Firstly, the size controlling operation will be described. The size controlling operation is a characteristic controlling operation for controlling the size (especially, a size in at least one of the X axis direction and the Y axis direction, and for example, a width) of the mark SM. Note that the size of the mark SM may be a size in an in-plane direction of the build surface CS. The build system 1 may form the mark SM having a desired size by performing the size controlling operation under the control of the control apparatus 7. Moreover, the build system 1 may form a plurality of marks SM which indicate the same sign but have different sizes, respectively, by performing the size controlling operation under the control of the control apparatus 7. Furthermore, the build system 1 may form the mark SM while changing the size of the mark SM in forming the mark SM by performing the size controlling operation under the control of the control apparatus 7.

For example, each of FIG. 31A to FIG. 31D illustrates a mark SM11 regarding a linear figure and a mark SM12 regarding a circular figure, which are formed on the build surface CS. In an example illustrated in FIG. 31A, the control apparatus 7 performs the size controlling operation such that the size (especially, the size in the Y axis direction, and the width) of the mark SM11 is a desired first size wm11 and the size of the mark SM12 is a desired second size wm12. In an example illustrated in FIG. 31B, the control apparatus 7 performs the size controlling operation such that the size of the mark SM11 is a desired third size wm13 that is smaller than the first size wm11, and the size of the mark SM12 is a desired fourth size wm12 that is larger than the second size wm12. In the examples illustrated in FIG. 31A and FIG. 31B, it can be said that the control apparatus 7 performs the size controlling operation such that the size of a part of the mark SM11 is same as the size of another part of the mark SM11 that is different from the part (in other words, such that the size is not changed in forming of the mark SM11). In an example illustrated in FIG. 31C, the control apparatus 7 performs the size controlling operation such that the size of the mark SM11 continuously changes (increases herein) from the first size wm11 to a fifth size wm15, which is larger than the first size wm11, along a longitudinal direction of the mark SM11 (namely, the X axis direction). In an example illustrated in FIG. 31D, the control apparatus 7 performs the size controlling operation such that the size of the mark SM11 changes (increases herein) in stages or discretely from the first size wm11 to the fifth size wm15 along the longitudinal direction of the mark SM11. In the examples illustrated in FIG. 31C and FIG. 31D, it can be said that the control apparatus 7 performs the size controlling operation such that the size of a part of the mark SM11 is different from the size of another part of the mark SM11 that is different from the part (in other words, such that the size is changed in forming the mark SM11).

The control apparatus 7 may control the size of the mark SM by controlling the heat transfer rate. Specifically, as the heat transfer rate for a certain area part on the build surface CS increases, the heat amount transferred from the light EL to the area part increases. As the heat amount transferred to a certain area part on the build surface CS increases, the size of the melt pool MP formed at the area part increases. As the size of the melt pool MP formed at a certain area part on the build surface CS increases, the size of the build object formed at the area part increases. As the size of the build object formed at a certain area part on the build surface CS increases, the size of the mark SM including the build object also increases. In other words, as illustrated in FIG. 32, as the heat transfer rate increases, the size of the mark SM increases. Therefore, the control apparatus 7 may control the size of the mark SM by controlling the heat transfer rate. Note that a specific method for controlling the heat transfer rate in the characteristic controlling operation including the size controlling operation may be the same as that in the variation reducing operation described above. Therefore, an explanation of the specific method for controlling the heat transfer rate is omitted in the description of the characteristic controlling operation. Note that when there is a nonlinear relationship between the heat transfer rate and the size of the mark SM, the heat transfer rate may be controlled in view of the nonlinear relationship.

The control apparatus 7 may control the size of the mark SM by controlling the relative moving speed of the irradiation area EA relative to the build surface CS. Specifically, as the moving speed of the irradiation area EA at a certain area part on the build surface CS decreases, the time when the irradiation area EA is set at the certain area part on the build surface CS becomes longer. As the time when the irradiation area EA is set at a certain area part on the build surface CS becomes longer, the heat amount transferred from the light EL to the area part increases. As the heat amount transferred to a certain area part on the build surface CS increases, the size of the build object (and furthermore, the size of the mark SM) formed at the area part increases. In other words, as illustrated in FIG. 33, as the moving speed of the irradiation area EA decreases, the size of the mark SM increases. Therefore, the control apparatus 7 may control the size of the mark SM by controlling the moving speed of the irradiation area EA. Note that a specific method for controlling the moving speed of the irradiation area EA in the characteristic controlling operation including the size controlling operation may be the same as that in the variation reducing operation described above. Therefore, an explanation of the specific method for controlling the moving speed of the irradiation area EA is omitted in the description of the characteristic controlling operation. Note that when there is a nonlinear relationship between the moving speed and the size of the mark SM, the moving speed may be controlled in view of the nonlinear relationship.

The control apparatus 7 may control the size of the mark SM by controlling the size of the irradiation area EA. Specifically, as the size of the irradiation area EA set at a certain area part on the build surface CS increases, the size of an area that is actually irradiated with the light EL at the area part increases. As the size of the area that is actually irradiated with the light EL at a certain area part on the build surface CS increases, the size of the melt pool MP formed at the area part increases. As the size of the melt pool MP formed at a certain area part on the build surface CS increases, the size of the build object (and furthermore, the size of the mark SM) formed at the area part increases. In other words, as illustrated in FIG. 34, as the size of the irradiation area EA increases, the size of the mark SM increases. Therefore, the control apparatus 7 may control the size of the mark SM by controlling the size of the irradiation area EA. Note that when there is a nonlinear relationship between the size of the irradiation area EA and the size of the mark SM, the size of the irradiation area EA may be controlled in view of the nonlinear relationship.

In order to control the size of the irradiation area EA, the control apparatus 7 may control the irradiation optical system 411. For example, the control apparatus 7 may control the size of the irradiation area EA by controlling an optical member provided for the irradiation optical system 411 for controlling the size of the irradiation area EA. An example of such an optical member may be at least one of a condensing optical member, a diaphragm member that is allowed to change at least one of a shape and a size of an aperture through which the light EL is allowed to pass, a light forming member that is allowed to variably set an area through which the light EL is allowed to pass and an area that shields the light EL in a plane intersecting with an optical axis of the irradiation optical system 411 (namely, a plane intersecting with a propagating direction of the light EL) and the like. Alternatively, the size of the irradiation area EA changes when a relative position (especially, a relative position in the Z axis direction) of the build surface CS relative to the irradiation optical system 411 changes, and thus, the control apparatus 7 may control the size of the irradiation area EA by controlling the driving system 42 to control the relative position of the build surface CS relative to the irradiation optical system 411.

As illustrated in FIG. 35A and FIG. 35B, the mark SM includes a plurality of linear structural objects LP in some cases. There is a possibility that the mark SM including the plurality of linear structural objects LP is formed when an operation for moving the irradiation area EA along the Y axis direction and irradiating it with the light EL and an operation for moving the irradiation area EA along the X axis direction without irradiating it with the light EL are repeated, for example, as illustrated in FIG. 5A and FIG. 30A. Specifically, when the plurality of linear structural objects LP formed to extend in the Y axis direction by moving the irradiation area EA along the Y axis direction and irradiating it with the light EL are formed without or with a gap along the X axis direction, then, the mark SM corresponding to an aggregation of the plurality of linear structural objects LP can be formed.

As described above, when the mark SM includes the plurality of linear structural objects LP, the control apparatus 7 may control the size (especially, a size along a direction in which the plurality of linear structural objects LP are arranged) of the mark SM by controlling the number of the plurality of linear structural objects LP that constitute the mark SM. Specifically, as illustrated in FIG. 35A and FIG. 35B, as the number of the plurality of linear structural objects LP that constitute the mark SM decreases, the size of the mark SM decreases. FIG. 35A and FIG. 35B illustrate an example in which a size wm17 of the mark SM including N2 linear structural objects LP is smaller than a size wm16 of the mark SM including N1 linear structural objects LP (wherein N2<N1).

As described above, when the mark SM includes the plurality of linear structural objects LP, the control apparatus 7 may control the size (especially, a size along a longitudinal direction or extending direction of the plurality of linear structural objects LP) of the mark SM by controlling a length of the plurality of linear structural objects LP that constitute the mark SM. Specifically, as illustrated in FIG. 35C and FIG. 35D, as the length of the plurality of linear structural objects LP that constitute the mark SM decreases, the size of the mark SM decreases. FIG. 35C and FIG. 35D illustrate an example in which a size wm19 of the mark SM including relatively short linear structural objects LP (specifically, with a length of wm19) is smaller than a size wm18 of the mark SM including relatively long linear structural objects LP (specifically, with a length of wm18 (wherein wm19<wm18)).

Note that the control apparatus 7 may perform at least two combinations of the control of the supply rate of the build materials M, the control of the heat transfer rate, the control of the moving speed, and the control of the number of the linear structural objects.

(4-2-2) Height Controlling Operation

Next, the height controlling operation will be described. The height controlling operation is a characteristic controlling operation for controlling the height of the mark SM. The build system 1 may form the mark SM having a desired height by performing the height controlling operation under the control of the control apparatus 7. Moreover, the build system 1 may form a plurality of marks SM which indicate the same sign but have different heights, respectively, by performing the height controlling operation under the control of the control apparatus 7. Furthermore, the build system 1 may form the mark SM while changing the height of the mark SM in forming the mark SM by performing the height controlling operation under the control of the control apparatus 7.

For example, each of FIG. 36A to FIG. 36D illustrates the mark SM regarding a linear figure formed on the build surface CS. In an example illustrated in FIG. 36A, the control apparatus 7 performs the height controlling operation such that the height of the mark SM is a desired first height hm21. In an example illustrated in FIG. 36B, the control apparatus 7 performs the height controlling operation such that the height of the mark SM is a desired second height hm22, which is higher than the first height hm21. In the examples illustrated in FIG. 36A and FIG. 36B, it can be said that the control apparatus 7 performs the height controlling operation such that the height of a part of the mark SM is same as the height of another part of the mark SM that is different from the part (in other words, such that the height is not changed in forming the mark SM). In an example illustrated in FIG. 36C, the control apparatus 7 performs the height controlling operation such that the height of the mark SM continuously changes (increases herein) from the first height hm21 to a third height hm23, which is higher than the first height hm21, along a longitudinal direction of the mark SM (namely, the X axis direction). In an example illustrated in FIG. 36D, the control apparatus 7 performs the height controlling operation such that the height of the mark SM changes (increases herein) in stages or discretely from the first height hm21 to the third height hm23 along the longitudinal direction of the mark SM. In particular, in the examples illustrated in FIG. 36C and FIG. 36D, the control apparatus 7 performs the height controlling operation such that the height (namely, a height along the Z axis direction that intersects with the Y axis direction) of each of the parts that constitute the mark SM, which extends in the Y axis direction and which is formed by moving the irradiation area EA (namely, the melt pool MP) on the build surface CS along the Y axis direction, varies depending on a position of the each part along the Y axis direction. In the examples illustrated in FIG. 36C and FIG. 36D, it can be said that the control apparatus 7 performs the height controlling operation such that the height of a part of the mark SM is different from the height of another part of the mark SM that is different from the part (in other words, such that the height is changed in forming the mark SM). Note that the control apparatus 7 may perform the height controlling operation such that the height of the mark SM continuously changes along the longitudinal direction of the mark SM.

The control apparatus 7 may control the size of the mark SM by controlling the supply rate of the build materials M. Specifically, as the supply rate to a certain area part on the build surface CS increases, the supplied amount of the build materials M to the area part increases. As the supplied amount of the build materials M to a certain area part on the build surface CS increases, the molten amount of the build materials M at the area part increases. As the molten amount of the build materials M at a certain area part on the build surface CS increases, the height of the build object formed at the area part increases. As the height of the build object formed at a certain area part on the build surface CS increases, the height of the mark SM including the build object also increases. In other words, as illustrated in FIG. 37, as the supply rate increases, the height of the mark SM increases. Therefore, the control apparatus 7 may control the height of the mark SM by controlling the supply rate. Note that a specific method for controlling the supply rate in the characteristic controlling operation including the height controlling operation may be the same as that in the variation reducing operation described above. Therefore, an explanation of the specific method for controlling the supply rate is omitted in the description of the characteristic controlling operation. Note that when there is a nonlinear relationship between the supply rate and the height of the mark SM, the supply rate may be controlled in view of the nonlinear relationship.

The control apparatus 7 may control the height of the mark SM by controlling the heat transfer rate. Specifically, as the heat transfer rate for a certain area part on the build surface CS increases, the heat amount transferred from the light EL to the area part increases. As the heat amount transferred to a certain area part on the build surface CS increases, the molten amount of the build materials M at the area part possibly increases. As the molten amount of the build materials M at a certain area part on the build surface CS increases, the height of the build object (and furthermore, the height of the mark SM) formed at the area part increases. In other words, as illustrated in FIG. 38, as the heat transfer rate increases, the height of the mark SM increases. Therefore, the control apparatus 7 may control the height of the mark SM by controlling the heat transfer rate. Note that when there is a nonlinear relationship between the heat transfer rate and the height of the mark SM, the heat transfer rate may be controlled in view of the nonlinear relationship.

The control apparatus 7 may control the height of the mark SM by controlling the relative moving speed of the irradiation area EA relative to the build surface CS. Specifically, as the moving speed of the irradiation area EA at a certain area part on the build surface CS decreases, the heat amount transferred from the light EL to the area part increases. As the heat amount transferred to a certain area part on the build surface CS increases, the height of the build object (and furthermore, the height of the mark SM) formed at the area part increases. In other words, as illustrated in FIG. 39, as the moving speed of the irradiation area EA decreases, the height of the mark SM increases. Therefore, the control apparatus 7 may control the height of the mark SM by controlling the moving speed of the irradiation area EA. Note that when there is a nonlinear relationship between the moving speed and the height of the mark SM, the moving speed may be controlled in view of the nonlinear relationship.

As described above, the mark SM is a structural object including a plurality of structural layers SL laminated, in some cases. In this case, the control apparatus 7 may control the height of the mark SM by controlling the number of the plurality of structural layers SL (namely, the number of laminated layers of the structural layers SL) that constitute the mark SM. Specifically, as illustrated in FIG. 40A and FIG. 40B, as the number of the plurality of structural layers SL that constitute the mark SM decreases, the height of the mark SM decreases. FIG. 40A and FIG. 40B illustrate an example in which a height hm25 of the mark SM including L2 structural layers SL is higher than a height hm24 of the mark SM including L1 structural layers SL (wherein L2>L1).

Note that the control apparatus 7 may perform at least two combinations of the control of the supply rate of the build materials M, the control of the heat transfer rate, the control of the moving speed, and the control of the number of the laminated layers.

(4-2-3) Shape Controlling Operation

Next, the shape controlling operation will be described. The shape controlling operation is a characteristic controlling operation for controlling the shape of the surface of the mark SM (especially, the upper surface of the convex structural object that constitutes the mark SM). The build system 1 may form the mark SM having a surface of a desired shape by performing the shape controlling operation under the control of the control apparatus 7. For example, as illustrated in FIG. 41A, the control apparatus 7 may perform the shape controlling operation to form the mark SM including a flat surface (especially, a flat surface parallel to the build surface CS). For example, as illustrated in FIG. 41B, the control apparatus 7 may perform the shape controlling operation to form the mark SM including a curved surface. For example, as illustrated in FIG. 41C, the control apparatus 7 may perform the shape controlling operation to form the mark SM including a flat surface that is inclined to the build surface CS.

The control apparatus 7 may control the size of the build object that constitutes the mark SM by performing the same operation as the size controlling operation, thereby to control the shape of the surface of the mark SM. The control apparatus 7 may control the height of the build object that constitutes the mark SM by performing the same operation as the height controlling operation, thereby to control the shape of the surface of the mark SM. The control apparatus 7 may form the mark SM having a surface of a desired shape by performing the same operation as the normal build operation for forming the three-dimensional structural object ST having a desired shape.

The build system 1 may control a shape (especially, a shape of a cross-sectional surface including the Z axis that is a layered direction of the structural layer SL) of a virtual connecting surface VS that connects the surfaces of the mark(s) SM formed on the build surface CS by controlling at least one of the shape of the surface of the mark SM and the height of the mark SM under the control of the control apparatus 7. The build system 1 may form a plurality of marks SM having the connecting surface VS of a desired shape by performing at least one of the shape controlling operation and the height controlling operation under the control of the control apparatus 7. For example, as illustrated in FIG. 42A, the control apparatus 7 may perform the shape controlling operation to form the marks SM including a flat connecting surface VS (especially, a flat surface parallel to the build surface CS). For example, as illustrated in FIG. 42B, the control apparatus 7 may perform at least one of the shape controlling operation and the height controlling operation to form the marks SM including a curved connecting surface VS. For example, as illustrated in FIG. 42C, the control apparatus 7 may perform at least one of the shape controlling operation and the height controlling operation to form the marks SM including a flat connecting surface VS that is inclined to the build surface CS.

As described above, the mark SM is a convex structural object that projects from the build surface CS. In this case, the mark SM is usable as a seal for transferring a seal impression corresponding to a pattern of the mark SM to a target object TG by pressing the surface of the mark SM against the target object TG. For example, FIG. 43A illustrates an example in which the mark SM having an inversed pattern of letters N and C in alphabet is formed on the build surface CS corresponding to the surface of the workpiece W.

When a paint is coated to the surface of the mark SM and the surface of the mark SM is then pressed against a target surface TGS of the target object TG, then, as illustrated in FIG. 43B, a seal impression including the letters N and C in alphabet is transferred to the target surface TGS.

When the mark SM is pressed against the target object as described above, the control apparatus 7 may perform the shape controlling operation to control the shape of the connecting surface VS on the basis of a characteristic of the target object TG. Specifically, the control apparatus 7 may perform the shape controlling operation to control the shape of the connecting surface VS on the basis of a shape of the target surface TGS (specifically, a shape of a cross sectional surface including an axis that intersects with the target surface TGS) of a surface of the target object TG against which the mark SM is pressed. In this case, the control apparatus 7 may control the shape of the connecting surface VS such that the shape of the connecting surface VS has a complementary relationship with the shape of the target surface TGS. For example, as illustrated in FIG. 44A, the control apparatus 7 may perform the shape controlling operation to form the mark SM that allows a flat connecting surface VS having a complementary relationship with the target surface TGS when the target surface TGS is a flat surface. For example, as illustrated in FIG. 44B, the control apparatus 7 may perform the shape controlling operation to form the mark SM that allows a convex curved connecting surface VS having a complementary relationship with the target surface TGS when the target surface TGS is a concave curved surface. For example, as illustrated in FIG. 44C, the control apparatus 7 may perform the shape controlling operation to form the mark SM that allows a concave flat connecting surface VS having a complementary relationship with the target surface TGS when the target surface TGS is a convex flat surface. When the shape controlling operation is performed as described above, the surface of the mark SM is appropriately pressed against the target surface TGS of the target object TG, in comparison with the case where the shape controlling operation is not performed. Specifically, there is hardly a gap between the surface of the mark SM and the target surface TGS when the surface of the mark SM is pressed against the target surface TGS. As a result, whatever shape the target surface TGS has, the seal impression corresponding to the pattern of the mark SM can be appropriately transferred to the target surface TGS.

When the shape of the connecting surface VS is controlled on the basis of the characteristic of the target object TG, the control apparatus 7 may obtain a characteristic information relating to the characteristic of the target object TG and may control the shape of the connecting surface VS on the basis of the obtained characteristic information. The control apparatus 7 may obtain, as the characteristic information, a measurement result of a measurement apparatus that measures the characteristic of the target object TG. In this case, the measurement apparatus may be provided for the build system 1 or may be provided separately from the build system 1. Alternatively, the control apparatus 7 may obtain the characteristic information from another apparatus that stores the characteristic information.

Note that although the characteristic of the target object TG is the shape of the target surface TGS in the above description, the characteristic of the target object TG may be hardness, elasticity, or the like of the target object TG.

(4-2-4) Color Controlling Operation

Next, the color controlling operation will be described. The color controlling operation is a characteristic controlling operation for controlling the color of the mark SM (especially, the color of the surface of the mark SM). The build system 1 may form the mark SM having a desired color by performing the color controlling operation under the control of the control apparatus 7. Moreover, the build system 1 may form a plurality of marks SM which indicate the same sign but have different colors, respectively, by performing the color controlling operation under the control of the control apparatus 7. Furthermore, the build system 1 may form the mark SM while changing the color of the mark SM in forming the mark SM by performing the color controlling operation under the control of the control apparatus 7.

The control apparatus 7 may control the color of the mark SM by controlling a characteristic of a particular gas in the inner space of the chamber 44. In particular, the control apparatus 7 may control the color of the mark SM by controlling the characteristic of the particular gas in a space surrounding the melt pool MP located in the inner space of the chamber 44. In this case, the control apparatus 7 may control the characteristic of the particular gas such that the characteristic of the particular gas is a desired characteristic that allows the color of the mark SM to be a desired color. The particular gas includes a predetermined gas that influences the color of the mark SM. An example of the particular gas may be an oxygen gas.

The characteristic of the particular gas may include a concentration of the particular gas (namely, a concentration of the particular gas in the inner space of the chamber 44 (especially, the space surrounding the melt pool MP in the inner space)). When the particular gas is included in the purge gas (namely, when the gas supply apparatus 6 supplies the purge gas including the particular gas), the control apparatus 7 may control the concentration of the particular gas in the purge gas (namely, a particular gas content in the purge gas) to control the concentration of the particular gas in the inner space of the chamber 44. When the particular gas is not included in the purge gas (namely, when the gas supply apparatus 6 supplies the particular gas through a supply path that is different from that of the purge gas, or when an apparatus that is different from the gas supply apparatus 6 supplies the particular gas), the control apparatus 7 may control a flow rate of at least one of the particular gas and the purge gas supplied to the inner space of the chamber 44, thereby to control the concentration of the particular gas in the inner space of the chamber 44. Note that the concentration of the particular gas may be controlled only in the space surrounding the melt pool MP, instead of controlling the concentration of the particular gas in the entire inner space of the chamber 44.

As illustrated in FIG. 45A, the control apparatus 7 may control the characteristic of the particular gas such that the characteristic of the particular gas during a period when a first mark SM21 is formed is different from that during a period when a second mark SM22 that is different from the first mark SM21 is formed. In this case, as illustrated in FIG. 45B, the color of the first mark SM21 is different from that of the second mark SM22. As illustrated in FIG. 45C, the control apparatus 7 may control the characteristic of the particular gas such that the characteristic of the particular gas during a period when a first part SM21-1 of the first mark SM21 is formed is different from that during a period when a second part SM21-2, which is different from the first part SM21-1, of the first mark SM 21 is formed. In this case, as illustrated in FIG. 45D, the color of the first part SM21-1 of the first mark SM21 is different from that of the second part SM21-2 or the first mark SM21.

(4-2-5) Modified Example of Characteristic Controlling Operation

In the above description, the control apparatus 7 performs the characteristic controlling operation in order to control the characteristic of the mark SM formed by the marking operation. The control apparatus 7, however, may perform the characteristic controlling operation in order to control the characteristic of at least one of the build object, the structural layer SL and the three-dimensional structural object ST formed by the build operation, as well as the mark SM. In other words, the control apparatus 7 may perform the size controlling operation to control the size of at least one of the build object, the structural layer SL and the three-dimensional structural object ST. The control apparatus 7 may perform the height controlling operation to control the height of at least one of the build object, the structural layer SL and the three-dimensional structural object ST. The control apparatus 7 may perform the shape controlling operation to control the shape of at least one of the build object, the structural layer SL and the three-dimensional structural object ST. The control apparatus 7 may perform the color controlling operation to control the color of at least one of the build object, the structural layer SL and the three-dimensional structural object ST.

(5) PROCESSING OPERATION (POLISHING OPERATION)

The build system 1 may perform a processing operation for processing at least a part of the surface of at least one of the three-dimensional structural object ST and the mark SM. Note that the mark SM formed by the marking operation is a specific example of the three-dimensional structural object ST formed by the build operation. Thus, in a description of the processing operation, the three-dimensional structural object ST shall mean at least one of the three-dimensional structural object ST and the mark SM.

In the present embodiment, as an example of the processing operation, the build system 1 may perform a polishing operation for polishing at least a part of the surface of the three-dimensional structural object ST (especially, an upper surface of a top layer of the structural layers SL that constitute the three-dimensional structural object ST). Hereinafter, the polishing operation will be described. The surface that is polished by the polishing operation is hereinafter referred to as a "polishing target surface PS", for the purpose of simple description. Note that the build system 1 may perform the polishing operation for polishing at least a part of a side surface of one or more structural layers SL (namely, a surface that faces to a direction that intersects with the layered direction of the structural layer SL) of the three-dimensional structural object ST.

In the present embodiment, the "polishing operation for polishing the polishing target surface PS" includes an "operation for smoothing the polishing target surface PS, increasing a flatness of (namely, flatting) the polishing target surface PS and/or decreasing (namely, reducing) a roughness of the polishing target surface PS, compared to that before the polishing operation is performed". Incidentally, when the polishing target surface PS is polished, there is a possibility that a color of the polishing target surface PS changes, compared to that before the polishing operation is performed. Therefore, the "polishing operation for polishing the polishing target surface PS" may include an "operation for changing the color of the polishing target surface PS, compared to that before the polishing operation is performed". When the polishing target surface PS is polished, there is a possibility that at least one of a reflectance (e.g., a reflectance relative to any light) and a diffusivity (e.g., a diffusivity relative to any light) of the polishing target surface PS changes, compared to that before the polishing operation is performed. Therefore, the "polishing operation for polishing the polishing target surface PS" may include an "operation for changing at least one of the reflectance and the diffusivity of the polishing target surface PS, compared to that before the polishing operation is performed".

There is a possibility that the polishing target surface PS is a relatively rough surface (namely, a surface having concavity and convexity) that is smoothed (alternatively, that is flatted or whose roughness is decreased) by the polishing of the polishing operation. For example, as described above, in the present embodiment, the three-dimensional structural object ST is formed by melting and re-solidifying the powder-like or grain-like build materials M. Thus, there is a possibility that the build material M that is not molten is adhered to at least a part of the surface of the three-dimensional structural object ST. In this case, the surface to which the build material M that is not molten is adhered may be the relatively rough surface that is smoothed by the polishing operation. Moreover, there is a possibility that the build material M that is solidified again in an undesired shape is adhered to at least a part of the surface of the three-dimensional structural object ST. In this case, the surface to which the build material M that is solidified again in the undesired shape is adhered may be the relatively rough surface that is smoothed by the polishing operation. For example, as described above, in the present embodiment, the build head 41 moves along at least one of the X axis and the Y axis (namely, along the XY plane) in a period when each structural layer SL is formed. In this case, there is a possibility that a cyclic or non-cyclic concavity and convexity exists in accordance with a moving pattern (typically, a pitch of the movement) of the build head 41 at at least a part of the surface of the structural layers SL along the XY plane (as a result, the surface of the three-dimensional structural object ST), depending on a relative moving aspect of the build head 41 relative to the build surface CS. In this case, the surface at which the cyclic or non-cyclic concavity and convexity exists may be the relatively rough surface that is smoothed by the polishing operation.

In order to polish such a polishing target surface PS, the build system 1 irradiates the polishing target surface PS with the light EL under the control of the control apparatus 7. Namely, in the present embodiment, the polishing target surface PS is polished by the light EL. Specifically, as illustrated in FIG. 46A, the control apparatus 7 sets the irradiation area EA at a certain area part on the polishing target surface PS and irradiates the irradiation area EA with the light EL from the irradiation optical system 411. Note that FIG. 46A illustrates an example in which the polishing target surface PS is the surface at which the cyclic or non-cyclic concavity and convexity to be polished by the polishing operation exists. In this case, the control apparatus 7 sets the irradiation area EA at a desired area part on the polishing target surface PS by moving the build head 41, if needed. When the irradiation area EA is irradiated with the light EL, the build material M in the area part on the polishing target surface PS at which the irradiation area EA is set is molten again by the light EL as illustrated in FIG. 46B. When the build material M that is solidified to form the concavity and convexity is molten, the surface (namely, a boundary surface) of the molten build material M comes to be close to the flat surface or becomes the flat surface due to at least one of a weight and a surface tension of the molten build material M. Namely, a smoothness of the surface (namely, the boundary surface) of the molten build material M improves. Then, when the molten build material M is not irradiated with the light EL due to the movement of the build head 41, the molten build materials M is cooled and solidified (namely, coagulated) again. As a result, as illustrated in FIG. 46C, the build materials M that is solidified again to have a smoothed surface (alternatively, having an improved flatness and/or having a decreased roughness) constitutes the surface of the three-dimensional structural object ST. The polishing target surface PS is polished in this manner.

The control apparatus 7 repeats a series of polishing process including the melting the build material M by the irradiation of the light EL and the re-solidification of the molten build materials M while relatively moving the build head 41 relative to the three-dimensional structural object ST. Namely, the control apparatus 7 repeats the series of the polishing process while relatively moving the irradiation area EA relative to the polishing target surface PS. Specifically, for example, the control apparatus 7 may repeat the series of the polishing process while repeating the movement of the irradiation area EA along the Y axis direction and the movement of the irradiation area EA along the Y axis direction. In other words, the control apparatus 7 may repeat the series of the polishing process while moving the irradiation area EA along the moving trajectory corresponding to the scan by the raster scan that is described with reference to FIG. 3A. In this case, the control apparatus 7 irradiates the polishing target surface PS with the light EL and polishes the polishing target surface PS during a period when the irradiation area EA moves along either one of the X axis and the Y axis along which the moving distance by the one-time movement is larger than that along the other one and the control apparatus 7 does not irradiate the polishing target surface PS with the light EL during a period when the irradiation area EA moves along the other one of the X axis and the Y axis along which the moving distance by the one-time movement is smaller than that of either one. The control apparatus 7, however, may repeat the series of the polishing process while moving the irradiation area EA along the moving trajectory corresponding to the scan by the vector scan that is described with reference to FIG. 3B.

When the irradiation area EA moves along the moving trajectory corresponding to the scan by the raster scan in both of the build operation (or the marking operation) and the polishing operation, the control apparatus 7 may move the irradiation area EA such that the moving direction of the irradiation area EA during a period when the light EL is emitted in the build operation intersects with (namely, is different from) the moving direction of the irradiation area EA during a period when the light EL is emitted in the polishing operation. Specifically, as illustrated in FIG. 47A and FIG. 47B, when the moving direction of the irradiation area EA during the period when the light EL is emitted in the build operation is the Y axis direction, the control apparatus 7 may set the moving direction of the irradiation area EA during the polishing operation such that the moving direction of the irradiation area EA during the period when the light EL is emitted in the polishing operation is the X axis direction. Alternatively, when the moving direction of the irradiation area EA during the period when the light EL is emitted in the build operation is the X axis direction, the control apparatus 7 may set the moving direction of the irradiation area EA during the polishing operation such that the moving direction of the irradiation area EA during the period when the light EL is emitted in the polishing operation is the Y axis direction. As a result, the build system 1 appropriately polishes the polishing target surface PS having concavity and convexity that are caused by the moving pattern (typically, the pitch of the movement) of the build head 41 in the build operation so as to smooth the concavity and convexity (especially, to remove the concavity and convexity from the polishing target surface PS). Note that the moving direction of the irradiation area EA during the period when the light EL is emitted in the build operation is not necessarily orthogonal to the moving direction of the irradiation area EA during the period when the light EL is emitted in the polishing operation.

Alternatively, when the irradiation area EA moves along the moving trajectory corresponding to the scan by the raster scan in both of the build operation (or the marking operation) and the polishing operation, the control apparatus 7 may move the irradiation area EA such that the moving direction of the irradiation area EA during the period when the light EL is emitted in the build operation matches (namely, is the same as) the moving direction of the irradiation area EA during the period when the light EL is emitted in the polishing operation. Even in this case, the polishing target surface PS is polished. In this case, however, the control apparatus 7 may move the irradiation area EA such that the moving distance by one-time movement (namely, the pitch of the movement) of the irradiation area EA during a period when the light EL is not emitted in the build operation is different from the moving distance by one-time movement (namely, the pitch of the movement) of the irradiation area EA during a period when the light EL is not emitted in the polishing operation. In particular, the control apparatus 7 may move the irradiation area EA such that the moving distance of the irradiation area EA during the period when the light EL is not emitted in the polishing operation is smaller than the moving distance of the irradiation area EA during the period when the light EL is not emitted in the build operation. For example, specifically, as illustrated in FIG. 48A and FIG. 48B, when the moving distance of the irradiation area EA during the period when the light EL is not emitted in the build operation is a first moving distance P1, the control apparatus 7 may move the irradiation area EA such that the moving distance of the irradiation area EA during the period when the light EL is not emitted in the polishing operation is a second moving distance P2 that is smaller than the first moving distance P1. As a result, the build system 1 appropriately polishes the polishing target surface PS having concavity and convexity that are caused by the moving pattern of the build head 41 in the build operation so as to smooth the concavity and convexity. Note that the pitch of the movement of the irradiation area EA during the period when the light EL is not emitted in the polishing operation may be larger or smaller than the pitch of the movement of the irradiation area EA during the period when the light EL is not emitted in the build operation.

The control apparatus 7 may control the size of the irradiation area EA such that the size of the irradiation area EA during the period when the light EL is emitted in the build operation is different from that during the period when the light EL is emitted in the polishing operation. For example, the control apparatus 7 may control the size of the irradiation area EA such that the irradiation area EA during the period when the light EL is emitted in the build operation is larger than that during the period when the light EL is emitted in the polishing operation. For example, the control apparatus 7 may control the size of the irradiation area EA such that the irradiation area EA during the period when the light EL is emitted in the build operation is smaller than that during the period when the light EL is emitted in the polishing operation. Even in this case, the build system 1 appropriately polishes the polishing target surface PS having concavity and convexity that are caused by the moving pattern of the build head 41 in the build operation so as to smooth the concavity and convexity. A specific method for controlling the size of the irradiation area EA may be the same as that in the size controlling operation described above.

(6) MODIFIED EXAMPLES

(6-1) First Modified Example

Firstly, a first modified example of the build system 1 will be described. In the above description, the control apparatus 7 performs the first variation reducing operation to reduce the variation between the height h1 of the build object S1 formed at the area WA1 at which the irradiation area EA is set twice or more times in the layer forming period and the height h2 of the build object S2 formed at the area WA2 at which the irradiation area EA is set once in the layer forming period. On the other hand, a build system 1a in the first modified example is configured to reduce the variation between the height h1 of the build object S1 and the height h2 of the build object S2 without performing the first variation reducing operation.

Specifically, the build system 1a is different from the build system 1 in that it is provided with a build apparatus 4a instead of the build apparatus 4. The build apparatus 4a is different from the build apparatus 4 in that it is provided with an irradiation optical system 411a instead of the irradiation optical system 411. The irradiation optical system 411a is different from the irradiation optical system 411 in that an optical characteristic of the irradiation optical system 411a is set (in other words, designed or adjusted) in advance to reduce the variation between the height h1 of the build object S1 and the height h2 of the build object S2. Other component of the build system 1a may be the same as those of the build system 1.

The optical characteristic of the irradiation optical system 411a is set in advance to reduce the variation between the height h1 of the build object S1 and the height h2 of the build object S2. In the present embodiment, a depth of focus is used as the optical characteristic of the irradiation optical system 411a. Therefore, the depth of focus of the irradiation optical system 411 is set in advance to reduce the variation between the height h1 of the build object S1 and the height h2 of the build object S2. The depth of focus has a correlation with a numerical aperture (NA) that is an example of the optical characteristic of the irradiation optical system 411a. Therefore, it can be also said that the NA of the irradiation optical system 411a is set in advance to reduce the variation between the height h1 of the build object S1 and the height h2 of the build object S2. Note that the depth of focus in this description may indicate a range in an optical axis direction (or propagating direction of the light) in which the intensity or energy amount per unit area of the light EL is higher than the intensity that allows the build materials M to be molten.

The depth of focus of the irradiation optical system 411a is set on the basis of a design height (namely, a thickness) h0 of the structural layer SL formed by the build system 1a. Specifically, the depth of focus of the irradiation optical system 411a is set, as illustrated in FIG. 49, to satisfy a first condition that the size (in other words, a width along the Z axis) of the depth of focus is less than twice the design height h0 of the structural layer SL. In other words, the depth of focus of the irradiation optical system 411a is set to satisfy the first condition that two or more laminated structural layers SL are not allowed to be located in a range of the depth of focus at the same time (namely, a part of the two or more laminated structural layers SL deviates from the range of the depth of focus).

Suppose that the irradiation area EA is set twice at the area WA1 if such a condition is satisfied. In this case, when the irradiation area EA is set at the area WA1 at the first time, as illustrated in FIG. 50A, a build object SOa having height ha that is the same as the height h0 is formed at the area WA1. Then, when the irradiation area EA is set at the area WA1 at the second time, there is a possibility that a new build object Sob is formed on the build object SOa that is already formed at the area WA1. A height hb of the build object Sob, however, is lower than the height h0 even if the new build object Sob is formed, as illustrated in FIG. 50B, because the size of the depth of focus is less than twice the height h0. This is because the build materials M are bit molten due to insufficient intensity of the light EL in an area outside the range of the depth of focus. On the other hand, if the first condition is not satisfied, when the irradiation area EA is set at the area WA1 at the second time, there is a possibility that the build object Sob having height hb that is the same as the height h0 is formed on the build object SOa. Thus, when the first condition is satisfied, the variation is reduced between the height h1 (=the sum of the height ha of the build object SOa and the height hb of the build object Sob) of the build object S1 formed at the area WA1 and the height h2 (=the height ha of the build object SOa) of the build object S2 formed at the area WA2, in comparison with the case where the first condition is not satisfied. In other words, the build system 1a appropriately reduces the variation between the height h1 of the build object S1 and the height h2 of the build object S2 without controlling at least one of the supply rate of the build materials M, the heat transfer rate regarding the heat transferred from the light EL, and the moving speed of the irradiation area EA as described above.

The build object is formed on the build surface CS. Moreover, since the build materials M are molten in the range of the depth of focus of the irradiation optical system 411a, the build object is formed in the range of the depth of focus. Therefore, as illustrated in FIG. 51A and FIG. 51B, the build object is formed between the build surface CS and a border UB of the range of the depth of focus on an object surface side (which is a +Z side and an upper side in examples illustrated in FIG. 51A and FIG. 51B) of the irradiation optical system 411a. In that case, in order to form the same build object having height that is the same as the design height h0 of the structural layer SL on the build surface CS, as illustrated in FIG. 51A and FIG. 51B, the irradiation optical system 411a is aligned to the build surface CS such that an interval between the build surface CS and the border UB is larger than or equal to the height h0. FIG. 51A illustrates an example in which the interval between the build surface CS and the border UB is equal to the height h0. In this case, the build object having a height that is h0 is formed on the build surface CS. In contrary, FIG. 51B illustrates an example in which the interval between the build surface CS and the border UB is larger than the height h0. In this case, the build object having a height that is at least h0 is formed on the build surface CS. Note that a state where the interval between the build surface CS and the border UB is equal to the height h0 as illustrated in FIG. 51A is equivalent to a state where the light concentration position of the light EL is set on the build surface CS. In the same manner, a state where the interval between the build surface CS and the border UB is larger than the height h0 as illustrated in FIG. 51B is equivalent to a state where the light concentration position of the light EL is set to a position that is away from the build surface CS to the object surface side of the irradiation optical system 411a.

However, if the size of the depth of focus of the irradiation optical system 411a is less than the design height h0 of the structural layer SL, it is hardly possible to set the interval between the build surface CS and the border UB to be larger than or equal to the height h0. As a result, the build object having a height that is h0 is not formed on the build surface CS. Thus, the depth of focus of the irradiation optical system 411a may be also set to satisfy a second condition that the size of the depth of focus is larger than or equal to the height h0 in design of the structural layer SL.

Note that the build system 1a may perform the first variation reducing operation as well, in the first modified example.

(6-2) Second Modified Example

Next, with reference to FIG. 52, a second modified example of the build system 1 will be described. In the second modified example, a build system 1b is different from the build system 1 in that it is provided with a build apparatus 4b instead of the build apparatus 4. The build apparatus 4b is different from the build apparatus 4 in that it is provided with a driving system 45b. Other component of the build system 1b may be the same as those of the build system 1.

The driving system 45b moves the stage 43. The driving system 45b moves the stage 43 along at least one of the X axis, the Y axis and the Z axis. The driving system 45b may move the stage 43 along at least one of the θX direction, the θY direction and the θZ direction, in addition to at least one of the X axis, the Y axis and the Z axis. The driving system 45b includes a motor or the like, for example. When the stage 43 moves, the workpiece W (furthermore, the structural layer SL on the workpiece W) held by the stage 43 moves relative to the build head 41. In other words, the build surface CS that is at least a part of the surface of the structural layer SL or the workpiece W moves relative to the irradiation area EA that is irradiated with the light EL from the build head 41 (namely, the supply area MA to which the build materials M are supplied from the build head 41). Therefore, in the second modified example, the control apparatus 7 is configured to control the relative moving speed of the irradiation area EA relative to the build surface CS by controlling the driving system 45b in addition to or instead of the driving system 42.

(6-3) Third Modified Example

Next, with reference to FIG. 53A and FIG. 53B, a third modified example of the build system 1 will be described. In the third modified example, a build system 1c is different from the build system 1 in that it is provided with a build apparatus 4c instead of the build apparatus 4. The build apparatus 4c is different from the build apparatus 4 in that it is provided with an irradiation optical system 411c instead of the irradiation optical system 411. The irradiation optical system 411c is different from the irradiation optical system 411 in that it is provided with an optical system 491c that is allowed to deflect the light EL, as illustrated in FIG. 53A. Other component of the build system 1c may be the same as those of the build system 1.

As illustrated in FIG. FIG. 53B, the optical system 491c is provided with a focus lens 4911c, a Galvanometer mirror 4912c and a fθ lens 4913c. The build surface CS (furthermore, the polishing target surface PS, if needed) is irradiated with the light EL through the focus lens 4911c, the Galvanometer mirror 4912c and the fθ lens 4913c.

The focus lens 4911c includes one or more lenses and is an optical member for controlling a condensed position of the light EL (namely, a light concentration position of the optical system 491c) by adjusting a position along an optical axis direction of at least a part of the lenses. The Galvanometer mirror 4912c deflects the light EL such that the light EL sweeps the build surface CS (namely, such that the irradiation area EA moves on the build surface CS). The Galvanometer mirror 4912c is provided with an X scan mirror 4912X and a Y scan mirror 4912Y. The X scan mirror 4912X reflects the light EL to the Y scan mirror 4912Y. The X scan mirror 4912X is configured to swing or rotate in the θY direction (namely, in the rotational direction around the Y axis). Due to the swing or rotation of the X scan mirror 4912X, the light EL sweeps the build surface CS along the X axis direction. Due to the swing or rotation of the X scan mirror 4912X, the irradiation area EA moves on the build surface CS along the X axis direction. The Y scan mirror 4912Y reflects the light EL to the fθ lens 4913c. The Y scan mirror 4912Y is configured to swing or rotate in the θX direction (namely, in the rotational direction around the X axis). Due to the swing or rotation of the Y scan mirror 4912Y, the light EL sweeps the build surface CS along the Y axis direction. Due to the swing or rotation of the Y scan mirror 4912Y, the irradiation area EA moves on the build surface CS along the Y axis direction. The fθ lens 4913c is an optical member for condensing the light EL from the Galvanometer mirror 4912c on the build surface CS.

Therefore, in the third modified example, the control apparatus 7 is configured to control the relative moving speed of the irradiation area EA relative to the build surface CS by controlling the optical system 491c (especially, the Galvanometer mirror 4912c) in addition to or instead of the driving system 42.

Note that the material nozzle 412 that supplies the build materials M may be allowed to move along at least one of the X axis, the Y axis and the Z axis so as to supply the build materials M to the melt pool MP, which is formed on the build surface CS by the irradiation area EA, on the basis of the position of the irradiation area EA on the build surface CS.

(6-4) Fourth Modified Example

Next, a fourth modified example of the build system 1 will be described. In the above described description, the build head 41 of the build system 1 emits both of the light EL used by the build operation and the light EL used by the polishing operation. Namely, an optical path of the light EL in the irradiation optical system 411 during a period when the build operation is performed is the same as an optical path of the light EL in the irradiation optical system 411 during a period when the polishing operation is performed. On the other hand, a build system 1d in the fourth modified example is provided with a polishing head 41d that emits the light EL used by the polishing operation separately from the build head 41 that emits the light EL used by the build operation.

Specifically, the build system 1d is different from the build system 1 in that it is provided with a build apparatus 4d instead of the build apparatus 4. The build apparatus 4d is different from the build apparatus 4 in that it is provided with the polishing head 41d and a driving system 42d. Other component of the build system 1d may be same as the build system 1. Thus, in the below described description, with reference to FIG. 54, the build apparatus 4d in the fourth modified example will be described. Note that a detailed description of the component that is the same as the component of the build system 1 will be omitted by assigning the same reference number to it.

As illustrated in FIG. 54, the build apparatus 4d is provided with the polishing head 41d and the driving system 42d in addition to the build head 41, the driving system 42, and the stage 43 described above. The polishing head 41d is provided with an irradiation optical system 411d.

The irradiation optical system 411d is an optical system (for example, a condensing optical system) for emitting a light ELd from an emitting part 413d. Specifically, the irradiation optical system 411d is optically connected to the light source 5 that generates the light EL through a non-illustrated light transmitting member such as an optical fiber and light pipe. The irradiation optical system 411d emits, as the light ELd, the light EL transmitted from the light source 5 through the light transmitting member. Namely, the light EL generated by the light source 5 is divided into two lights EL by an optical dividing unit disposed between the optical source 5 and the build apparatus 4d or in the build apparatus 4d and one light EL is transmitted to the build head 41 and the other one light EL is transmitted to the polishing head 41d. The irradiation optical system 411d emits the light ELd in a downward direction (namely, toward a −Z side) from the irradiation optical system 411d. The stage 43 is disposed below the irradiation optical system 411d. When the three-dimensional structural object ST is loaded on the stage 43, the irradiation optical system 411d is configured to emit the light ELd toward the three-dimensional structural object ST. Specifically, the irradiation optical system 411d irradiates, with the light ELd, a circular (alternatively, any other shaped) irradiation area EAd that is set on the polishing target surface PS as an area that is irradiated with the light ELd. The irradiation area EAd is set at a different position from that of the irradiation area EA that is irradiated with the light EL from the build head 41, but may be set at the same position. The irradiation area EAd does not overlap with the irradiation area EA, but may overlap at least partially. Moreover, a state of the irradiation optical system 411d is switchable between a state where the irradiation area EAd is irradiated with the light ELd and a state where the irradiation area EAd is not irradiated with the light ELd under the control of the control apparatus 7.

The head driving system 42d moves the polishing head 41d. Specifically, the driving system 42d moves the polishing head 41d along each of the X axis, the Y axis and the Z axis. Note that a structure of the driving system 42d may be same as the structure of the driving system 42. Therefore, a detailed description of the structure of the driving system 42d is omitted.

Since the polishing head 41d is used separately from the build head 41, the polishing head 41d emits light ELd from the direction that is different from that of the build head 41. Namely, the polishing target surface PS is irradiated with the light ELd that transmits through an optical path that is different from the optical path of the light EL. Thus, the polishing head 41d is allowed to emit the light ELd in at least a part of a period when the build head 41 emits the light EL.

Namely, the build system 1d is allowed to perform the build operation and the polishing operation in parallel. In other words, the build system 1d is allowed to overlap at least a part of a time interval (or a time) when the build operation is performed with at least a part of a time interval (or a time) when the polishing operation is performed or overlap at least a part of a timing at which the build operation is performed with at least a part of a timing at which the polishing operation is performed. Specifically, the build system 1d is allowed to polish the polishing target surface PS that is at least a part of the surface of a part of the three-dimensional structural object ST that is already formed at one area on the build surface CS, by irradiating this polishing target surface PS with the light ELd, in at least a part of a period when another part of the three-dimensional structural object ST is formed by irradiating another area on the build surface CS with the light EL by the build head 41. As a result, a throughput for forming and polishing the three-dimensional structural object ST improves. Namely, the build system 1d in the fourth modified example achieves an effect that is the same as the effect achievable by the above described build system 1 and improves the throughput for forming the polished three-dimensional structural object ST.

Note that the build system 1d may perform the polishing operation after the three-dimensional structural object ST is formed by the build operation, even when the build apparatus 4d is provided with the polishing head 41d separately from the build head 41. Even in this case, the fact remains that the build system 1d in the fourth modified example achieves an effect that is the same as the effect achievable by the above described build system 1.

Note that the light EL emitted from common light source 5 is transmitted to the build head 41 and the polishing head 41d in FIG. 54. The build system 1d, however, may be provided with a light source 5d that emits the light ELd used by the polishing operation separately from the light source 5 that emits the light EL used by the build operation. The light source 5d may emit the light ELd having a characteristic (for example, an intensity, a wavelength, a polarization and the like) that is the same as that of the light EL emitted by the light source 5. The light source 5d may emit the light ELd having the characteristic (for example, the intensity, the wavelength, the polarization and the like) that is different from that of the light EL emitted by the light source 5. The light source 5d may emit an energy beam a type of which is different from that of the light EL emitted by the light source 5.

(6-5) Fifth Modified Example

Next, a fifth modified example of the build system 1 will be described. In the above description, the build system 1 is provided with a single build head 41. In contrary, a build system 1e in the fifth modified example is provided with a plurality of build heads 41. Specifically, the build system 1e is different from the build system 1 in that it is provided with a build apparatus 4e instead of the build apparatus 4. The build apparatus 4e is different from the build apparatus 4 in that it is provided with the plurality of build heads 41. Other component of the build system 1e may be the same as those of the build system 1. Thus, hereinafter, the build apparatus 4e in the fifth modified example will be further described with reference to FIG. 55. Note that a detailed description of the component that is the same as the component of the build system 1 will be omitted by assigning the same reference numeral to it.

As illustrated in FIG. 55, the build apparatus 4e is provided with the plurality of build heads 41. The plurality of build heads 41 are assembled to a support frame 48e to be aligned along any one of the X axis and the Y axis (which is the Y axis in the example illustrated in FIG. 55). The driving system 42 moves the support frame 48e along at least one of the X axis, the Y axis and the Z axis. In other words, the driving system 42 moves the plurality of build heads 41 all at once along at least one of the X axis, the Y axis and the Z axis.

According to the build system 1e in the fifth modified example as described above, the three-dimensional structural object ST can be formed by irradiating the build surface CS with a plurality of lights EL at the same time. As a result, the throughput for forming the three-dimensional structural object ST improves. Namely, the build system 1e in the fifth modified example achieves the effect that is the same as the effect achievable by the above described build system 1 and improves the throughput for forming the three-dimensional structural object ST.

Note that the plurality of build heads 41 may not be assembled to the support frame 48e. In this case, the build apparatus 4e may be provided with a plurality of driving systems 42 for respectively driving the plurality of build heads 41.

(6-6) Sixth Modified Example

The above description exemplifies a situation in which the build surface CS is a flat surface when the height of the build object from the build surface CS varies depending on the position of the build object. The build surface CS itself, however, may be not limited to the flat surface; namely, the build surface CS itself may have a height (a position in the Z axis direction) that varies depending on the position on the build surface CS. For example, as illustrated in FIG. 56A, the build surface CS may be a curved surface. In this case, the height based on the position of the build object in the X axis direction and the position of the build object in the Y axis direction may vary such that the upper surface of the structural layer SL #1 built on the top of the curved build surface CS is along the XY plane, or in other words, such that the height of the upper surface of the structural layer SL #1 in the Z axis direction is constant regardless of the position of the structural layer SL #1 in the X axis direction and the Y axis direction. Moreover, as illustrated in FIG. 56B, the build surface CS has a concave-convex shape. Even in this case, the height based on the position of the build object in the X axis direction and the position of the build object in the Y axis direction may vary such that the upper surface of the structural layer SL #1 built on the top of the concave-convex build surface CS is along the XY plane, or in other words, such that the height of the upper surface of the structural layer SL #1 in the Z axis direction is constant regardless of the position of the structural layer SL #1 in the X axis direction and the Y axis direction. Moreover, as illustrated in FIG. 56C, the build surface CS may be the upper surface of the structural layer SL #1. In any case, the upper surface of the structural layer SL #1 (furthermore, the structural layer SL #2) can be flattened regardless of a surface shape of the build surface CS. In this case, the upper surface of the structural layer SL #1 (furthermore, the structural layer SL #2) may be a predetermined curved surface.

(6-7) Seventh Modified Example

In the above description, the height of the build object from the build surface CS varies depending on the position of the build object. The height of the build object from the build surface CS, however, may not vary depending on the position of the build object (namely, may be constant). For example, as illustrated in FIG. 57, the structural layer SL #2 having height that is different from the height (or the size in the Z axis direction) of the formed structural layer SL #1 may be built on the structural layer SL #1. This provides greater precision in the height in the layered direction (or in the Z axis direction) of the three-dimensional structural object ST built in the end.

(6-8) Eighth Modified Example

The material nozzle 412 that supplies the build materials M may continue to supply the build materials M in a period (hereinafter referred to as a first period) between a state where the supply area MA is at a position outside the workpiece W and a state where the supply area MA is at a build start position SP on the workpiece W and eventually on the build surface CS. This stabilizes the supplied amount per unit time at the build start position SP when a time interval from a time point when the build materials M from the material nozzle 412 starts to supply the build materials M to a time point when the supplied amount per unit time is stabilized is long.

In this case, the build materials M from the material nozzle 412 collides with the build surface CS and possibly damages the build surface CS. In this case, as illustrated in FIG. 58A, the gas jet apparatus 461 described in FIG. 8 may be provided. Then, a jet of gas may be emitted from the gas jet apparatus 461 in the first period in the direction that intersects with the supply path of the build materials M, thereby to direct the build materials M, which are supposedly directed to the supply area MA from the material nozzle 412, toward the workpiece W and eventually outside the build surface CS. Then, as illustrated in FIG. 58B, in a period (hereinafter referred to as a second period) after the supply area MA by the material nozzle 412 is positioned at the build start position SP, a gas jetting operation of the gas jet apparatus 461 may be stopped to start the supply of the build materials M to the supply area MA from the material nozzle 412. Here, the irradiation optical system 411 may start to irradiate the irradiation area EA with the light EL from a time point when the supply area MA by the material nozzle 412 is positioned at the build start position SP.

Note that the supplied amount per unit time of the build materials M in the first period may be smaller than that in the second period in which the build object is formed. Moreover, in the above description, the gas jet apparatus 461 is used to direct the build materials M, which are supposedly directed to the supply area MA from the material nozzle 412, toward the workpiece W and eventually outside the build surface CS; however, the blocking member 462 described with reference to FIG. 9 may be used, and the direction of supply (or the direction of injection) of the material nozzle 412 may be changed as described with reference to FIG. 10. Moreover, when the build apparatus 4 is provided with any supply amount change apparatus that is different from the gas jet apparatus 461 and the blocking member 462, the control apparatus 7 may control any supply amount change apparatus so as to control the supply rate of the build materials M. Note that any supply amount change apparatus may be a supply amount change apparatus 3a disposed in the material supply apparatus 3 as illustrated in FIG. 59, or may be a supply amount adjusting apparatus 481 disposed in the supply path leading to the supply outlet 414 of the material nozzle 412 from the material supply apparatus 3 as illustrated in FIG. 60. For example, a valve that is allowed to change a passing flow rate may be used as such supply amount change apparatuses 3a and 418. Note that the supply amount change apparatuses 3a and 418 respectively illustrated in FIG. 59 and FIG. 60 may be used as any supply amount change apparatus that is different from the gas jet apparatus 461 and the blocking member 462 described with reference to FIG. 8 and FIG. 9.

(6-9) Ninth Modified Example

In an example described with reference to FIG. 30, when attention is paid to one-time movement of the irradiation area EA along the Y axis direction (namely, a movement until the moving direction is changed, and a movement along one scanning line in the raster scan), the light EL is emitted at a timing when the irradiation area EA overlaps with the mark forming area in the movement of the irradiation area EA along the Y axis direction, and the height of the build object built by the one-time movement (furthermore, a plurality of times of irradiation of the light EL during the one-time movement) is constant. However, when the light EL is emitted multiple times in the movement of the irradiation area EA in a predetermined direction (e.g., in a direction within the build surface CS such as the Y axis direction or the X axis direction) and a plurality of build objects arranged in the predetermined direction are built, the build objects have different heights (heights from the build surface CS in the Z axis direction). For example, as illustrated in FIG. 61A, at least one of the supply rate of the build materials M, the heat transfer rate, the moving speed of the irradiation area EA and the like may be set differently for an area WA9 and an area WA10 arranged along the same scanning line of the raster scan. This operation makes it possible to form the build objects having different heights from the build surface CS in the Z axis direction, as illustrated in FIG. 61B.

In the above described example, the heights of the plurality of build objects formed by the one-time movement (namely, the movement along one scanning line in the raster scan) are changed from each other, but the heights (the heights from the build surface CS in the Z axis direction) may be changed among a plurality of build objects formed by the movement of the irradiation area EA (furthermore, the supply of the build materials M performed during the movement) along different scanning lines in the raster scan that allows the irradiation area EA to move along the plurality of scanning lines. For example, as illustrated in FIG. 62A, at least one of the supply rate of the build materials M, the heat transfer rate, the moving speed of the irradiation area EA and the like may be set differently for the area WA9 and an area WA11 arranged along different scanning lines. This operation makes it possible to build the build objects of different heights from the build surface CS in the Z axis direction, as illustrated in FIG. 62B.

Note that the ninth modified example may be applied to a case where the build surface CS itself is a surface of the layered-build object although the marking operation to the build surface CS is described as an example in the ninth modified example.

(6-10) Other Modified Example

In the above described description, the build apparatus 4 melts the build materials M by irradiating the build materials M with the light EL. However, the build apparatus 4 may form the melt pool MP by irradiating the build materials M with any energy beam and melt the build materials M in the melt pool MP. In this case, the build apparatus 4 may be provided with a beam irradiation apparatus that is configured to emit any energy beam in addition to or instead of the irradiation optical system 411. Any energy beam includes, but is not limited to, a charged particle beam such as an electron beam and an ion beam or electromagnetic wave.

In the above described description, the build system 1 is configured to form the three-dimensional structural object ST by the Laser Metal Deposition. However, the build system 1 may form the three-dimensional structural object ST from the build materials M by another method for forming the three-dimensional structural object ST by irradiating the build materials M with the light EL (alternatively, any laser beam). A Powder Bed Fusion such as a Selective Laser Sintering (SLS), a Binder Jetting or a Laser Metal Fusion (LMF) is one example of another method, for example.

At least a part of the features of each embodiment described above may be appropriately combined with at least another a part of the features of each embodiment described above. A part of the features of each embodiment described above may not be used. Moreover, the disclosures of all publications and United States patents that are cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification. A processing apparatus, a processing method, a marking method, a build system, a build method, a computer program, a recording medium and a control apparatus, which involve such changes, are also intended to be within the technical scope of the present invention.

DESCRIPTION OF REFERENCE CODES 1 build system
3 material supply apparatus
4 build apparatus
41 build head
411 irradiation optical system
412 material nozzle
42 driving system
43 stage
5 light source
W workpiece
M build material
SL structural layer
CS build surface
EA irradiation area
MA supply area
MP melt pool

The invention claimed is:
1. A build system comprising:
a build apparatus that performs a build process for forming a layered structural object in which a plurality of layered structural objects are laminated by supplying build materials from a supply system to an irradiation area of an energy beam while irradiating a target object with the energy beam through an optical system; and
a change apparatus that is configured to change a relative position between the energy beam and the target object, wherein a size of a depth of focus of the optical system is larger than or equal to a thickness of one layer of the layered structural object, and a distance between a surface of the target object and a border surface of a range of the depth of focus on an object surface side of the optical system is larger than or equal to the thickness of one layer of the layered structural object.

2. The build system according to claim 1, wherein a light concentration position of the energy beam is set on the surface of the target object, or at a position closer away from the surface of the target object to the object surface side of the optical system.

3. The build system according to claim 2, wherein the light concentration position is away to the object surface side more as the depth of focus decreases.

4. The build system according to claim 1, wherein
the change apparatus changes the light concentration position of the energy beam along a propagating direction of the energy beam.

5. The build system according to claim 1, wherein the range of the depth of focus is larger than the thickness of one layer of the layered structural object, and a position of a border of the range of the depth of focus is set within a range of another layer on which the one layer is layered, in a direction that intersects with the target object.

6. The build system according to claim 1, wherein
the change apparatus moves an irradiation position of the energy beam, and
the build apparatus supplies the build materials to the moving irradiation position.

7. The build system according to claim 1, wherein
the size of the depth of focus of the optical system is smaller than a thickness of two layers of the layered structural object.

8. A build method comprising:
irradiating a target object with an energy beam;
supplying build materials to the target object; and
performing a build process for forming a layered structural object in which a plurality of layered structural objects are laminated, by supplying the build materials to an irradiation area of the energy beam while irradiating the target object with the energy beam, wherein
the irradiating the target object with the energy beam includes irradiating the target object with the energy beam through an optical system in which a size of a depth of focus of the optical system is larger than a thickness of one layer of the layered structural object, and a distance between a surface of the target object and a border surface of a range of the depth of focus on an object surface side of the optical system is larger than or equal to the thickness of one layer of the layered structural object.

9. The build method according to claim 8, wherein
the irradiating the target object with the energy beam includes setting a light concentration position of the energy beam on the surface of the target object, or at a position closer away from the surface of the target object to the object surface side of the optical system.

10. The build method according to claim 9, wherein
the setting the light concentration position includes allowing the light concentration position to be away to the object surface side more as the depth of focus decreases.

11. The build method according to claim 8, wherein
the irradiating the target object with the energy beam includes changing the light concentration position of the energy beam along a propagating direction of the energy beam.

12. The build method according to claim 8, wherein
the range of the depth of focus is larger than the thickness of one layer of the layered structural object, and a position of a border of the range of the depth of focus is set within a range of another layer on which the one layer is layered, in a direction that intersects with the target object.

13. The build method according to claim 8, wherein
the irradiating the target object with the energy beam includes moving an irradiation position of the energy beam, and
the supplying the build materials includes supplying the build materials to the moving irradiation position.

14. The build method according to claim 8, wherein
the size of the depth of focus of the optical system is smaller than a thickness of two layers of the layered structural object.

\* \* \* \* \*